US012670339B2

(12) United States Patent
Hunn et al.

(10) Patent No.: US 12,670,339 B2
(45) Date of Patent: Jun. 30, 2026

(54) GENERATIVE ARTIFICIAL INTELLIGENCE PLATFORM TO MANAGE SMART DOCUMENTS

(71) Applicant: DocuSign, Inc., San Francisco, CA (US)

(72) Inventors: Peter Hunn, San Francisco, CA (US); Mariam Turner, San Francisco, CA (US)

(73) Assignee: Docusign, Inc., San Francisco, CA (US)

( * ) Notice: Subject to any disclaimer, the term of this patent is extended or adjusted under 35 U.S.C. 154(b) by 307 days.

(21) Appl. No.: 18/129,164

(22) Filed: Mar. 31, 2023

(65) Prior Publication Data

US 2024/0330605 A1     Oct. 3, 2024

(51) Int. Cl.
*G06F 40/56* (2020.01)
*H04L 9/32* (2006.01)

(52) U.S. Cl.
CPC ............ *G06F 40/56* (2020.01); *H04L 9/3247* (2013.01)

(58) Field of Classification Search
CPC ....... G06F 40/56; G06F 40/30; H04L 9/3247; H04L 9/32
See application file for complete search history.

(56) References Cited

U.S. PATENT DOCUMENTS

| | | |
|---|---|---|
| 2005/0182736 A1 | 8/2005 | Castellanos |
| 2020/0349181 A1* | 11/2020 | Carbune ............... G06F 16/338 |
| 2023/0004604 A1 | 1/2023 | Li |
| 2023/0401247 A1* | 12/2023 | Lehal ..................... G06Q 10/10 |
| 2024/0303496 A1* | 9/2024 | Nair ..................... G06N 3/0895 |
| 2024/0330742 A1 | 10/2024 | Hunn et al. |

* cited by examiner

*Primary Examiner* — Huyen X Vo
(74) *Attorney, Agent, or Firm* — KDW FIRM PLLC

(57) ABSTRACT

Techniques for an artificial intelligence (AI) platform to manage a document collection are described. Embodiments may use AI and machine learning techniques within a framework of an electronic document management system to manage and mine a collection of electronic documents for certain types of information. The information may be analyzed and used to generate insights for a defined entity. The insights may comprise deviations, modifications or changes made to an electronic document within the electronic document management system. Other embodiments are described and claimed.

20 Claims, 37 Drawing Sheets

1600

RETRIEVE AN UNSIGNED ELECTRONIC AGREEMENT ASSOCIATED WITH A DEFINED ENTITY FROM AN ELECTRONIC DOCUMENT MANAGEMENT SYSTEM, THE UNSIGNED ELECTRONIC AGREEMENT HAVING A SET OF DOCUMENT CLAUSES, EACH DOCUMENT CLAUSE TO HAVE ONE OR MORE PARAMETERS 1602

RETRIEVE A CANDIDATE SOURCE ASSOCIATED WITH THE DEFINED ENTITY FROM THE ELECTRONIC DOCUMENT MANAGEMENT SYSTEM, THE CANDIDATE SOURCE HAVING A SET OF CANDIDATE CLAUSES, EACH CANDIDATE CLAUSE TO HAVE ONE OR MORE PARAMETERS 1604

IDENTIFY A SET OF RELATED DOCUMENT CLAUSES BETWEEN THE UNSIGNED ELECTRONIC AGREEMENT AND THE CANDIDATE SOURCE USING A MACHINE LEARNING MODEL, THE SET OF RELATED DOCUMENT CLAUSES TO COMPRISE A DOCUMENT CLAUSE FROM THE SET OF DOCUMENTS CLAUSES OF THE UNSIGNED ELECTRONIC AGREEMENT AND A CANDIDATE CLAUSE FROM THE SET OF CANDIDATE CLAUSES OF THE CANDIDATE SOURCE 1606

IDENTIFY A SET OF COMMON PARAMETERS SHARED BETWEEN THE SET OF RELATED DOCUMENT CLAUSES USING THE MACHINE LEARNING MODEL, THE SET OF COMMON PARAMETERS TO INCLUDE A PARAMETER FROM THE DOCUMENT CLAUSE AND A PARAMETER FROM THE CANDIDATE CLAUSE OF THE SET OF RELATED DOCUMENT CLAUSES 1608

ANALYZE THE SET OF COMMON PARAMETERS FOR A FORMAL DEVIATION BETWEEN THE COMMON PARAMETERS 1610

GENERATE AN INSIGHT BASED ON THE FORMAL DEVIATION USING A NATURAL LANGUAGE GENERATION (NLG) MODEL, THE INSIGHT TO DESCRIBE THE FORMAL DEVIATION IN A NATURAL LANGUAGE REPRESENTATION 1612

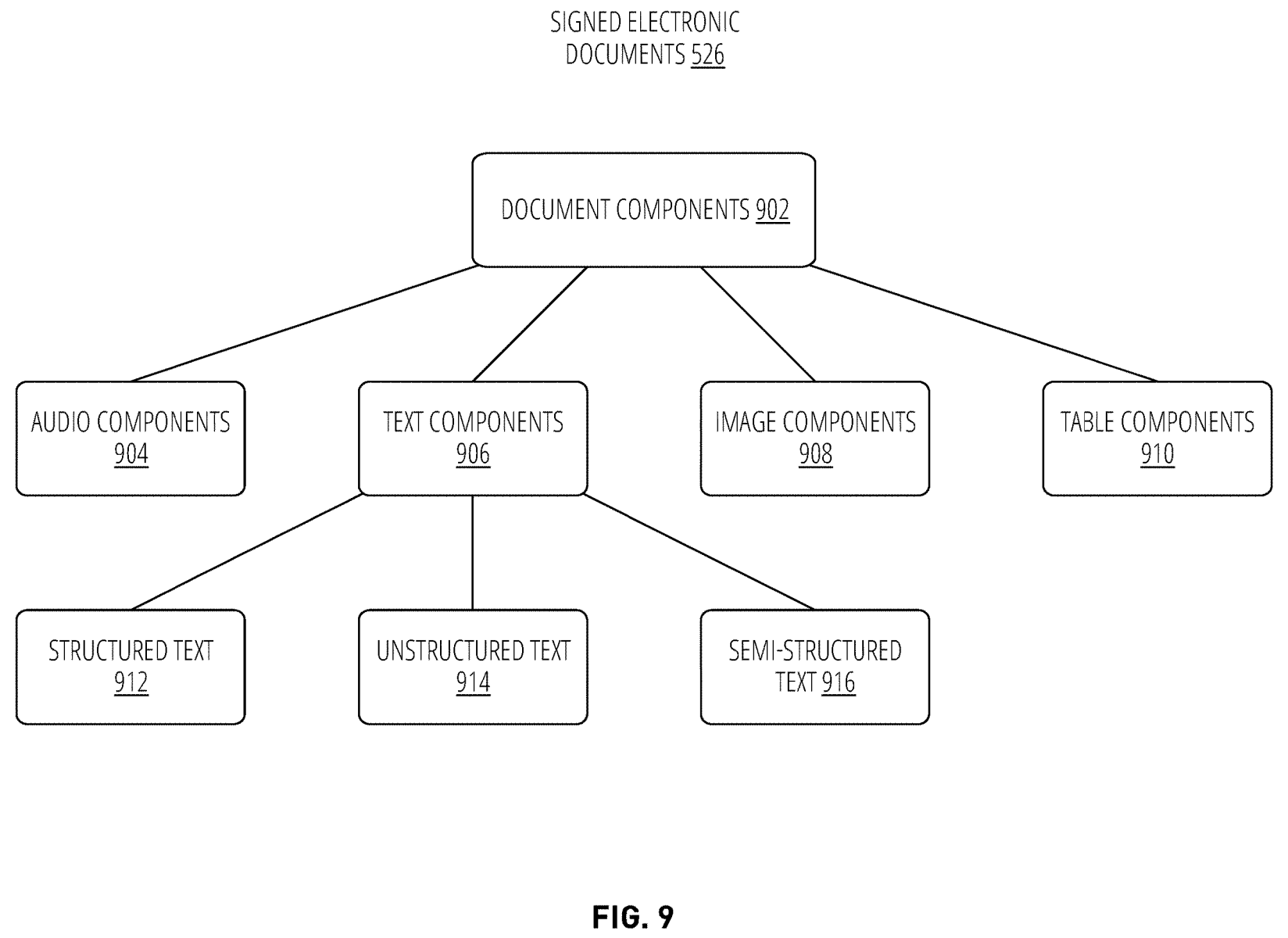

SIGNED ELECTRONIC
DOCUMENTS 526

DOCUMENT COMPONENTS 902

AUDIO COMPONENTS
904

TEXT COMPONENTS
906

IMAGE COMPONENTS
908

TABLE COMPONENTS
910

STRUCTURED TEXT
912

UNSTRUCTURED TEXT
914

SEMI-STRUCTURED
TEXT 916

FIG. 9

1300

RETRIEVE DATA FROM A DOCUMENT CORPUS ASSOCIATED WITH A DEFINED ENTITY, THE DOCUMENT CORPUS COMPRISING A SET OF DOCUMENT RECORDS, EACH DOCUMENT RECORD TO INCLUDE A SIGNED ELECTRONIC DOCUMENT, EACH SIGNED ELECTRONIC DOCUMENT TO INCLUDE A SET OF INFORMATION BLOCKS 1302

IDENTIFY A SET OF RELATED INFORMATION BLOCKS USING A MACHINE LEARNING MODEL, EACH INFORMATION BLOCK IN THE SET OF RELATED INFORMATION BLOCKS PART OF A DIFFERENT SIGNED ELECTRONIC DOCUMENT OF THE DOCUMENT CORPUS ASSOCIATED WITH THE DEFINED ENTITY 1304

IDENTIFY A SET OF COMMON PARAMETERS SHARED BY THE SET OF RELATED INFORMATION BLOCKS 1306

GENERATE A DOCUMENT RULE BASED ON THE SET OF COMMON PARAMETERS SHARED BY THE SET OF RELATED INFORMATION BLOCKS 1308

STORE THE DOCUMENT RULE AS PART OF A DOCUMENT RULE SET FOR THE DEFINED ENTITY IN A RULES DATABASE 1310

FIG. 13

1400

CONVERT THE INFORMATION BLOCKS OF THE SIGNED ELECTRONIC DOCUMENTS OF THE DOCUMENT CORPUS FROM IMAGE COMPONENTS INTO TEXT COMPONENTS 1402

PRE-PROCESS THE INFORMATION BLOCKS OF THE SIGNED ELECTRONIC DOCUMENTS OF THE DOCUMENT CORPUS TO A DEFINED DATA SCHEMA 1404

PROCESS DATA FROM THE INFORMATION BLOCKS OF THE SIGNED ELECTRONIC DOCUMENTS FROM THE DOCUMENT CORPUS TO OBTAIN ONE OR MORE FEATURES FOR TRAINING THE MACHINE LEARNING MODEL 1406

TRAIN THE MACHINE LEARNING MODEL ON TRAINING DATA FROM THE SIGNED ELECTRONIC DOCUMENTS 1408

EVALUATE THE MACHINE LEARNING MODEL ON TESTING DATA FROM THE SIGNED ELECTRONIC DOCUMENTS 1410

DEPLOY THE MACHINE LEARNING MODEL TO AN ACTOR TO PERFORM INFERENCING OPERATIONS FOR THE ACTOR 1412

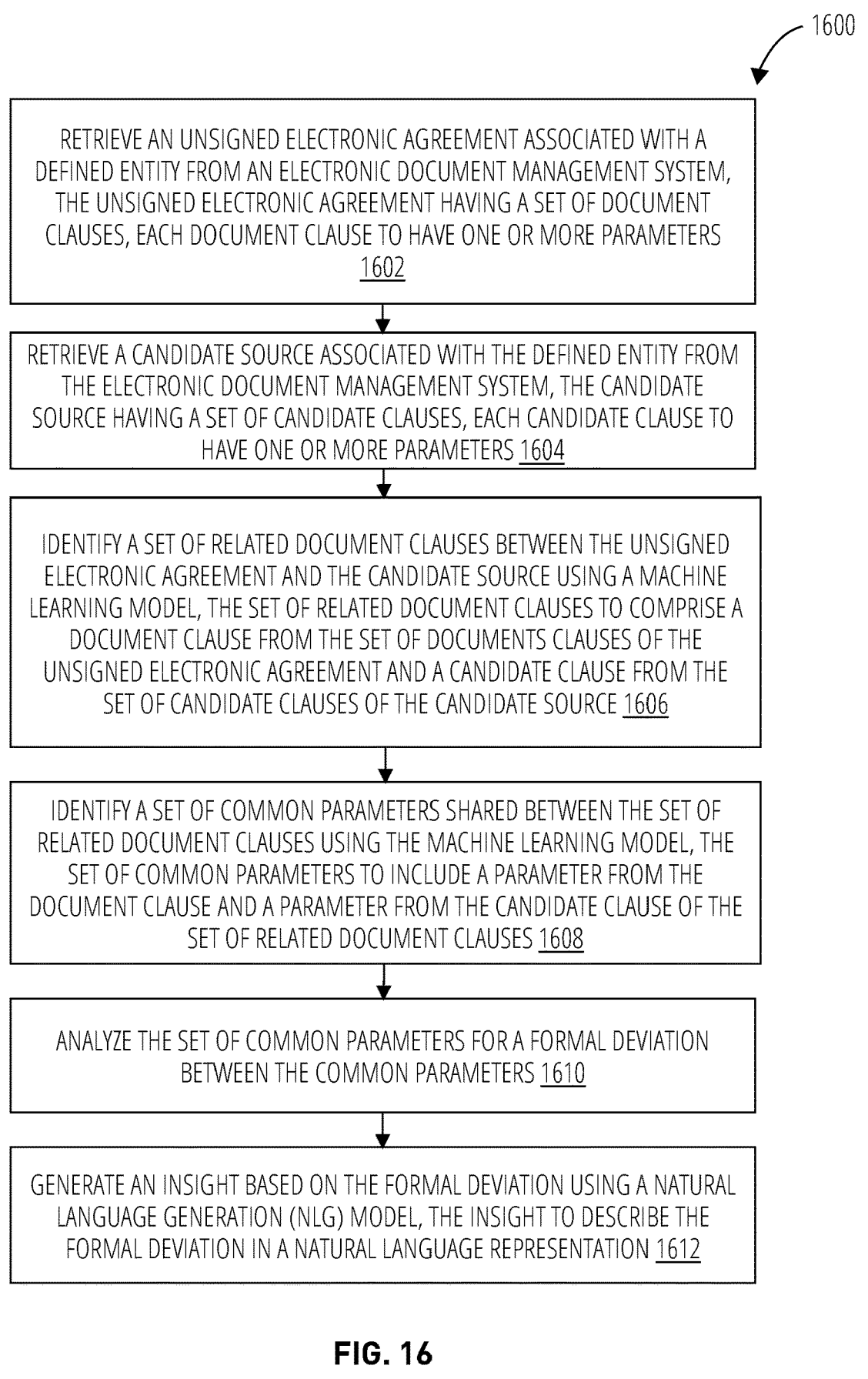

RETRIEVE AN UNSIGNED ELECTRONIC AGREEMENT ASSOCIATED WITH A DEFINED ENTITY FROM AN ELECTRONIC DOCUMENT MANAGEMENT SYSTEM, THE UNSIGNED ELECTRONIC AGREEMENT HAVING A SET OF DOCUMENT CLAUSES, EACH DOCUMENT CLAUSE TO HAVE ONE OR MORE PARAMETERS
1602

RETRIEVE A CANDIDATE SOURCE ASSOCIATED WITH THE DEFINED ENTITY FROM THE ELECTRONIC DOCUMENT MANAGEMENT SYSTEM, THE CANDIDATE SOURCE HAVING A SET OF CANDIDATE CLAUSES, EACH CANDIDATE CLAUSE TO HAVE ONE OR MORE PARAMETERS 1604

IDENTIFY A SET OF RELATED DOCUMENT CLAUSES BETWEEN THE UNSIGNED ELECTRONIC AGREEMENT AND THE CANDIDATE SOURCE USING A MACHINE LEARNING MODEL, THE SET OF RELATED DOCUMENT CLAUSES TO COMPRISE A DOCUMENT CLAUSE FROM THE SET OF DOCUMENTS CLAUSES OF THE UNSIGNED ELECTRONIC AGREEMENT AND A CANDIDATE CLAUSE FROM THE SET OF CANDIDATE CLAUSES OF THE CANDIDATE SOURCE 1606

IDENTIFY A SET OF COMMON PARAMETERS SHARED BETWEEN THE SET OF RELATED DOCUMENT CLAUSES USING THE MACHINE LEARNING MODEL, THE SET OF COMMON PARAMETERS TO INCLUDE A PARAMETER FROM THE DOCUMENT CLAUSE AND A PARAMETER FROM THE CANDIDATE CLAUSE OF THE SET OF RELATED DOCUMENT CLAUSES 1608

ANALYZE THE SET OF COMMON PARAMETERS FOR A FORMAL DEVIATION BETWEEN THE COMMON PARAMETERS 1610

GENERATE AN INSIGHT BASED ON THE FORMAL DEVIATION USING A NATURAL LANGUAGE GENERATION (NLG) MODEL, THE INSIGHT TO DESCRIBE THE FORMAL DEVIATION IN A NATURAL LANGUAGE REPRESENTATION 1612

FIG. 16

Figure 26:
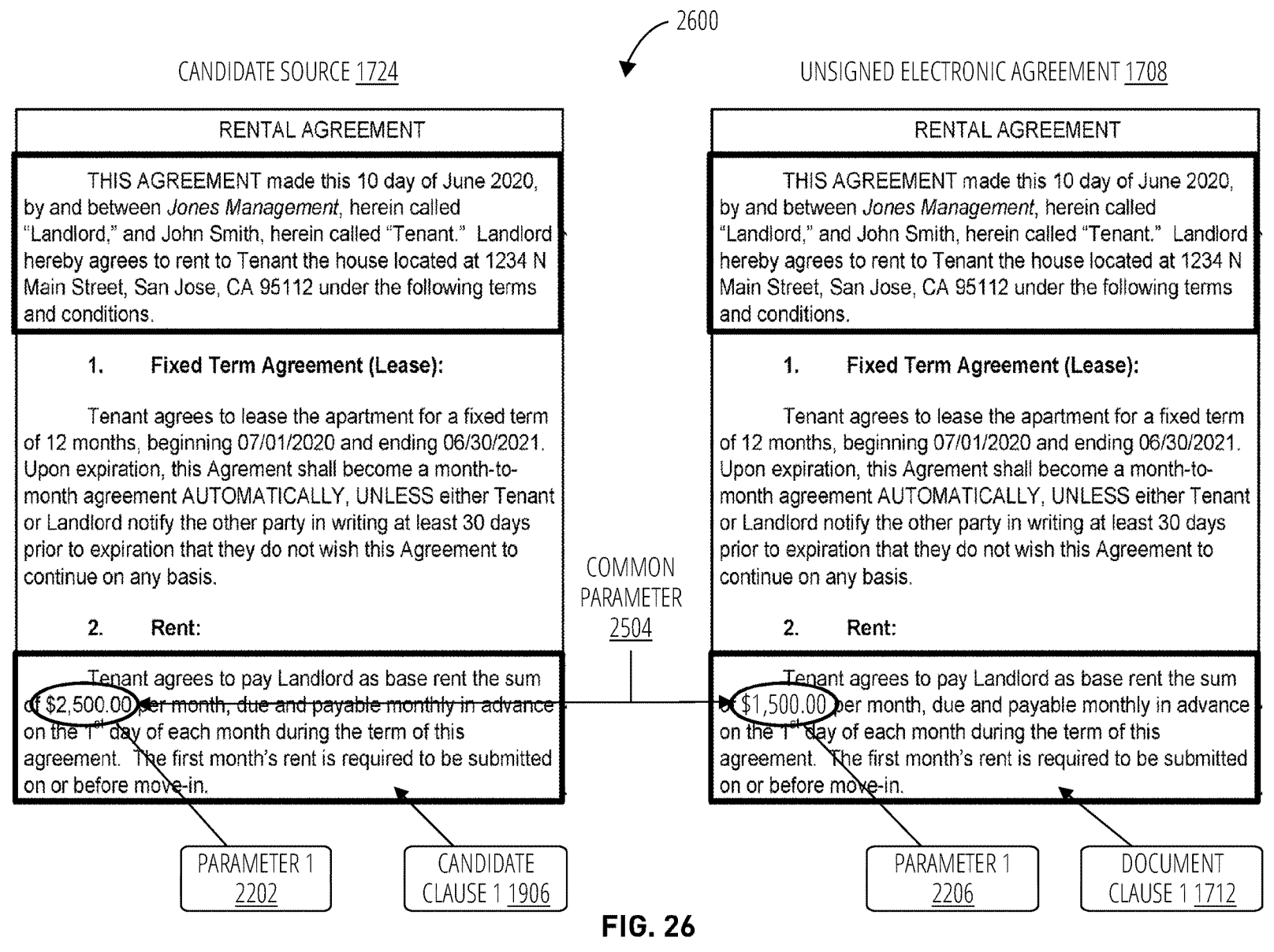

CANDIDATE SOURCE 1724

RENTAL AGREEMENT

THIS AGREEMENT made this 10 day of June 2020, by and between *Jones Management*, herein called "Landlord," and John Smith, herein called "Tenant." Landlord hereby agrees to rent to Tenant the house located at 1234 N Main Street, San Jose, CA 95112 under the following terms and conditions.

1. Fixed Term Agreement (Lease):

Tenant agrees to lease the apartment for a fixed term of 12 months, beginning 07/01/2020 and ending 06/30/2021. Upon expiration, this Agreement shall become a month-to-month agreement AUTOMATICALLY, UNLESS either Tenant or Landlord notify the other party in writing at least 30 days prior to expiration that they do not wish this Agreement to continue on any basis.

2. Rent:

Tenant agrees to pay Landlord as base rent the sum of $2,500.00 per month, due and payable monthly in advance on the 1st day of each month during the term of this agreement. The first month's rent is required to be submitted on or before move-in.

PARAMETER 1 2202

CANDIDATE CLAUSE 1 1906

COMMON PARAMETER 2504

UNSIGNED ELECTRONIC AGREEMENT 1708

RENTAL AGREEMENT

THIS AGREEMENT made this 10 day of June 2020, by and between *Jones Management*, herein called "Landlord," and John Smith, herein called "Tenant." Landlord hereby agrees to rent to Tenant the house located at 1234 N Main Street, San Jose, CA 95112 under the following terms and conditions.

1. Fixed Term Agreement (Lease):

Tenant agrees to lease the apartment for a fixed term of 12 months, beginning 07/01/2020 and ending 06/30/2021. Upon expiration, this Agreement shall become a month-to-month agreement AUTOMATICALLY, UNLESS either Tenant or Landlord notify the other party in writing at least 30 days prior to expiration that they do not wish this Agreement to continue on any basis.

2. Rent:

Tenant agrees to pay Landlord as base rent the sum of $1,500.00 per month, due and payable monthly in advance on the 1st day of each month during the term of this agreement. The first month's rent is required to be submitted on or before move-in.

DOCUMENT CLAUSE 1 1712

PARAMETER 1 2206

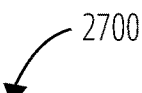

2700

RETRIEVE A DOCUMENT RULE OF A DOCUMENT RULE SET FOR A DEFINED ENTITY FROM A RULES DATABASE 2702

RETRIEVE AN UNSIGNED ELECTRONIC AGREEMENT ASSOCIATED WITH THE DEFINED ENTITY, THE UNSIGNED ELECTRONIC AGREEMENT HAVING ONE OR MORE DOCUMENT CLAUSES 2704

COMPARE A DOCUMENT CLAUSE OF THE UNSIGNED ELECTRONIC AGREEMENT ASSOCIATED WITH THE DEFINED ENTITY WITH THE DOCUMENT RULE WITH A MACHINE LEARNING MODEL 2706

GENERATE AN INSIGHT BASED ON A COMPARISON BETWEEN ONE OR MORE PARAMETERS OF THE DOCUMENT CLAUSE OF THE UNSIGNED ELECTRONIC AGREEMENT ASSOCIATED WITH THE DEFINED ENTITY AND ONE OR MORE PARAMETERS OF THE DOCUMENT RULE 2708

GENERATE A RECOMMENDATION TO REPLACE ONE OR MORE PARAMETERS OF THE DOCUMENT CLAUSE OF THE UNSIGNED ELECTRONIC AGREEMENT ASSOCIATED WITH THE DEFINED ENTITY WITH ONE OR MORE PARAMETERS OF THE DOCUMENT RULE 2710

FIG. 27

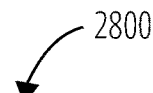

2800

DETERMINE AN UNSIGNED ELECTRONIC AGREEMENT IS A FIRST DOCUMENT VERSION OF THE UNSIGNED ELECTRONIC AGREEMENT AND A CANDIDATE SOURCE IS A SECOND DOCUMENT VERSION OF THE UNSIGNED ELECTRONIC AGREEMENT 2802

IDENTIFY MULTIPLE SETS OF RELATED DOCUMENT CLAUSES BETWEEN THE FIRST DOCUMENT VERSION AND THE SECOND DOCUMENT VERSION USING A MACHINE LEARNING MODEL 2804

IDENTIFY A SET OF COMMON PARAMETERS SHARED BETWEEN EACH SET OF RELATED DOCUMENT CLAUSES USING THE MACHINE LEARNING MODEL, ANALYZING THE SETS OF COMMON PARAMETERS FOR FORMAL DEVIATIONS BETWEEN THE COMMON PARAMETER 2806

GENERATE AN INSIGHT BASED ON THE FORMAL DEVIATIONS USING THE NLG MODEL, THE INSIGHT TO DESCRIBE THE FORMAL DEVIATIONS IN A NATURAL LANGUAGE REPRESENTATION, THE INSIGHT TO COMPRISE A TEXT SUMMARY OF THE FORMAL DEVIATIONS USING A TEXT SUMMARIZATION ALGORITHM. 2808

FIG. 28

Figure 31:
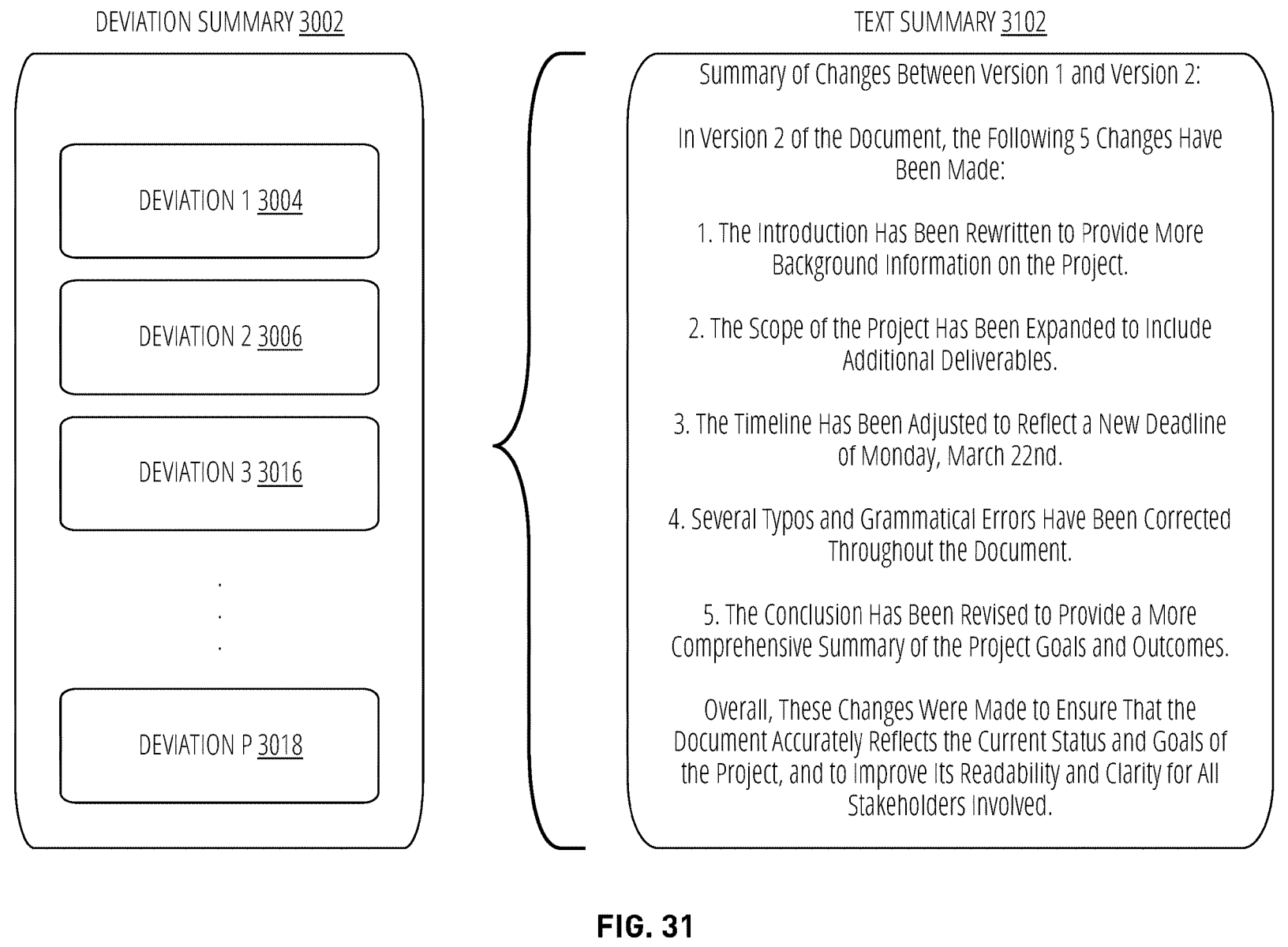

TEXT SUMMARY 3102

Summary of Changes Between Version 1 and Version 2:

In Version 2 of the Document, the Following 5 Changes Have Been Made:

1. The Introduction Has Been Rewritten to Provide More Background Information on the Project.

2. The Scope of the Project Has Been Expanded to Include Additional Deliverables.

3. The Timeline Has Been Adjusted to Reflect a New Deadline of Monday, March 22nd.

4. Several Typos and Grammatical Errors Have Been Corrected Throughout the Document.

5. The Conclusion Has Been Revised to Provide a More Comprehensive Summary of the Project Goals and Outcomes.

Overall, These Changes Were Made to Ensure That the Document Accurately Reflects the Current Status and Goals of the Project, and to Improve Its Readability and Clarity for All Stakeholders Involved.

DEVIATION SUMMARY 3002

DEVIATION 1 3004

DEVIATION 2 3006

DEVIATION 3 3016

. . .

DEVIATION P 3018

COMPUTER-READABLE STORAGE MEDIUM 3302

COMPUTER EXECUTABLE
INSTRUCTIONS 3304

GENERATIVE ARTIFICIAL INTELLIGENCE PLATFORM TO MANAGE SMART DOCUMENTS

CROSS REFERENCE TO RELATED APPLICATIONS

This application is related to U.S. patent application Ser. No. 18/129,194, filed Mar. 31, 2023, and entitled "AN ARTIFICIAL INTELLIGENCE PLATFORM TO MANAGE A DOCUMENT COLLECTION", The disclosure of which is incorporated herein by reference in its entirety.

BACKGROUND

An electronic document management platform allows organizations to manage a growing collection of electronic documents, such as electronic agreements. An electronic agreement may be tagged with a visual element for receiving an electronic signature. An electronic signature is data that is logically associated with other data and used by a signatory to sign the associated data. This type of signature has a same legal standing as a handwritten signature as long as it adheres to certain regulatory requirements. While regulatory requirements may vary based on a given jurisdiction, an electronic signature typically has one or more of the following properties: (1) a signatory is uniquely identified and linked to an electronic signature; (2) the signatory has sole control of any cryptographic credentials used to create the electronic signature; (3) the electronic signature identifies when associated data is modified after signing; and (4) the electronic signature becomes invalid when associated data is modified after signing.

It is worthy to note that electronic signatures are different from digital signatures. An electronic signature is intended to provide a secure and accurate identification method for a signatory during a transaction. A digital signature is a cryptographic scheme for verifying authenticity of digital messages or documents. Digital signatures are often used to implement electronic signatures to increase security. However, not all electronic signatures use digital signatures.

Due to constantly evolving legal and technical requirements imposed on electronic documents, an entire ecosystem of processes, devices, systems and networks continuously evolve around the safe and secure generation, delivery, management and storage of electronic documents.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates signed electronic documents 526 in accordance with one embodiment.

FIG. 13 illustrates a logic flow 1300 in accordance with one embodiment.

FIG. 14 illustrates a logic flow 1400 in accordance with one embodiment.

FIG. 16 illustrates a logic flow 1600 in accordance with one embodiment.

FIG. 26 illustrates an operating environment 2600 in accordance with one embodiment.

FIG. 27 illustrates a logic flow 2700 in accordance with one embodiment.

FIG. 28 illustrates a logic flow 2800 in accordance with one embodiment.

FIG. 31 illustrates a text summary 3102 in accordance with one embodiment.

DETAILED DESCRIPTION

Figure 1:
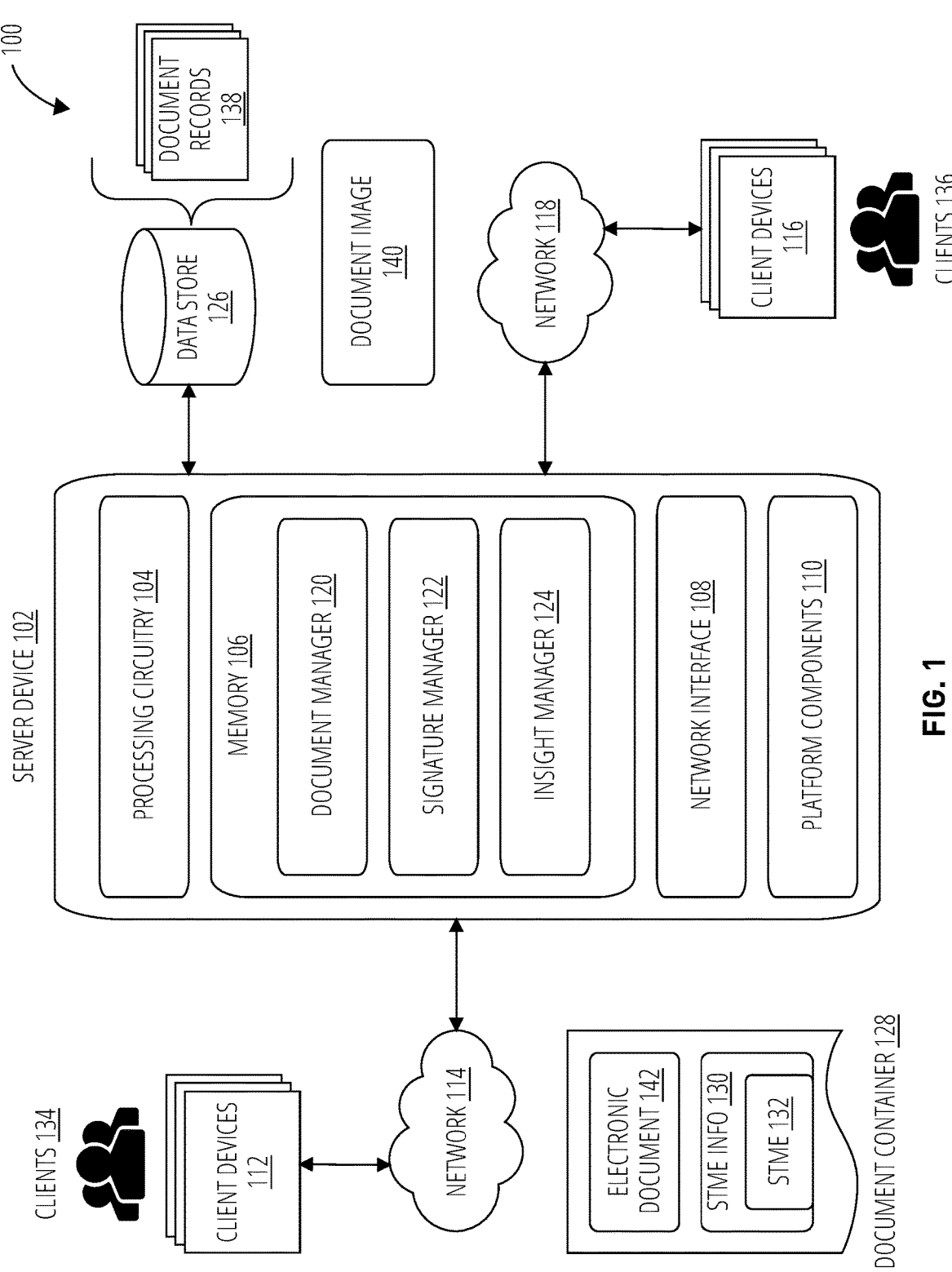
FIG. 1 illustrates a system 100 in accordance with one embodiment.

Embodiments disclosed herein are generally directed to techniques for managing a collection of electronic documents within a document management environment. In general, a document may comprise a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An electronic document management system provides a host of different benefits to users (e.g., a client or customer) of the system. One advantage is added convenience in generating and signing an electronic document, such as a legally-binding agreement. Parties to an agreement can review, revise and sign the agreement from anywhere around the world on a multitude of electronic devices, such as computers, tablets and smartphones. This advantage, while valuable, is primarily a procedural one. However, agreements have a strategic component as well. Negotiations between parties, as memorialized by an electronic agreement, is typically a process that is outside the traditional domain of an electronic document management system.

Successful negotiations depend, at least in part, on strategic information. Superior information may lead to more successful outcomes. An electronic document management system may store and manage a large dataset of carefully negotiated and curated agreements previously executed between different parties. This store of information may contain valuable insights regarding how best to negotiate an agreement, such as historical data on companies, buyers, sellers, products, services, licenses, agreement terms and provisions, best practices, costs, revenue, payments, term limits, and a host of other data that may help shape future negotiations between parties. Consequently, an electronic document management system may have volumes of strategic information that may assist in successfully negotiating an agreement between parties. Tapping into this large dataset of information, however, is tedious and cumbersome for a human being. It may involve skimming hundreds if not thousands of previous agreements to find useful nuggets of information. Electronic searching may help but is ultimately limited by search terms and search algorithms. Accordingly, a significant opportunity exists to substantially improve an electronic document management system by offering tools that allow a user or software agent to mine large datasets accessible to the system using artificial intelligence (AI) and machine learning (ML) techniques.

Embodiments are generally directed to AI/ML techniques to improve management of information in an electronic document management system. Some embodiments are particularly directed to using AI/ML techniques to automatically search for certain types of information contained within electronic documents stored by an electronic document management system. In one embodiment, for example, AI/ML techniques are used to automatically search for information from a document corpus of electronic documents, such as electronic documents with an electronic signature ("signed electronic documents") and electronic documents without an electronic signature ("unsigned electronic documents"), to construct a "playbook" for an entity, such as a customer or client of the electronic document management company. The playbook may be used for many purposes, such as a strategy template to negotiate future agreements between parties.

In a business or organizational context, a playbook is a documented set of procedures or guidelines for carrying out specific tasks or processes. Playbooks typically outline a step-by-step process for handling specific scenarios or situations, with the aim of ensuring consistency, accuracy, and efficiency in execution. Playbooks can be used in various contexts, such as crisis management, information technology (IT) operations, sales and marketing, project management, and customer service. For example, an IT operations playbook may contain procedures for handling network outages, software updates, security incidents, or other technical issues. A sales and marketing playbook may contain guidelines for lead generation, lead qualification, sales messaging, and customer engagement. The contents and format of a playbook can vary depending on the specific needs and goals of the organization, but generally, a playbook includes clear instructions, decision trees, best practices, and tips for handling different scenarios. Playbooks may also include templates, checklists, and other tools to facilitate execution of agreements.

The AI/ML techniques are designed to mine the document corpus to identify and extract similar types of information, sometimes referred to herein as "information blocks." The document corpus may include signed electronic documents and unsigned electronic documents associated with a defined entity, such as agreements or contracts for a customer, business or organization. The electronic documents may comprise various multimedia components, such as written text, spoken text, audio, images, videos, web content, animations, and so forth. The AI/ML techniques may identify similar information blocks in different electronic documents associated with a defined entity, generate a set of related information blocks from the identified information blocks, and store the related information blocks in a database. The AI/ML techniques may analyze sets of related information blocks, and generate one or more document rules to build a playbook or strategy template associated with the defined entity. The document rules may be used to assist in generating or updating new electronic documents for the defined entity to ensure the new documents are in compliance with standard terminology, clauses, terms or strategies historically used by an organization (e.g., a playbook), an industry (e.g., Software As A Service), a customer, a technology, and other logical divisions. New or existing documents rules may be created, revised, updated and deleted (CRUD) as new signed electronic documents are added to the document corpus, thereby ensuring the document rules are kept up-to-date with current information and best practices for the defined entity. Other embodiments are described and claimed.

Additionally or alternatively, the AI/ML techniques are designed to implement a generative artificial intelligence (AI) platform that uses a large language module (LLM) to assist in contract management. The generative AI may provide a summary of deviations between: (1) versions of an electronic document; or (2) between a version of an electronic document and a standard document used by an organization (e.g., a playbook), an industry (e.g., Software As A Service), a customer, a technology, and other logical divisions. The generative AI may recommend suggestions for generating or modifying an electronic document based on the summary of deviations. For example, if two versions of an agreement have multiple changes throughout the versions, the generative AI may provide a summary of the changes. The summary may ensure changes are not missed and actionable, which is particularly useful for large documents with multiple revisions, typically found in the legal industry. In another example, if a version of an agreement is different from a standard agreement, the generative AI may provide a summary of the differences. The generative AI may suggest changes based on the differences. For instance, if a company has written the last 100 sales contracts with a standard 1 year term, and a current version of an electronic agreement includes a 5 year term, the generative AI will flag the 5 year term and suggest the standard 1 year term. Other embodiments are described and claimed.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by Docu-Sign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMA, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

As depicted in FIG. 1, the system 100 may comprise a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 34:
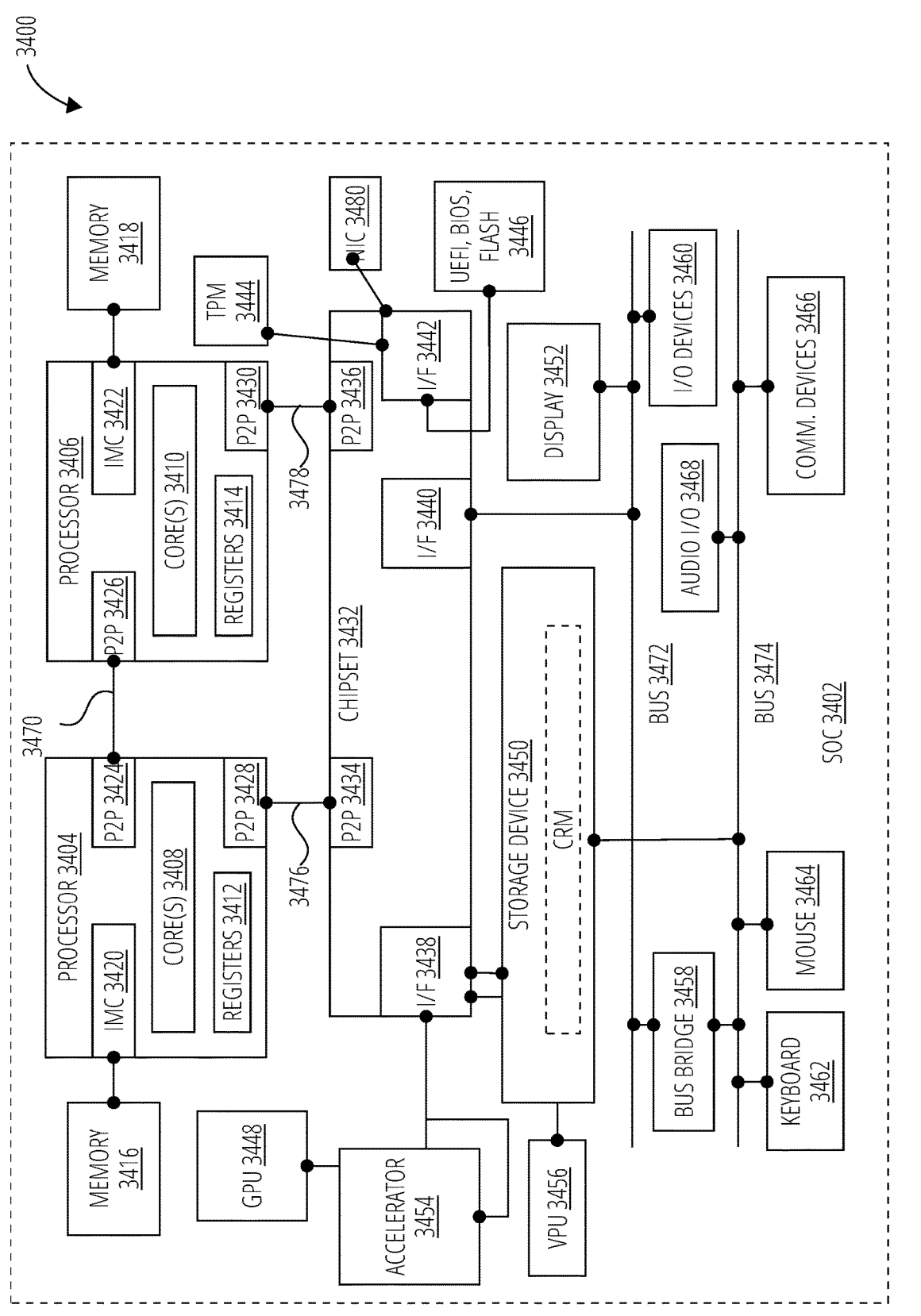
FIG. 34 illustrates a computing architecture 3400 in accordance with one embodiment.

In various embodiments, the server device 102 may comprise various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 3400 as depicted in FIG. 34.

Figure 35:
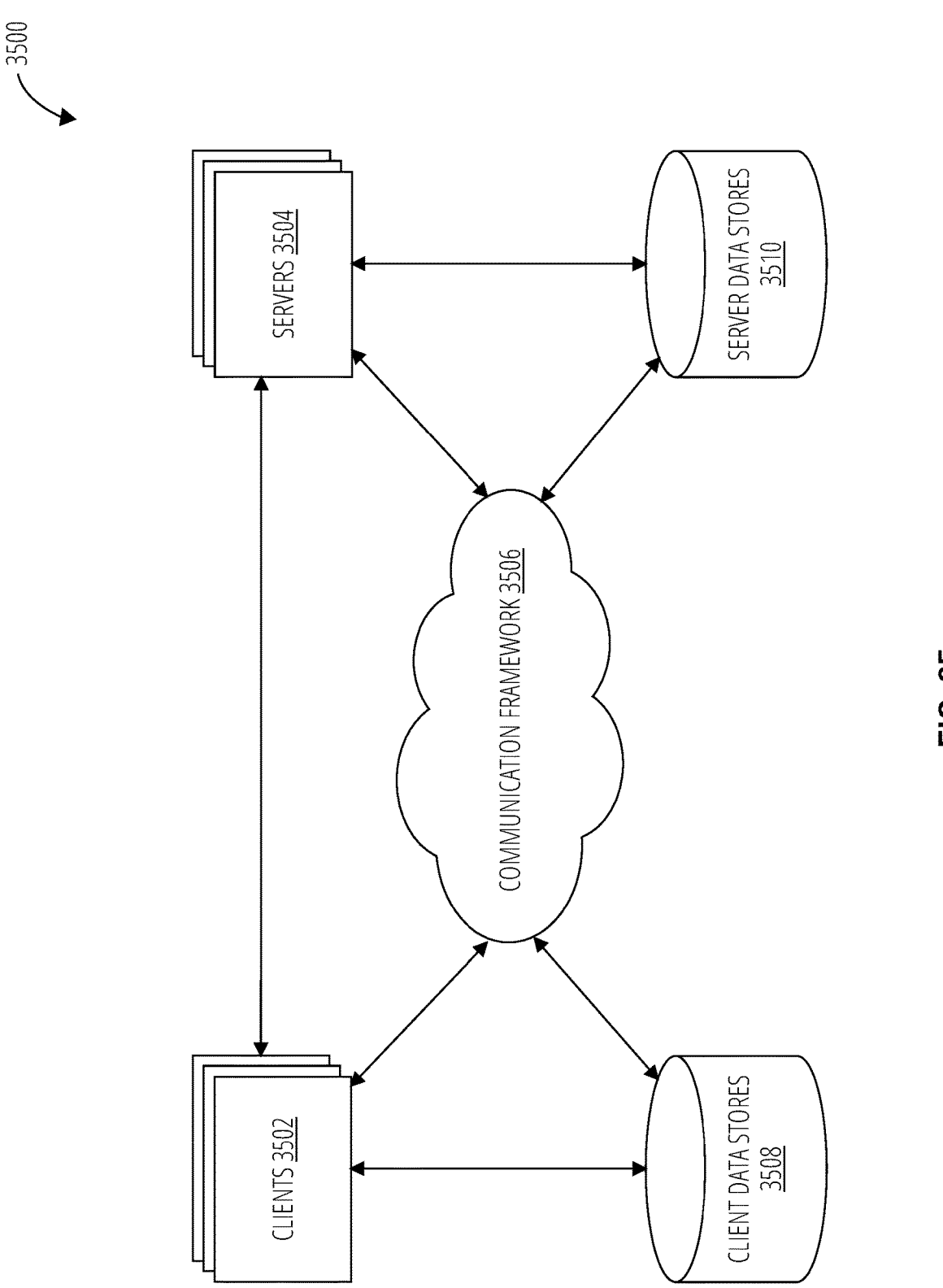
FIG. 35 illustrates a communications architecture 3500 in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 3500 as depicted in FIG. 35.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may comprise a document manager 120, a signature manager 122, and an insight manager 124, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more work flows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may comprise one or more STME 132, which are graphical user interface (GUI) elements superimposed on the electronic document 142. The GUI elements may comprise textual elements, visual elements, auditory elements, tactile elements, and so forth. In one embodiment, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and work flows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes a electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140, and send the signed document image 140 to the server device 102 for verification, recordation, and storage.

Figure 3:
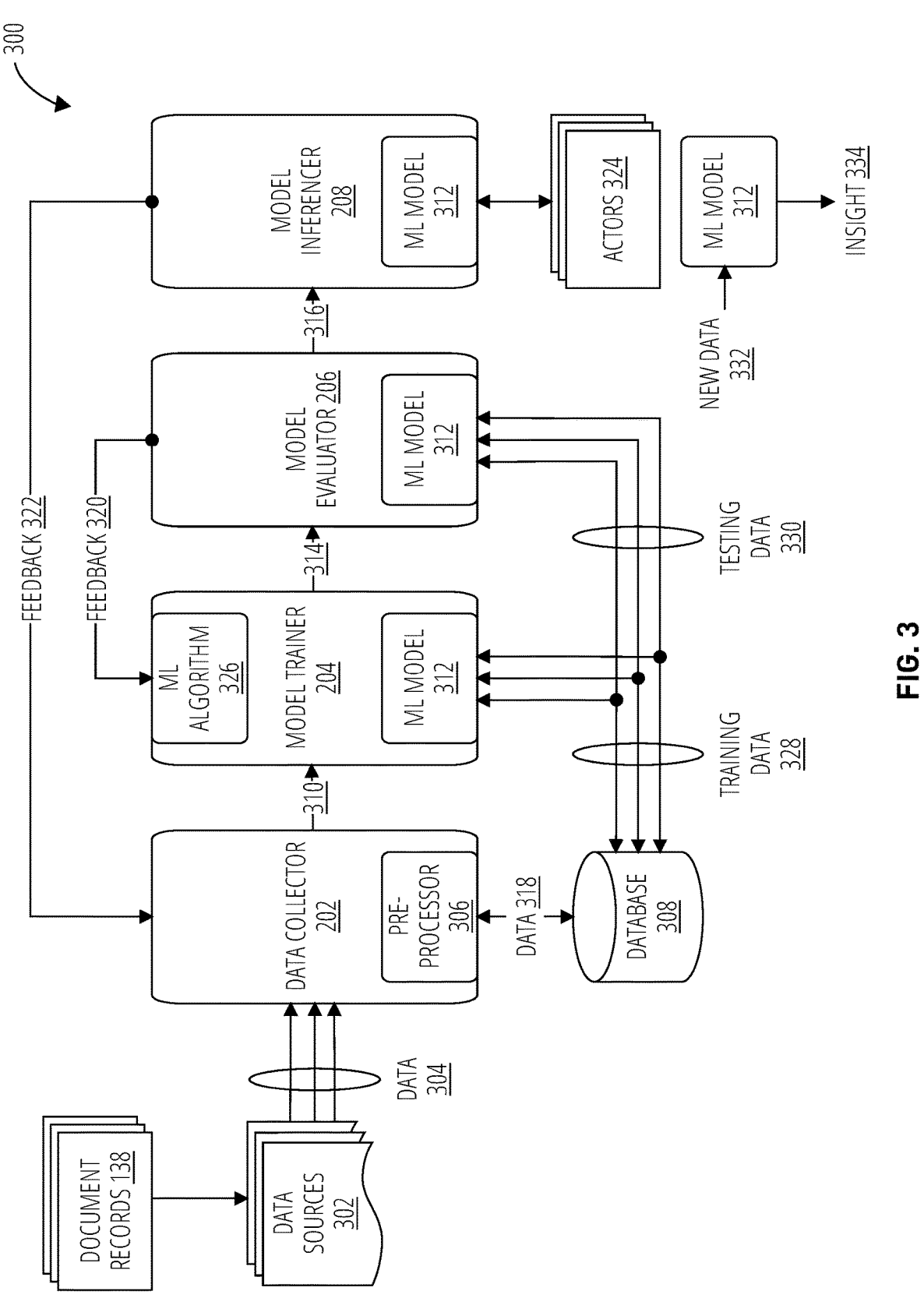
FIG. 3 illustrates an artificial intelligence architecture 300 in accordance with one embodiment.

The Insight manager 124 may generally manage artificial intelligence (AI) and machine learning (ML) agents to assist in various operational tasks for the EDMP of the system 100. The insight manager 124, and associated software elements, are described in more detail with reference to an artificial intelligence architecture 300 as depicted in FIG. 3. The insight manager 124, and associated hardware elements, are described in more detail with reference to a computing architecture 3400 as depicted in FIG. 34.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the signed electronic documents 526 with tools, applications, and work flows developed by DocuSign. For example, the signed electronic documents 526 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more work flows developed by Adobe Systems Incorporated. The STME 132 input may be received from and generated by work flows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally-written document, a modification of a previous electronic document, or from a document template with predefined information content.

When the client 134 is part of an organization or entity, such as a company or business, the client 134 may need to adhere to a set of rules, procedures or guidelines ("playbook" or "document rules" or "standard document rules") suggested or mandated by the entity. For instance, if the entity is a real estate company, the real estate company may have document rules that guide and/or provide information content that should be included in a new lease agreement. Examples of a document rule may be a defined term limit for a lease (e.g., such as 1 year, 3 years, 5 years, and so forth), a per seat cost for a SaaS service agreement, arbitration terms and controlling authority for legal agreements, standard set of representations and warranties for a license agreement, identifier for a seller, identifier of a purchaser, purchase items, payment terms, late payment penalties and a myriad other legal or business terms, provisions, clauses or requirements. The document rules may be informal rules or formal rules. Informal rules are rules defining a particular form of a document, such as spelling, grammar, style, and so forth. Formal rules are rules defining a substance of a document, such as legal terms, accounting terms, financial terms, material terms, and so forth. The document rules may be industry standard or entity standard document rules, and therefore may vary considerably between entities, industries, document types, and so forth.

Generating a set of document rules for a given entity is typically a manual process. An electronic document may store the document rules, which are generated and updated by humans from different sub-entities associated with the entity. For instance, assume a company XYZ has a legal division, a sales division, a leasing division, and a technology division. Further assume the company XYZ creates and manages a set of standard document rules for the entire company XYZ, where the set of standard document rules includes separate sets of document sub-rules for each division. Creating the standard document rules may involve an attorney to generate a document template with standard legal clauses for the entity. A sales manager may update the document template with standard terms for a sales agreement. A lease manager may update the document template with standard terms for lease agreements. An information technology (IT) manager may update the document template with standard terms for vendor agreements. The manual process, which may span across multiple people of varying skill sets and divisions of varying business mandates, may lead to errors in consistently generating, updating and managing a consistent and updated set of document rules for a given entity or sub-entity associated with the entity.

Once a set of document rules for an entity are generated, the client 134 may use a manual process to access the document rules stored in a separate document outside of the electronic document 142. For instance, the client 134 may refer to previous agreements or start a new electronic document 142 from a document template with the document rules. Since drafting a new electronic document 142 is a creative process often including substantive informational content intended to deal with unforeseen or evolving circumstances, the client 134 may knowingly or unknowingly deviate from the document rules. Deviations from informal rules ("informal deviations") may be efficiently captured through an automated process, such as a spell checker or grammar editor for a software tool. Deviations from formal rules ("formal deviations") are inefficiently captured through a manual review process performed by humans, either by the client 134 or by some form of secondary review by another user, such as a supervisor or manager in a same or different department of the entity (e.g., legal department). Since the manual review process is performed by humans, the review is typically a labor intensive and time consuming process involving multiple reviewers, all of whom may fail to identify and capture all formal deviations from a given set of document rules. This is particularly true for longer and more complex multi-page agreements involving lengthy negotiations and multiple revisions by multiple signatory parties over days, months or years.

Conventional online document management systems suffer from several disadvantages associated with the above-described manual review process of electronic documents. For instance, conventional systems rely on a manual process to generate, update and manage a set of document rules for a given entity. In another example, conventional systems rely on a manual process to generate, review and manage a new document for the entity that is consistent with the set of document rules for the given entity. These and other manual processes lead to inefficiencies and sub-optimal performance in creating, revising, updating and deleting (CRUD) operations associated with management of electronic documents for an online document management system. This results in inefficient use of compute, memory and communications resources associated with online document management systems, which are particularly exacerbated in large-scale deployment of data centers, server farms and cloud computing architectures to support wide-scale (e.g., worldwide) adoption and use of online document management systems.

In an attempt to solve these and other challenges, embodiments may implement AI/ML techniques designed to mine the document corpus to identify and extract similar types of information, sometimes referred to herein as "information blocks." The document corpus may include signed electronic documents and unsigned electronic documents associated with a defined entity, such as agreements or contracts for a customer, business or organization. The electronic documents may comprise various multimedia components, such as written text, spoken text, audio, images, videos, web content, animations, and so forth. The AI/ML techniques may identify similar information blocks in different electronic documents associated with a defined entity, generate a set of related information blocks from the identified information blocks, and store the related information blocks in a database. The AI/ML techniques may analyze sets of related information blocks, and generate one or more document rules to build a playbook or strategy template associated with the defined entity. The document rules may be used to assist in generating or updating new electronic documents for the defined entity to ensure the new documents are in compliance with standard terminology, clauses, terms or strategies historically used by an organization (e.g., a playbook), an industry (e.g., Software As A Service), a customer, a technology, and other logical divisions. New or existing documents rules may be created, revised, updated and deleted (CRUD) as new signed electronic documents are added to the document corpus, thereby ensuring the document rules are kept up-to-date with current information and best practices for the defined entity.

The system 100 may implement automated document management processes and workflows using AI/ML techniques for managing and mining a document corpus of electronic documents, such as signed electronic documents, to identify and extract similar types of information. In a large-scale deployment of the system 100, an entity such as a company may build a relatively large and ever growing collection of electronic documents composed of multiple document types generated across multiple divisions or business units of the company. The entity may build a document corpus over time that is filled with electronic documents that are curated, negotiated and customized to its business, customers, processes, strategies, best practices, products, services, and so forth. The document management processes of the system 100 results in an entity document corpus that contains valuable and proprietary entity information. An AI/ML algorithm can use the collection of entity information to process, train, evaluate and deploy ML models customized for the entity to perform various document management tasks on behalf of the entity.

In one embodiment, for example, AI/ML techniques may identify similar information blocks in different signed electronic documents, generate related information blocks from the identified information blocks, and store the related information blocks in an entity database. The information blocks may contain information such as historical data on companies, buyers, sellers, products, services, licenses, agreement terms and provisions, best practices, costs, revenue, payments, term limits, and a host of other data that may help shape future negotiations between parties. The related information blocks may be used to build a set of document rules associated with a defined entity. The document rules may be used to assist in generating, reviewing, updating or otherwise managing new documents for the defined entity to ensure the new documents include standard terminology, clauses, terms or strategies historically used by an organization (e.g., a playbook), an industry (e.g., Software As A Service), a customer, a technology, and other logical divisions. For instance, the system 100 may be used to generate a new lease agreement that is analyzed by a software tool powered by the document rules for a large document corpus of previously negotiated and signed lease agreements for a leasing company, thereby ensuring the new lease agreement is consistent with historical and trending best practices for the leasing company. New or existing documents rules may be created, revised, updated and deleted (CRUD) as new signed electronic documents are added to the document corpus, thereby ensuring the document rules are kept up-to-date with current information and best practices for the defined entity.

Figure 2:
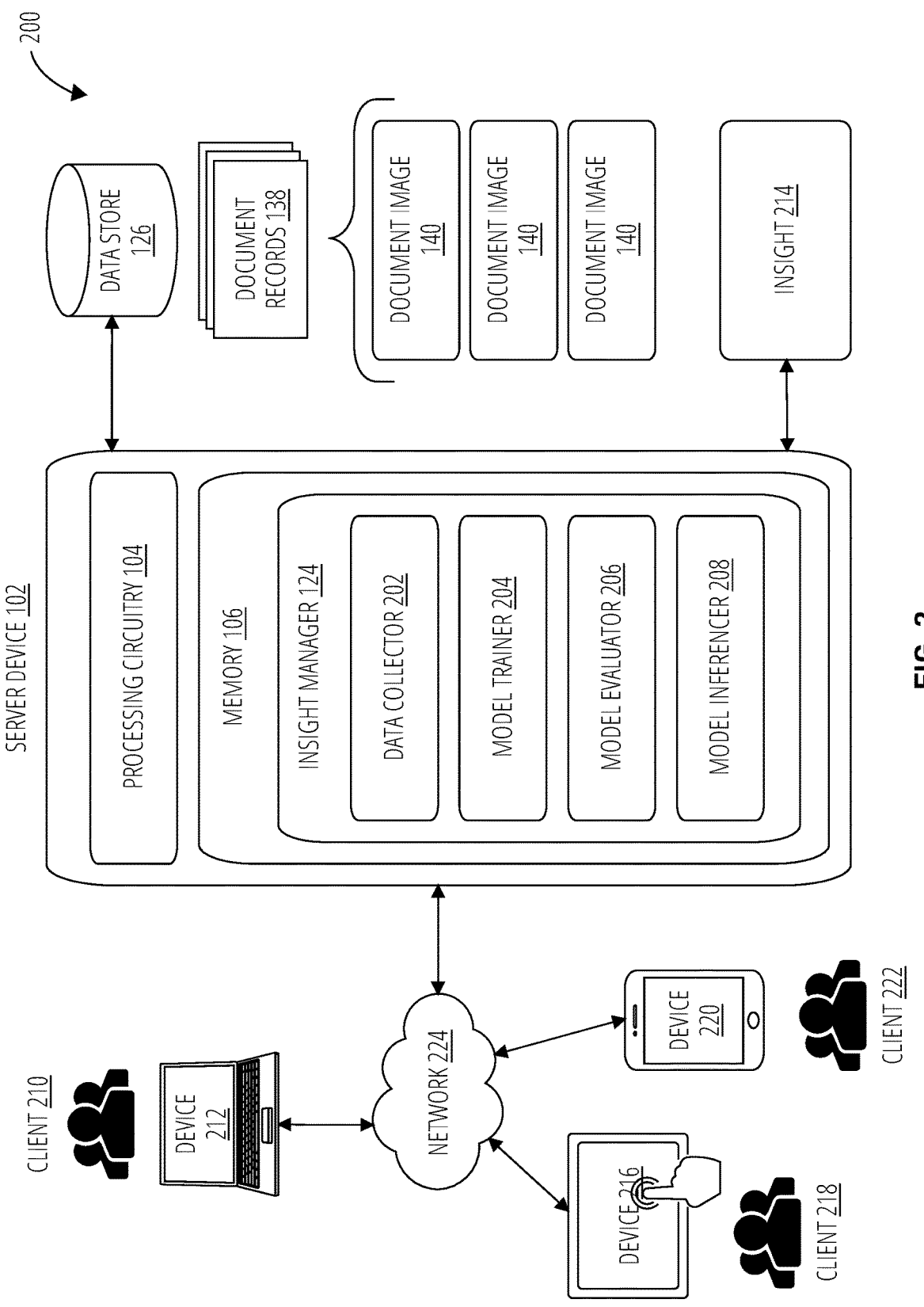
FIG. 2 illustrates a system 200 in accordance with one embodiment.

FIG. 2 illustrates a system 200. The system 200 is similar to the system 100, and further includes different clients such as client 210, client 218 and client 222 using different electronic devices such as device 212, device 216 and device 220, respectively, to communicate with the server device 102 via a network 224. The network 224 may comprise a private network, such as a company intranet, or a public network, such as the Internet and World Wide Web (WWW). The network 224 may be implemented using various wired and wireless technologies and network topologies, such as those suitable for a cloud computing environment, for example.

The server device 102 may implement, among other components, an insight manager 124. The insight manager 124 may implement various AI/ML algorithms to implement AI/ML operations for the server device 102, such as in support of operations for the document manager 120 and/or the signature manager 122 of the server device 102 as shown in FIG. 1. The insight manager 124 may intelligently analyze an electronic document 142, such as electronic agreements, using the AI/ML algorithms and models to better understand informational content of the electronic document 142 and generate strategic insights 214. For instance, the insight manager 124 may uncover risks and hidden opportunities with signed electronic document or unsigned electronic documents. The insight manager 124 may use a combination of AI technologies-including natural language processing (NLP), machine learning and rules-based logic, to help find, filter and analyze agreements across an entity, organization or industry. For instance, the insight manager 124 may generate insights 214 that put contract data to work by equipping business systems to extract contract data and analysis results, reduce operational risks by ensuring agreements and negotiation processes adhere to legal and business policies, streamline compliance by automating standardized compliance analysis and reporting, and other data-based insights generated on business data.

In particular, the insight manager 124 may deploy AI/ML algorithms to extract common information blocks comprising key terms, phrases, clauses or sections across an entire document corpus for a defined entity. Further, the common information blocks can include common parameters. The common information blocks and/or common parameters can be used to automatically generate and/or update a set of standard document rules associated with the defined entity. The set of standard document rules can be automatically applied to a new unsigned electronic document during a pre-execution stage of an agreement process. For example, the document manager 120 may include an analyzer add-on tool that alerts a user when an unsigned electronic document includes a formal deviation from the set of standard document rules, and recommends pre-approved language from the set of standard document rules for potential replacement of the information generating the alert.

As depicted in FIG. 2, the insight manager 124 may comprise various software components to support AI/ML techniques, such as a data collector 202, a model trainer 204, a model evaluator 206 and a model inferencer 208. In general, the data collector 202 collects data from one or more document records 138 each comprising one or more document images 140. The document images 140 may comprise signed electronic documents or unsigned electronic documents. In some cases, the document images 140 may need to be converted between data formats for the data collection phase, such as between a PDF image to a text file, for example. The model trainer 204 receives as input the collected data and processes a portion of the collected data by an AI/ML algorithm to train a ML model. The model evaluator 206 evaluates and improves the trained ML model. The model inferencer 208 implements the trained ML model to receive as input new data, generate one or more insights 214 on the new data, and output a result such as a document rule, an alert, a recommendation or other post-solution activity. The insight manager 124 and underlying components are described in more detail with reference to FIG. 3.

FIG. 3 illustrates an artificial intelligence architecture 300 suitable for use by the insight manager 124 of the server device 102. The artificial intelligence architecture 300 is an example of a system suitable for implementing various artificial intelligence (AI) techniques and/or machine learning (ML) techniques to perform various document management tasks on behalf of the various devices of the systems 100, 200. AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 300 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 312, evaluate performance of the trained ML model 312, and deploy the tested ML model 312 in a production environment, and continuously monitor and maintain it.

The ML model 312 is a mathematical construct used to predict outcomes based on a set of input data. The ML model 312 is trained using large volumes of training data 328, and it can recognize patterns and trends in the training data 328 to make accurate predictions. The ML model 312 may be derived from an ML algorithm 326 (e.g., a neural network, decision tree, support vector machine, etc.). A data set is fed into the ML algorithm 326 which trains an ML model 312 to "learn" a function that produces mappings between a set of inputs and a set of outputs with a reasonably high accuracy. Given a sufficiently large enough set of inputs and outputs, the ML algorithm 326 finds the function for you. And this function may even be able to produce the correct output for input that it has not seen during training. The programmer (who has now earned the snazzy title of "data scientist") prepares the mappings, selects and tunes the machine learning algorithm, and evaluates the resulting model's performance. Once the model is sufficiently accurate on test data, it can be deployed for production use.

The ML algorithm 326 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 326 of the artificial intelligence architecture 300 may be implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 3, the artificial intelligence architecture 300 includes a set of data sources 302 to source data 304 for the artificial intelligence architecture 300. Data sources 302 may comprise any device capable generating, processing, storing or managing data 304 suitable for a ML system. Examples of data sources 302 include without limitation databases, web scraping, sensors and Internet of Things (IoT) devices, image and video cameras, audio devices, text generators, publicly available databases, private databases, and many other data sources 302. The data sources 302 may be remote from the artificial intelligence architecture 300 and accessed via a network, local to the artificial intelligence architecture 300 an accessed via a network interface, or may be a combination of local and remote data sources 302.

The data sources 302 may source difference types of data 304. For instance, the data 304 may comprise structured data from relational databases, such as customer profiles, transaction histories, or product inventories. The data 304 may comprise unstructured data from websites such as customer reviews, news articles, social media posts, or product specifications. The data 304 may comprise data from temperature sensors, motion detectors, and smart home appliances. The data 304 may comprise image data from medical images, security footage, or satellite images. The data 304 may comprise audio data from speech recognition, music recognition, or call centers. The data 304 may comprise text data from emails, chat logs, customer feedback, news articles or social media posts. The data 304 may comprise publicly available datasets such as those from government agencies, academic institutions, or research organizations. These are just a few examples of the many sources of data that can be used for ML systems. It is important to note that the quality and quantity of the data is critical for the success of a machine learning project. In one embodiment, for example, the data sources 302 may include the document records 138 managed by the system 100.

The data 304 can be in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 302 may be communicatively coupled to a data collector 202. The data collector 202 gathers relevant data 304 from the data sources 302. Once collected, the data collector 202 may use a pre-processor 306 to make the data 304 suitable for analysis. This involves data cleaning, transformation, and feature engineering. For instance, an electronic document 142 may be converted to text information, and the text information may be converted to word vectors. Data preprocessing is a critical step in ML as it directly impacts the accuracy and effectiveness of the model. The pre-processor 306 may receive the data 304 as input, process the data 304, and output pre-processed data 318 for storage in a database 308. The database 308 may comprise a hard drive, solid state storage, and/or random access memory.

The data collector 202 may be communicatively coupled to a model trainer 204. The model trainer 204 performs AI/ML model training, validation, and testing which may generate model performance metrics as part of the model testing procedure. The model trainer 204 may receive the pre-processed data 318 as input 310 or via the database 308. The model trainer 204 may implement a suitable ML algorithm 326 to train an ML model 312 on a set of training data 328 from the pre-processed data 318. The training process involves feeding the pre-processed data 318 into the ML algorithm 326 to produce or optimize an ML model 312. The training process adjusts its parameters until it achieves an initial level of satisfactory performance.

The model trainer 204 may be communicatively coupled to a model evaluator 206. After an ML model 312 is trained, the ML model 312 needs to be evaluated to assess its performance. This is done using various metrics such as accuracy, precision, recall, and F1 score. The model trainer 204 may output the ML model 312, which is received as input 310 or from the database 308. The model evaluator 206 receives the ML model 312 as input 314, and it initiates an evaluation process to measure performance of the ML model 312. The evaluation process may include providing feedback 320 to the model trainer 204, so that it may re-train the ML model 312 to improve performance in an iterative manner.

The model evaluator 206 may be communicatively coupled to a model inferencer 208. The model inferencer 208 provides AI/ML model inference output (e.g., predictions or decisions). Once the ML model 312 is trained and evaluated, it can be deployed in a production environment where it can be used to make predictions on new data. The model inferencer 208 receives the evaluated ML model 312 as input 316. The model inferencer 208 may use the evaluated ML model 312 to produce insights or predictions on real data, which is deployed as a final production ML model 312. The inference output of the ML model 312 is use case specific. The model inferencer 208 may also perform model monitoring and maintenance, which involves continuously monitoring performance of the insight model 506 in the production environment and making any necessary updates or modifications to maintain its accuracy and effectiveness. The model inferencer 208 may provide feedback 320 to the data collector 202 to train or re-train the ML model 312. The feedback 320 may include model performance feedback information, which may be used for monitoring and improving performance of the ML model 312.

The model inferencer 208 may be implemented by various actors 324 in the artificial intelligence architecture 300, including the insight manager 124 of the server device 102, for example. The actors 324 may use the deployed ML model 312 on new data to make inferences or predictions for a given task, and output an insight 334. The actors 324 may actually implement the model inferencer 208 locally, or may remotely receive outputs from the model inferencer 208 in a distributed computing manner. The actors 324 may trigger actions directed to other entities or to itself. The actors 324 may provide feedback 322 to the data collector 202 via the model inferencer 208. The feedback 322 may comprise data needed to derive training data, inference data or to monitor the performance of the ML model 312 and its impact to the network through updating of key performance indicators (KPIs) and performance counters.

As previously described with reference to FIGS. 1, 2, the systems 100, 200 may implement some or all of the artificial intelligence architecture 300 to support various use cases and solutions for various AI/ML tasks suitable for supporting or automating document management operations. In various embodiments, the artificial intelligence architecture 300 may be implemented by the insight manager 124 of the server device 102 for the systems 100, 200. In one embodiment, for example, the insight manager 124 may implement the artificial intelligence architecture 300 to train and deploy an ML model 312 as a neural network, as described in more detail with reference to FIG. 4. It may be appreciated that other use cases and solutions for AI/ML are possible as well, and embodiments are not limited in this context.

Figure 4:
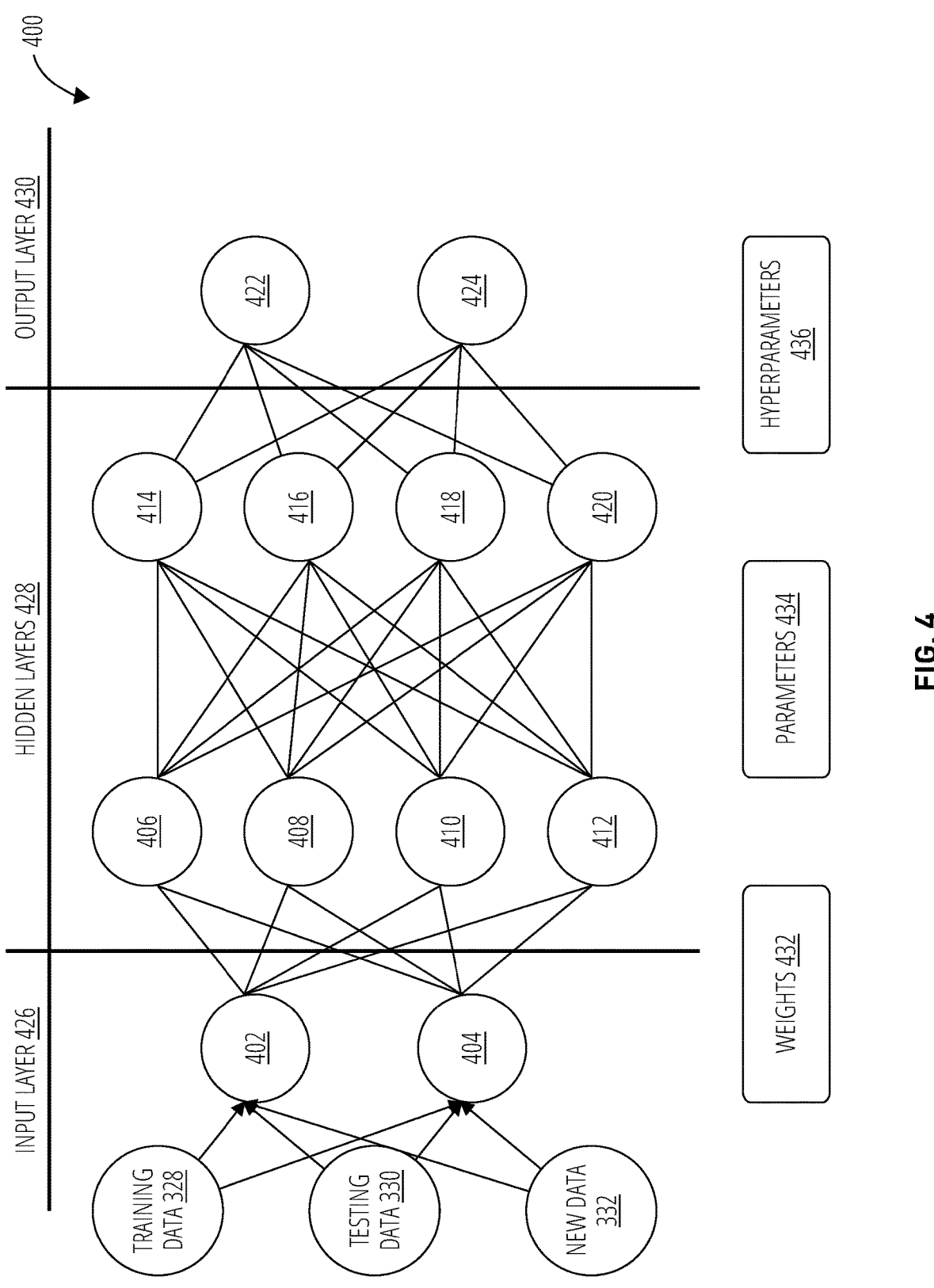
FIG. 4 illustrates an artificial neural network 400 in accordance with one embodiment.

FIG. 4 illustrates an embodiment of an artificial neural network 400. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 400 comprises multiple node layers, containing an input layer 426, one or more hidden layers 428, and an output layer 430. Each layer may comprise one or more nodes, such as nodes 402 to 424. As depicted in FIG. 4, for example, the input layer 426 has nodes 402, 404. The artificial neural network 400 has two hidden layers 428, with a first hidden layer having nodes 406, 408, 410 and 412, and a second hidden layer having nodes 414, 416, 418 and 420. The artificial neural network 400 has an output layer 430 with nodes 422, 424. Each node 402 to 424 may comprise a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 400 relies on training data 328 to learn and improve accuracy over time. However, once the the artificial neural network 400 is fine-tuned for accuracy, and tested on testing data 330, the artificial neural network 400 is ready to classify and cluster new data 332 at a high velocity. Tasks in speech recognition or image recognition can take minutes versus hours when compared to the manual identification by human experts.

Each individual node 402 to 424 is a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \qquad \text{EQUATION (1)}$$

$$\text{output} = f(x) = 1 \text{ if } \sum w1x1 + b >= 0; 0 \text{ if } \sum w1x1 + b < 0$$

Once an input layer 426 is determined, a set of weights 432 are assigned. The weights 432 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 400 as a feedforward network.

In one embodiment, the artificial neural network 400 leverages sigmoid neurons, which are distinguished by having values between 0 and 1. Since the artificial neural network 400 behaves similarly to a decision tree, cascading data from one node to another, having x values between 0 and 1 will reduce the impact of any given change of a single variable on the output of any given node, and subsequently, the output of the artificial neural network 400.

The artificial neural network 400 may have many practical use cases, like image recognition, speech recognition, text recognition or classification. The artificial neural network 400 may leverage supervised learning, or labeled datasets, to train the algorithm. As the model is trained, its accuracy may be measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \to \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 434 of the model adjust to gradually converge at the minimum.

In one embodiment, the artificial neural network 400 is feedforward, meaning it flows in one direction only, from input to output. However, the artificial neural network 400 may also be trained through backpropagation; that is, move in the opposite direction from output to input. Backpropagation allows calculation and attribution of errors associated with each neuron 402 to 424, thereby allowing adjustment to fit the parameters 434 of the model(s) appropriately.

The artificial neural network 400 may be implemented as different neural networks depending on a given task. Neural networks can be classified into different types, which are used for different purposes. The artificial neural network 400 may be implemented as a feedforward neural network, or multi-layer perceptrons (MLPs), comprised of an input layer 426, hidden layers 428, and an output layer 430. While these neural networks are also commonly referred to as MLPs, they are actually comprised of sigmoid neurons, not percep-trons, as most real-world problems are nonlinear. Trained data 304 usually is fed into these models to train them, and they are the foundation for computer vision, natural lan-guage processing, and other neural networks. The artificial neural network 400 may also be implemented as a convo-lutional neural network (CNN). A CNN is similar to feed-forward networks, but usually utilized for image recogni-tion, pattern recognition, and/or computer vision. These networks harness principles from linear algebra, particularly matrix multiplication, to identify patterns within an image. The artificial neural network 400 may further be imple-mented as a recurrent neural network (RNN). A RNN is identified by feedback loops. The RNN learning algorithms are primarily leveraged when using time-series data to make predictions about future outcomes, such as stock market predictions or sales forecasting. The artificial neural network 400 may be implemented as any type of neural network suitable for a given EDMP of system 100, and the MLP, CNN, and RNN are merely a few examples. Embodiments are not limited in this context.

The artificial neural network 400 may have a set of associated parameters 434. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate param-eter, a momentum parameter, a training type parameter, an Epoch parameter, a minimum error parameter, and so forth. The artificial neural network 400 may have other parameters 434 as well. Embodiments are not limited in this context.

In some cases, the artificial neural network 400 may also be implemented as a deep learning neural network. The term deep learning neural network refers to a depth of layers in a given neural network. A neural network that has more than three layers-which would be inclusive of the inputs and the output-can be considered a deep learning algorithm. A neural network that only has two or three layers, however, may be referred to as a basic neural network. A deep learning neural network may tune and optimize one or more hyper-parameters 436. A hyperparameter is a parameter whose values are set before starting the model training process. Deep learning models, including convolutional neural net-work (CNN) and recurrent neural network (RNN) models can have anywhere from a few hyperparameters to a few hundred hyperparameters. The values specified for these hyperparameters can impact the model learning rate and other regulations during the training process as well as final model performance. A deep learning neural network may use hyperparameter optimization algorithms to automati-cally optimize models. The algorithms used include Random Search, Tree-structured Parzen Estimator (TPE) and Bayes-ian optimization based on the Gaussian process. These algorithms are combined with a distributed training engine for quick parallel searching of the optimal hyperparameter values.

Figure 5:
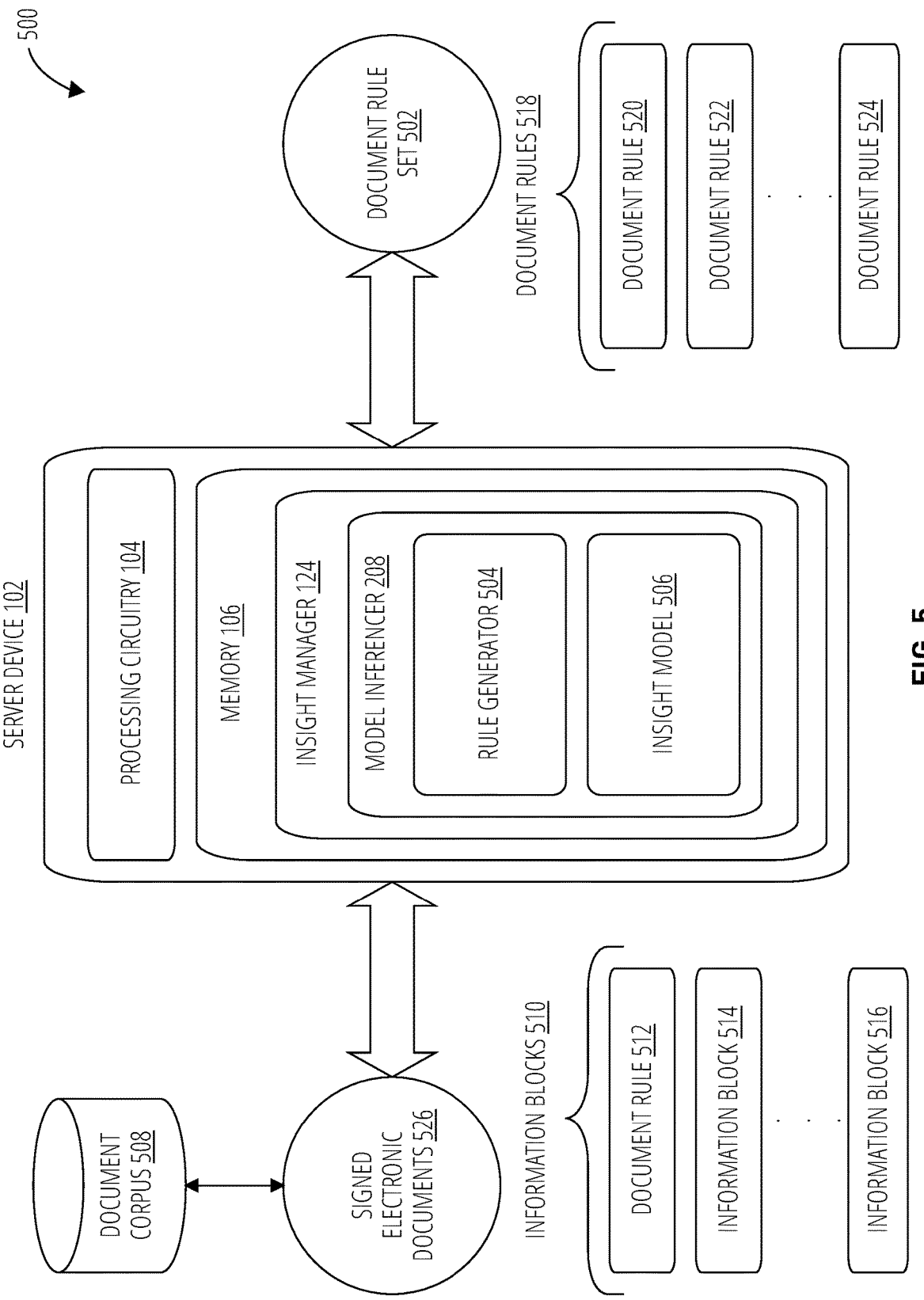
FIG. 5 illustrates an apparatus 500 in accordance with one embodiment.

FIG. 5 illustrates an apparatus 500. The apparatus 500 may comprise an example implementation for the server device 102. The server device 102 may receive as input a collection electronic documents, such as signed electronic documents 526, from a document corpus 508. The document corpus 508 may store document images 140 and/or signed electronic documents 526 stored in the form of document records 138. In some embodiments, the document corpus 508 may be proprietary and confidential in nature and associated with a particular defined entity, such as an indi-vidual, a business, a business unit, a company, an organi-zation, an enterprise, or other defined legal or business structure. The server device 102 may process information from the signed electronic documents 526, and output a document rule set 502 for the defined entity. The document rule set 502 may comprise one or more document rules 518 for the defined entity. The document rule set 502 may be useful as a playbook for generating, analyzing, negotiating or updating a new unsigned electronic document for the defined entity, among other use cases. An example of a new unsigned electronic document may comprise an electronic document that is prepared for execution with an electronic signature by one or more signatories. In one embodiment, for example, an unsigned electronic document may com-prise an electronic agreement that is prepared, circulated, revised and negotiated in a pre-execution stage of an agree-ment process.

In one embodiment, the server device 102 may be imple-mented as a computing apparatus that includes processing circuitry 104. The computing apparatus also includes a memory 106 communicatively coupled to the processing circuitry 104. The memory 106 may store instructions that, when executed by the processing circuitry 104, configure the processing circuitry 104 to retrieve information from a document corpus 508 associated with a defined entity. The document corpus 508 includes a set of document records 138. Each document record 138 may include a signed electronic document 526. Each signed electronic document 526 may include a set of information blocks 510, such as document rule 512, information block 514, information block 516, and so forth. The information blocks 510 may comprise, for example, a defined amount of information contained within a signed electronic document 526, such as n-grams, words, sentences, paragraphs, sections, clauses, snippets, groups, categories, and so forth.

As depicted in FIG. 5, the server device 102 may be an example of an actor 324 that implements the model infer-encer 208 of the insight manager 124. The model inferencer 208 may implement an insight model 506 to perform infer-encing or predictive operations. In one embodiment, the insight model 506 is a specific implementation of a trained ML model 312 tuned for generating insights 214 for a specific document corpus 508. The model inferencer 208 may implement the insight model 506 locally or access the insight model 506 on a remote device in a distributed computing environment. The insight model 506 may be trained using training data 328 from the document corpus 508, evaluated and optimized using testing data 330 from the document corpus 508, and deployed to process new data 332 from the document corpus 508 and output one or more inferences or insights 214.

The model inferencer 208 may include a rule generator 504 and the insight model 506. The rule generator 504 may receive as input a collection of signed electronic documents

526 from the document corpus 508, and process a set of information blocks 510 contained within each of the signed electronic documents 526 using the insight model 506. The rule generator 504 may output a document rule set 502 comprising one or more document rules 518 based on the processed information blocks 510, such as document rule 520, document rule 522 and document rule 524, for example. The information blocks 510 may be labeled information blocks, or may be a feature of the data from the document corpus 508 processed by the pre-processor 306, such as a vector of words, sentences, paragraphs or defined sections of the signed electronic documents 526.

More particularly, the rule generator 504 may identify a set of related information blocks from the information blocks 510 using the insight model 506, where each information block 510 in the set of related information blocks is part of, or originates from, a different signed electronic document 526 of the document corpus 508 associated with a defined entity. The rule generator 504 may identify a set of common parameters shared by a set of related information blocks, and generate a document rule set 502 having one or more document rules 518 based on common parameters shared by the set of related information blocks. The rule generator 504 may store a document rule 520, a document rule 522 and a document rule 524 of the set of document rules 518 as part of a document rule set 502 for the defined entity in a rules database. It may be appreciated that some examples use a limited set of information blocks, set of related information blocks, document rules or document rule sets for purposes of clarity and not limitation. Embodiments are not limited to a particular number and/or type of examples provided herein.

Figure 6:
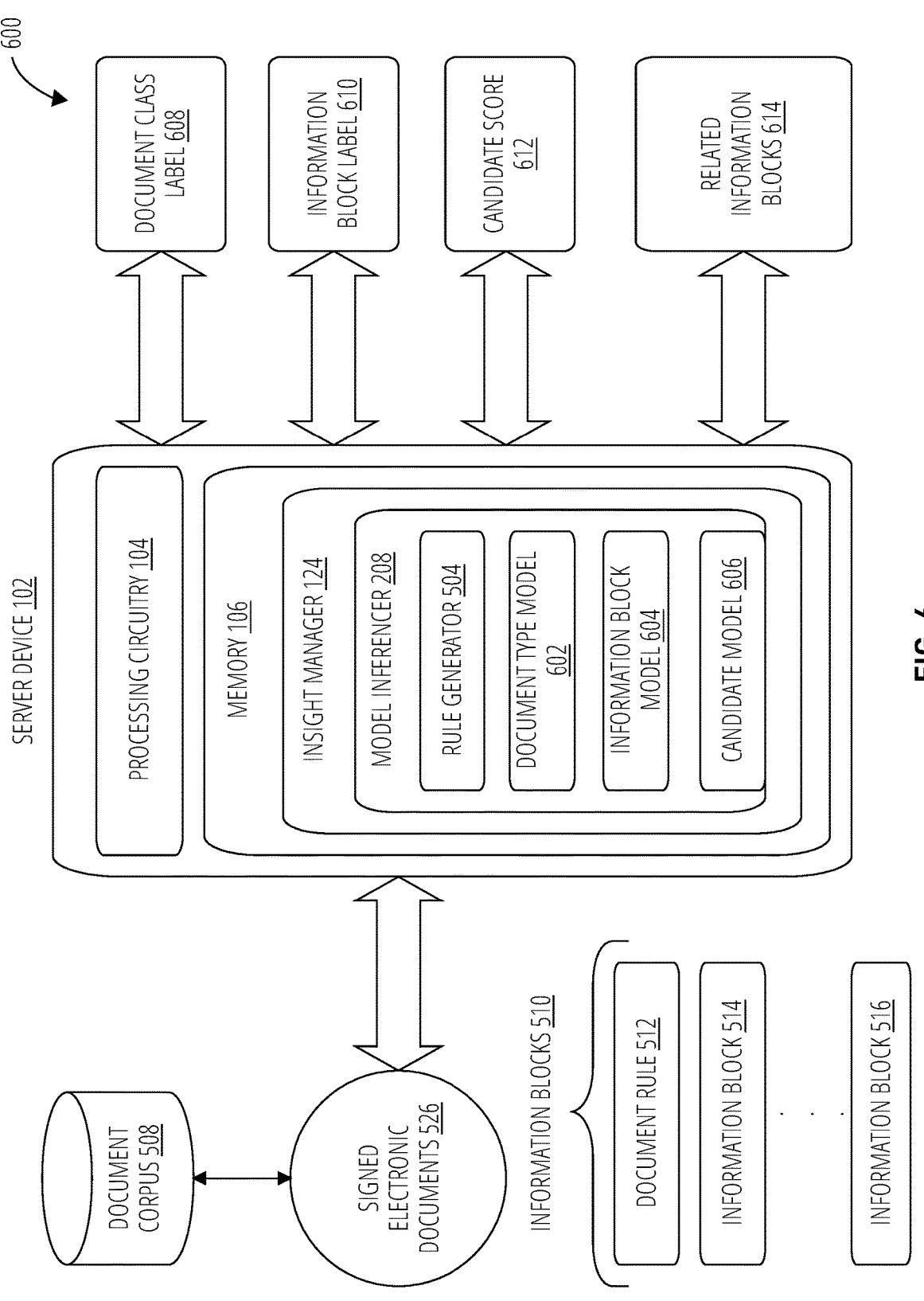
FIG. 6 illustrates an apparatus 600 in accordance with one embodiment.

FIG. 6 illustrates an apparatus 600. The apparatus 600 is similar to the apparatus 500, and further illustrates three example instantiations of ML models 312 suitable for use by or for the insight model 506. A first example of the insight model 506 is a document type model 602. A second example of the insight model 506 is an information block model 604. A third example of the insight model 506 is a candidate model 606. It may be appreciated that the insight model 506 may be implemented with more or less than the three example ML models shown in FIG. 6. Further, it may be appreciated that the three example ML models may be implemented as a single unified ML model, or distributed among more than three ML models, as desired for a given implementation. Embodiments are not limited in this context.

As previously described, the rule generator 504 may identify a set of related information blocks using the insight model 506, where each information block in the set of related information blocks is part of, or originates from, a different signed electronic document 526 of the document corpus 508 associated with a defined entity. For example, the document type model 602 may receive as input the signed electronic documents 526 and output a document class label 608 for each of the signed electronic documents 526. The document class label 608 may represent a document type for the signed electronic document 526, such as a legal agreement, a sales agreement, a vendor agreement, a lease agreement, and so forth. Additionally or alternatively, the document class label 608 may represent an entity or sub-entity, such as a company, business, organization, business unit, subsidiary, division, group or other logical division. Embodiments are not limited to these examples.

The information block model 604 may receive as input information blocks 510 from each of the signed electronic documents 526 and output an information block label 610 for each of the information blocks 510. The information block label 610 may represent a type or content type for information or data contained within an information block 510, such as a semantic meaning, a standard clause, a provision, customer data, buyer information, seller information, product information, service information, licensing information, financial information, cost information, revenue information, profit information, sales information, purchase information, accounting information, milestone information, representations and warranties information, term limits, choice of controlling law, legal clauses, or any other information that is contained within an electronic document and useful for a given entity. Embodiments are not limited in this context.

The candidate model 606 may receive as input the information blocks 510 each having a document class label 608 and an information block label 610, and output a candidate score 612 for the information blocks 510. In some embodiments, the candidate model 606 may use a ranking algorithm to score and rank information blocks 510. One example of a ranking algorithm for a neural network is the RankNet algorithm, which is a pairwise ranking algorithm that learns to predict the relative order of pairs of objects. In RankNet, the neural network takes as input the features of two objects and produces a score that represents the probability that the first object is ranked higher than the second object. The output of the neural network is a real number between 0 and 1, with values closer to 1 indicating a higher probability that the first object is ranked higher than the second object. During training, RankNet learns to minimize the cross-entropy loss between the predicted scores and the true pairwise rankings of the objects in the training data. This is done using gradient descent optimization, where the weights of the neural network are updated iteratively to minimize the loss. Once the RankNet model has been trained, it can be used to predict the ranking of new pairs of objects by inputting their features into the network and computing their corresponding scores. The objects can then be sorted based on their predicted scores to obtain a ranking. RankNet and similar pairwise ranking algorithms have been successfully applied in various domains, such as search engines, recommender systems, and information retrieval, where the goal is to rank items or documents based on their relevance to a user's query or preferences. The candidate model 606 may use any suitable ranking algorithm to generate the candidate scores 612 for information blocks 510. Embodiments are not limited in this context.

The rule generator 504 may compare the candidate scores 612 for the respective information blocks 510, and generate a set of related information blocks 614 based on results of the comparison operations. In some embodiments, a pair of information blocks 510 may be grouped as related information blocks 614 based on a similarity measure. For instance, information blocks 510 from different signed electronic documents 526 having candidate scores 612 within a defined range, such as within 5-10% of a normalized scale from 0-1, may be considered sufficiently related to be considered related information blocks 614. In another example, the candidate score 612 may be used for an undirected weighted graph where each node corresponds to an information block 510 and each edge that connects two nodes has an edge weight set to a candidate score 612 corresponding to a measure of similarity between information blocks 510. Multiple random walk iterations are performed on the undirected weighted graph that results in a ranking of the information blocks 510 by order of relevance. The rule generator 504 may use other ranking, weighting or scoring algorithms to measure similarity between multiple information blocks 510.

In one embodiment, for example, the rule generator 504 may generate and use a similarity score between information blocks 510 to determine whether a pair of information blocks 510 are sufficiently similar to be deemed related information blocks 614. One example of a similarity score between objects for a neural network is the cosine similarity measure. Cosine similarity is a commonly used metric for measuring the similarity between two vectors in a high-dimensional space. In the context of a neural network, the vectors represent the features of two objects, and the cosine similarity measure calculates the cosine of the angle between them. To compute the cosine similarity between two vectors, the dot product of the two vectors is divided by the product of their magnitudes, as shown in Equation (3) as follows:

$$\text{cosine\_similarity} = (A \cdot B)/(\|A\| * \|B\|) \qquad \text{EQUATION (3)}$$

where A and B are the feature vectors of the two objects.

The resulting cosine similarity score is a real number between −1 and 1, where values closer to 1 indicate a higher degree of similarity between the objects, and values closer to −1 indicate a high degree of dissimilarity. Cosine similarity can be used in various domains, such as natural language processing, image processing, and recommender systems, where the goal is to measure the similarity between text, images, or other types of data. In a neural network, cosine similarity can be used as a loss function or evaluation metric during training, or as a similarity score for ranking or clustering objects.

The rule generator 504 may use a given set of related information blocks 614 to generate a document rule, such as document rules 520, 522 or 524, for the document rule set 502. The document rule set 502 may be stored in a database and indexed for future retrieval. The rule generator 504 may generate a document rule, such as document rule 520, based on one or more parameters shared by a set or subset of related information blocks 614, referred to herein as "common parameters" for related information blocks 614, as discussed in more detail below.

Figure 7:
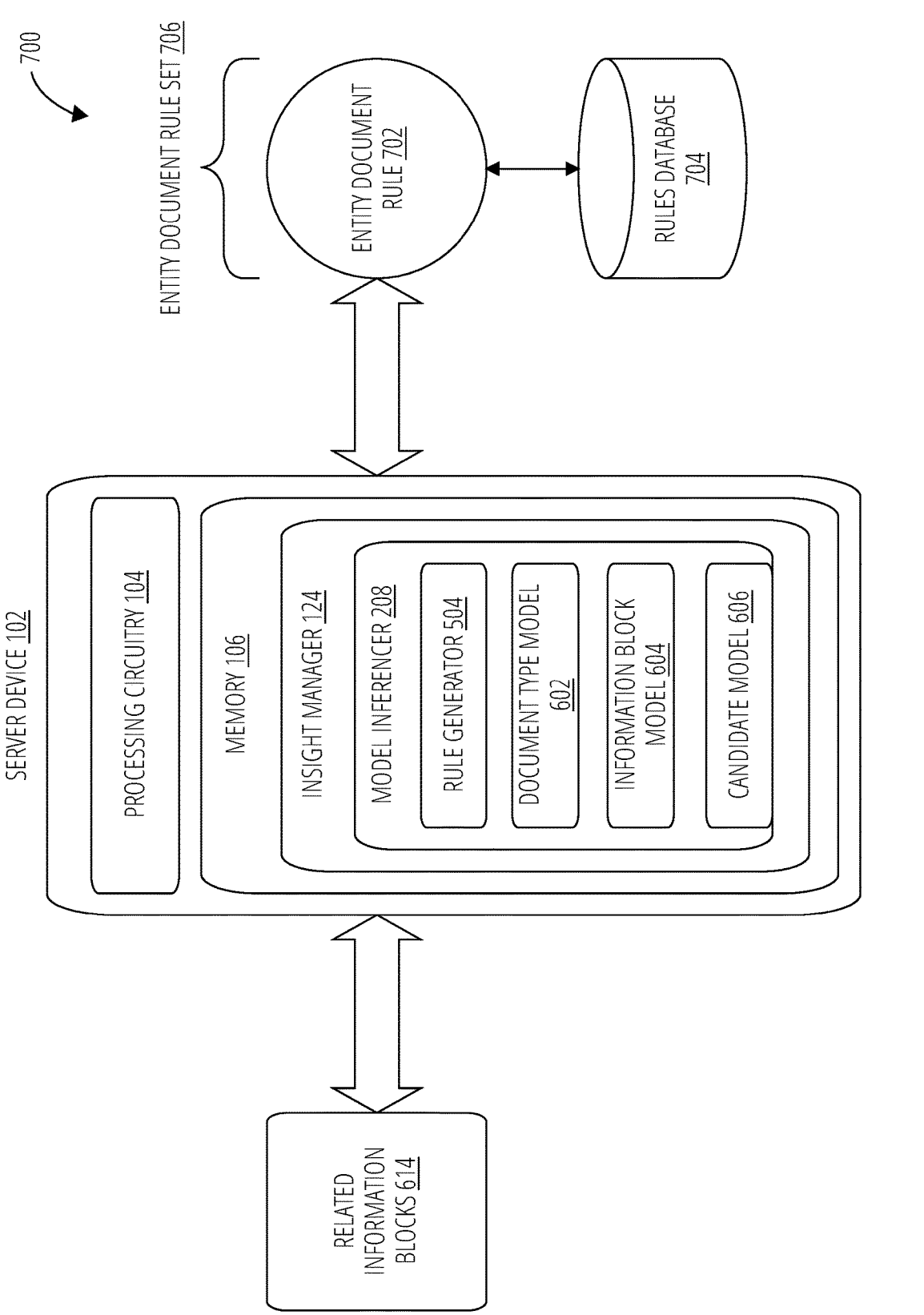
FIG. 7 illustrates an apparatus 700 in accordance with one embodiment.

FIG. 7 illustrates an apparatus 700 suitable for the system 100. The apparatus 700 is similar to the apparatus 500 and the apparatus 600. In addition, the apparatus further illustrates the rule generator 504 taking as input a set of related information blocks 614, and generating an entity document rule 702 based on the related information blocks 614.

As used herein, when a specific document corpus 508 is owned by a defined entity, such as a customer or client of the systems 100, 200, the document corpus 508 may be referred to as an "entity document corpus." When a document rule is generated using information stored in an entity document corpus, the document rule may be referred to as an "entity document rule." A set of entity document rules may be referred to as an "entity document rule set."

Referring again to FIG. 7, the rule generator 504 may generate a document rule, such as an entity document rule 702, based on one or more common parameters shared by a set or subset of related information blocks 614. The entity document rule 702 may be stored in a rules database 704 as part of an entity document rule set 706 for a particular defined entity. Examples of operations to process a set of related information blocks 614 from a document corpus 508 to generate a document rule set 502 or an entity document rule set 706 are described in more detail with reference to FIGS. 8-12.

Figure 8:
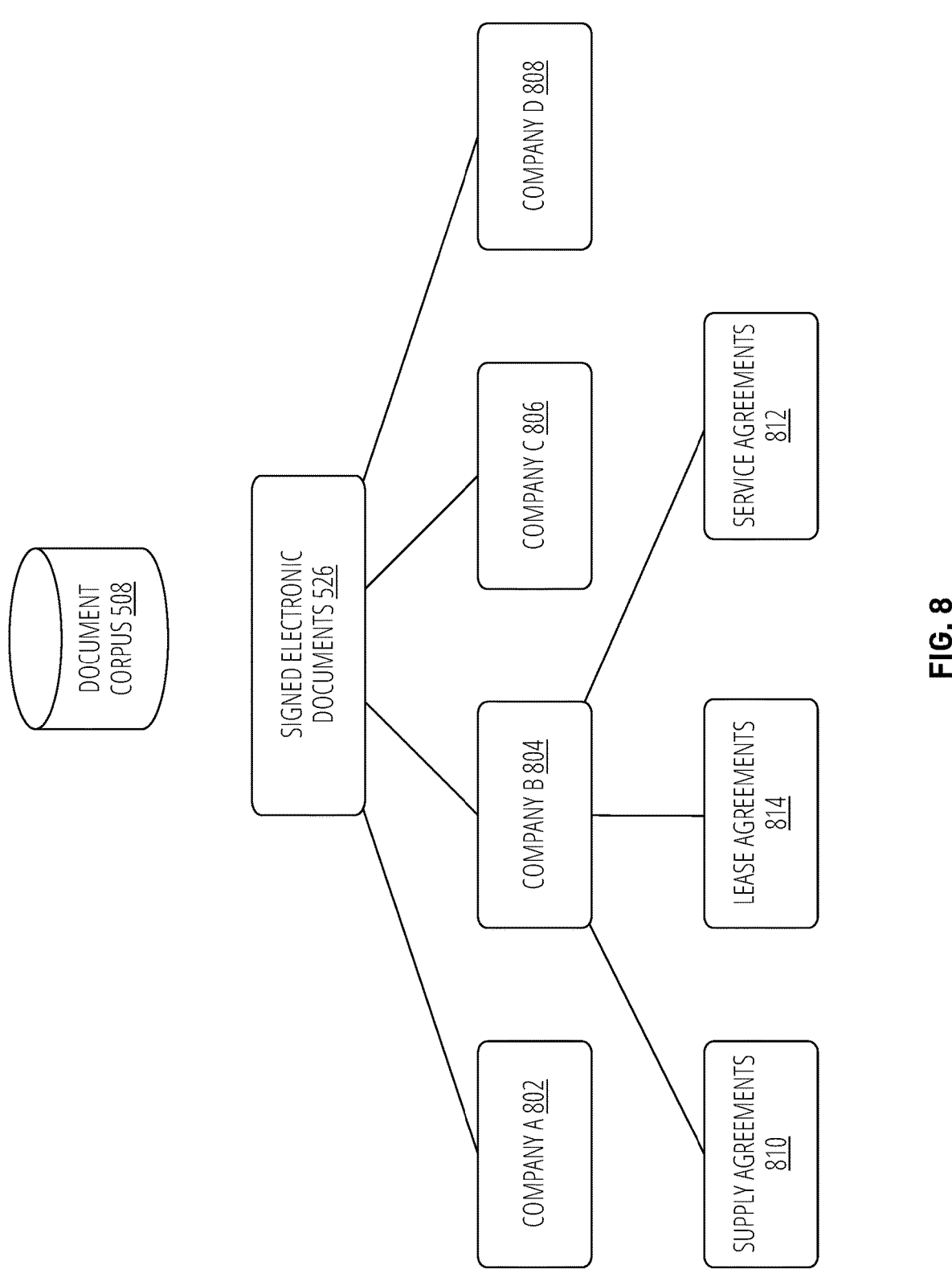
FIG. 8 illustrates a document corpus 508 in accordance with one embodiment.

FIG. 8 illustrates an example of a document corpus 508 suitable for use by the insight manager 124 of the server device 102. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As depicted in FIG. 8, the document corpus 508 may include information from signed electronic documents 526 derived from the document records 138 stored in the data store 126. Different sets of the signed electronic documents 526 of the document corpus 508 may be associated with different entities. For example, a first set of signed electronic documents 526 is associated with a company A 802. A second set of signed electronic documents 526 is associated with a company B 804. A third set of signed electronic documents 526 is associated with a company C 806. A fourth set of signed electronic documents 526 is associated with a company D 808. Although some embodiments discuss the document corpus 508 having signed electronic documents 526, it may be appreciated that the document corpus 508 may have unsigned electronic document as well, which may be mined using the AI/ML techniques described herein. Embodiments are not limited in this context.

Each set of signed electronic documents 526 associated with a defined entity may include one or more subsets of the signed electronic documents 526 categorized by document type. For instance, the second set of signed electronic documents 526 associated with company B 804 may have a first subset of signed electronic documents 526 with a document type for supply agreements 810, a second subset of signed electronic documents 526 with a document type for lease agreements 814, and a third subset of signed electronic documents 526 with a document type for service agreements 812. In one embodiment, the sets and subsets of signed electronic documents 526 may be identified using labels manually assigned by a human operator, such as metadata added to a document record for a signed electronic document created in a document management system, or feedback from a user of the system 100 or the system 200 during a document generation process. In one embodiment, the sets and subsets of signed electronic documents 526 may be unlabeled. In such cases, the insight manager 124 may use the insight model 506 to identify a defined entity or a document type for a defined entity.

FIG. 9 illustrates an example of a signed electronic document 526. A signed electronic document 526 may include different information types that collectively form a set of document components 902 for the signed electronic document 526. The document components 902 may comprise, for example, one or more audio components 904, text components 906, image components 908, or table components 910. Each document component 902 may comprise different content types. For example, the text components 906 may comprise structured text 912, unstructured text 914, or semi-structured text 916.

Structured text 912 refers to text information that is organized in a specific format or schema, such as words, sentences, paragraphs, sections, clauses, and so forth. Structured text 912 has a well-defined set of rules that dictate how the data should be organized and represented, including the data types and relationships between data elements.

Unstructured text 914 refers to text information that does not have a predefined or organized format or schema. Unlike structured text 912, which is organized in a specific way, unstructured text 914 can take various forms, such as text information stored in a table, spreadsheet, figures, equations, header, footer, filename, metadata, and so forth.

Semi-structured text 916 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

In various embodiments, the AI/ML algorithms and models used herein may operate text information to generate a document rule set 502 or entity document rule set 706. However, the AI/ML algorithms may also use other modalities, such as images, video or audio information to generate a document rule set 502 or entity document rule set 706. Embodiments are not limited in this context.

Figure 10:
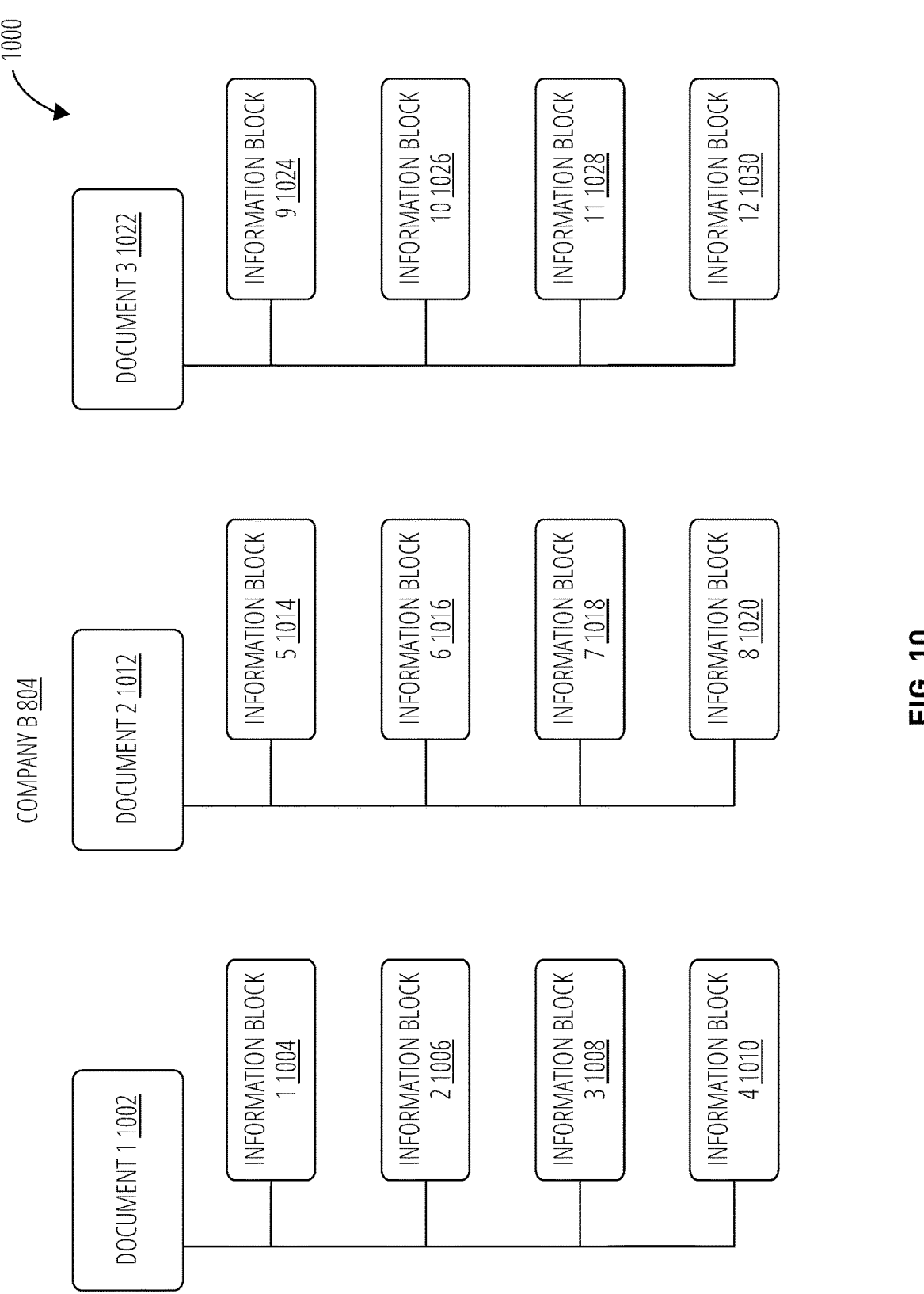
FIG. 10 illustrates an aspect of a company document corpus 1000 in accordance with one embodiment.

FIG. 10 illustrates a company document corpus 1000. The company document corpus 1000 is an example of an entity document corpus having a set of signed electronic documents 526 from the document corpus 508 associated with a single entity, such as company B 804. The company document corpus 1000 for the company B 804 may comprise a set of signed electronic documents 526, represented as document 1 1002, document 2 1012 and document 3 1022. Each of the signed electronic documents 526 may comprise a set of information blocks 510. For instance, the document 1 1002 may comprise information block 1 1004, information block 2 1006, information block 3 1008, and information block 4 1010. The document 2 1012 may comprise information block 5 1014, information block 6 1016, information block 7 1018, and information block 8 1020. The document 3 1022 may comprise information block 9 1024, information block 10 1026, information block 11 1028, and information block 12 1030. In this example, assume each of the information blocks 510 corresponds to a legal clause in a negotiated agreement, wherein each legal clause comprises a text component 906 such as a paragraph of structured text 912.

Figure 11:
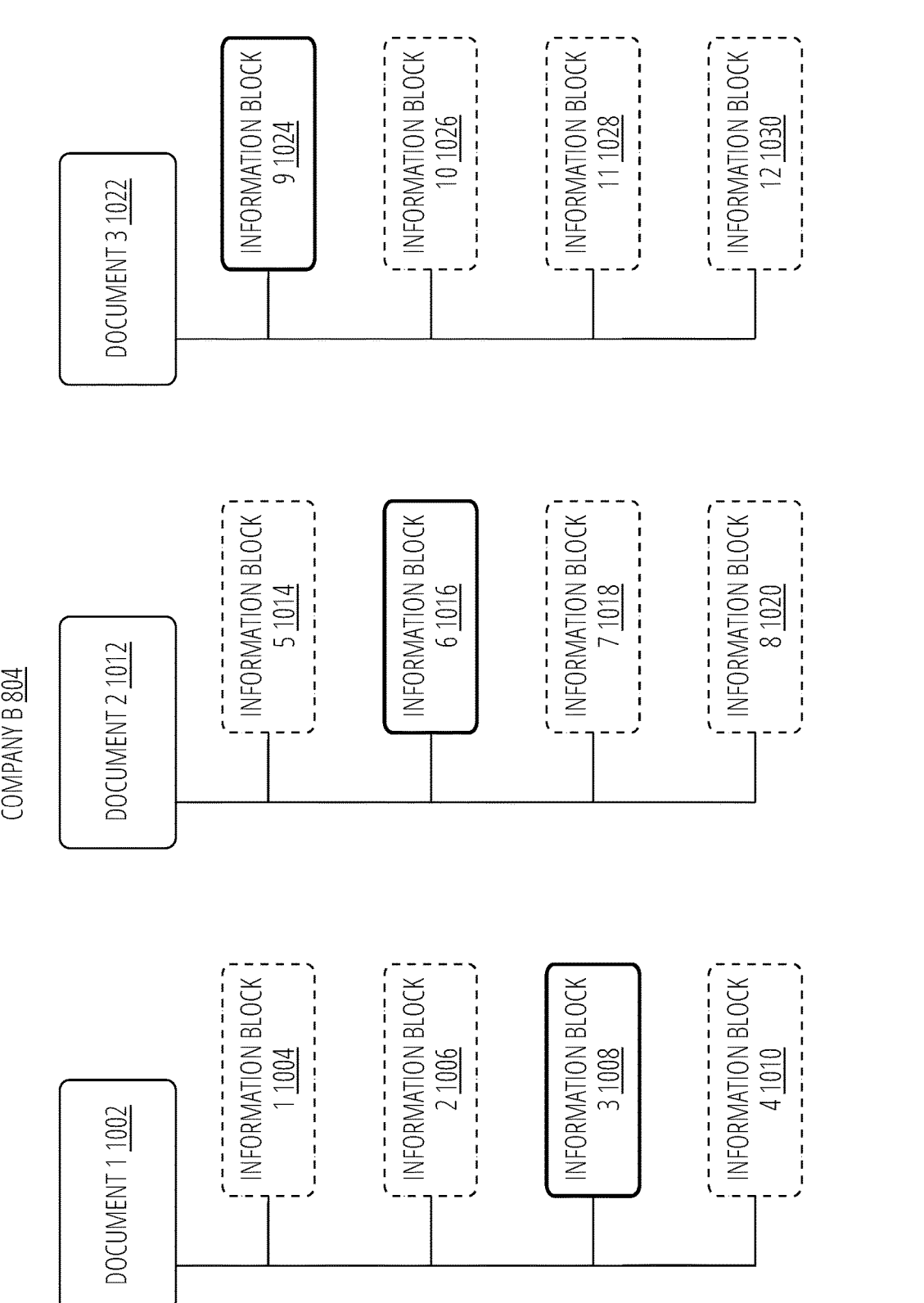
FIG. 11 illustrates an aspect of a company document corpus 1000 in accordance with one embodiment.

FIG. 11 illustrates the company document corpus 1000 after processing by the insight manager 124 of the server device 102. As previously discussed, the rule generator 504 of the insight manager 124 may identify a set of related information blocks 614 from the information blocks 510 using the insight model 506, where each information block 510 in the set of related information blocks 614 is part of, or originates from, a different signed electronic document 526 of the document corpus 508 associated with a defined entity.

As depicted in FIG. 11, assume the rule generator 504 of the insight manager 124 identifies a set of related information blocks 614 as information block 3 1008 of the document 1 1002, information block 6 1016 of the document 2 1012, and information block 9 1024 of the document 3 1022. Each information block 510 in the set of related information blocks 614 is part of, or originates from, a different signed electronic document 526 of the document corpus 508 associated with a defined entity, namely document 1 1002, document 2 1012 and document 3 1022, for example. In this example, assume each information block 510 in the set of related information blocks 614 is a legal clause defining a term for a lease agreement.

Figure 12:
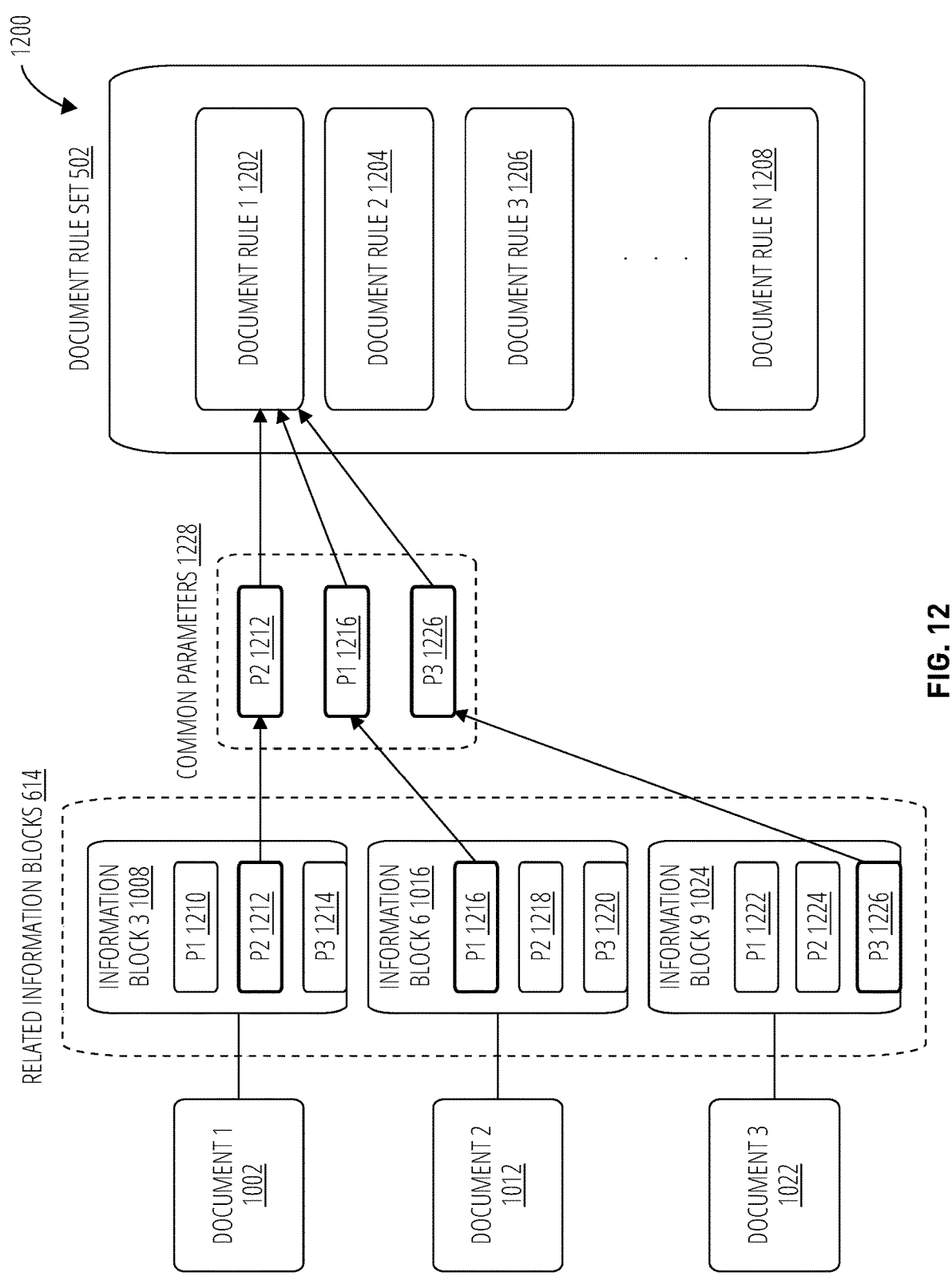
FIG. 12 illustrates a logical diagram 1200 in accordance with one embodiment.

FIG. 12 illustrates a set of common parameters 1228 for the related information blocks 614. As previously described with reference to FIG. 11, the rule generator 504 of the insight manager 124 identified a set of related information blocks 614 as information block 3 1008 of the document 1 1002, information block 6 1016 of the document 2 1012, and information block 9 1024 of the document 3 1022. Each information block 510 in the set of related information blocks 614 is part of, or originates from, a different signed electronic document 526 of the document corpus 508 associated with a defined entity, namely document 1 1002, document 2 1012 and document 3 1022, for example.

FIG. 12 provides a more detailed view of the information blocks 510 for the related information blocks 614. The information block 3 1008 may comprise parameters P1 1210, P2 1212 and P3 1214. The information block 6 1016 may comprise parameters P1 1216, P2 1218 and P3 1220. The information block 9 1024 may comprise parameters P1 1222, P2 1224 and P3 1226. In this example, assume the rule generator 504 of the insight manager 124 identifies a set of common parameters 1228 shared between the information block 3 1008, information block 6 1016 and information block 9 1024 of the respective document 1 1002, document 2 1012 and document 3 1022. The set of common parameters 1228 may include parameter P2 1212, P1 1216 and P3 1226 from the respective information block 3 1008, information block 6 1016 and information block 9 1024.

In this example, each information block 510 in the set of related information blocks 614 is assumed to be a legal clause defining a term for a lease agreement. Further assume each of the parameters P2 1212, P1 1216 and P3 1226 are for a same lease term length of 5 years. The rule generator 504 may generate a document rule set 502 with documents rules 1-N, where N is any positive integer. The document rule set 502 may be associated with a defined entity, which in this example is company B 804. Continuing with the lease example, the rule generator 504 may generate a document rule 1 1202 that any lease agreements should have a lease term of 5 years. The related information blocks 614 may have other common parameters 1228, such as a renewal period of 30 days and a subsequent leasing term of month-to-month. The rule generator 504 may generate a document rule 2 1204 that any lease agreements should have a renewal period of 30 days before expiration of a lease term. The rule generator 504 may also generate a document rule 3 1206 that any lease agreements that are renewed within 30 days before expiration of a lease term reverts to a month-to-month leasing term.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 13 illustrates an embodiment of a logic flow 1300. The logic flow 1300 may be representative of some or all of the operations executed by one or more embodiments described herein. For example, the logic flow 1300 may include some or all of the operations performed by devices or entities within the system 100 or the system 200. More particularly, the logic flow 1300 illustrates an example where the server device 102 generates a document rule set 502 for a defined entity from a document corpus 508.

In block 1302, the logic flow 1300 may retrieve data from a document corpus associated with a defined entity, the document corpus includes a set of document records, each document record to include a signed electronic document, each signed electronic document to include a set of information blocks. For example, the insight manager 124 of the server device 102 may retrieve data from a document corpus 508 associated with a defined entity, the document corpus 508 to include a set of document records 138, each document record 138 to include a signed electronic document 526, each signed electronic document 526 to include a set of information blocks 510. In one embodiment, for example, the signed electronic documents 526 include one or more electronic signatures. In one embodiment, for example, the signed electronic documents 526 are negotiated agreements between multiple defined entities, and the information blocks 510 are text components representing document clauses in the negotiated agreements.

In block 1304, the logic flow 1300 may identify a set of related information blocks using a machine learning model, each information block in the set of related information blocks part of a different signed electronic document of the document corpus associated with the defined entity. For example, the insight manager 124 may identify a set of related information blocks 614 using a machine learning model such as the insight model 506 of the model inferencer 208. Each information block 510 in the set of related information blocks 614 may be part of a different signed electronic document 526 of the document corpus 508 associated with the defined entity.

In block 1306, the logic flow 1300 may identify a set of common parameters shared by the set of related information blocks. For example, the rule generator 504 of the insight manager 124 may identify a set of common parameters 1228 shared by the set of related information blocks 614. In one embodiment, for example, the signed electronic documents 526 are negotiated agreements between multiple defined entities, the information blocks 510 are text components 906 representing document clauses in the negotiated agreements, and the one or more common parameters 1228 are terms for the document clauses.

In block 1308, the logic flow 1300 may generate a document rule based on the set of common parameters shared by the set of related information blocks. For example, the rule generator 504 of the insight manager 124 may generate an entity document rule 702 for an entity document rule set 706 based on the set of common parameters 1228 shared by the set of related information blocks 614.

In block 1310, the logic flow 1300 may store the document rule as part of a document rule set for the defined entity in a rules database. For example, the rule generator 504 of the insight manager 124 may may store the entity document rule 702 as part of the entity document rule set 706 for the defined entity in a rules database 704.

FIG. 14 illustrates an embodiment of a logic flow 1400. The logic flow 1400 may be representative of some or all of the operations executed by one or more embodiments described herein. For example, the logic flow 1400 may include some or all of the operations performed by devices or entities within the system 100 or the system 200. More particularly, the logic flow 1400 illustrates an example where the insight model 506 is trained, evaluated and deployed to the model inferencer 208 of the insight manager 124 in accordance with the artificial intelligence architecture 300 and artificial neural network 400.

In block 1402, the logic flow 1400 may convert the information blocks of the signed electronic documents of the document corpus from image components into text components. For example, the pre-processor 306 of the data collector 202 of the insight manager 124 may convert the information blocks 510 of the signed electronic documents 526 of the document corpus 508 from document images 140 into text components 906. In one embodiment, the pre-processor 306 may transform the signed electronic documents 526 between document formats. If the signed electronic documents 526 are images, the pre-processor 306 may use object recognition such as optical character recognition (OCR) to identify text information within a document and a location for each character (e.g., a location coordinate) within the document.

In block 1404, the logic flow 1400 may pre-process the information blocks of the signed electronic documents of the document corpus to a defined data schema. For example, the pre-processor 306 of the data collector 202 may pre-process the information blocks 510 of the signed electronic documents 526 of the document corpus 508 to a defined data schema suitable for ingest by the model trainer 204 and the model evaluator 206.

In block 1406, the logic flow 1400 may process data from the information blocks of the signed electronic documents from the document corpus to obtain one or more features for training the machine learning model. For example, the pre-processor 306 of the data collector 202 may process data from the information blocks 510 of the signed electronic documents 526 from the document corpus 508 to obtain one or more features for training a machine learning model, such as the ML model 312, the insight model 506, the document type model 602, the information block model 604, and candidate model 606. For instance the pre-processor 306 may convert text information from the signed electronic documents 526 into word vectors, using tools such as GloVe, Word2vec, or fastText. Prior to conversion to word vectors, the text information may be pre-processed to remove punctuation, convert upper case characters to lower case characters, remove stop words, and other typical pre-processing operations to normalize the text information. The word vectors may be grouped together to form sentences and assigned a unique sentence location value for each sentence or characters within each sentence. The word vectors may be stored in a matrix and mapped onto an undirected weighted graph using average word vector values. Each node of the graph corresponds to a text passage and is initialized with a random weight value. Each edge of the graph that connects two nodes has an edge weight that corresponds to a measure of similarity between corresponding text passages. For instance, the edge weight may correspond to a measure of semantic similarity amongst text passages. Other features, scoring and ranking algorithms may be used to measure similarity between information blocks 510.

In block 1408, the logic flow 1400 may train the machine learning model on training data from the signed electronic documents. For example, the model trainer 204 of the insight manager 124 may generate and train the insight model 506 using an ML algorithm 326 and training data 328 from the signed electronic documents 526. The training data

328 may comprise structured data, unstructured data, or semi-structured data from the signed electronic documents 526. The ML algorithm 326 may comprise, for example, a neural network algorithm to train an artificial neural network 400. Other examples of a suitable ML algorithm 326 for training the insight model 506 includes a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, or a distributed artificial intelligence algorithm.

In block 1410, the logic flow 1400 may evaluate the machine learning model on testing data from the signed electronic documents. For example, the model trainer 204 of the insight manager 124 may evaluate the insight model 506 on testing data 330 from the signed electronic documents 526.

In block 1412, the logic flow 1400 may deploy the machine learning model to an actor to perform inferencing operations for the actor. For example, once the insight model 506 is trained, evaluated and optimized for performance, the insight model 506 may be deployed as part of the model inferencer 208 to an actor, such as the insight manager 124 of the server device 102.

Figure 15:
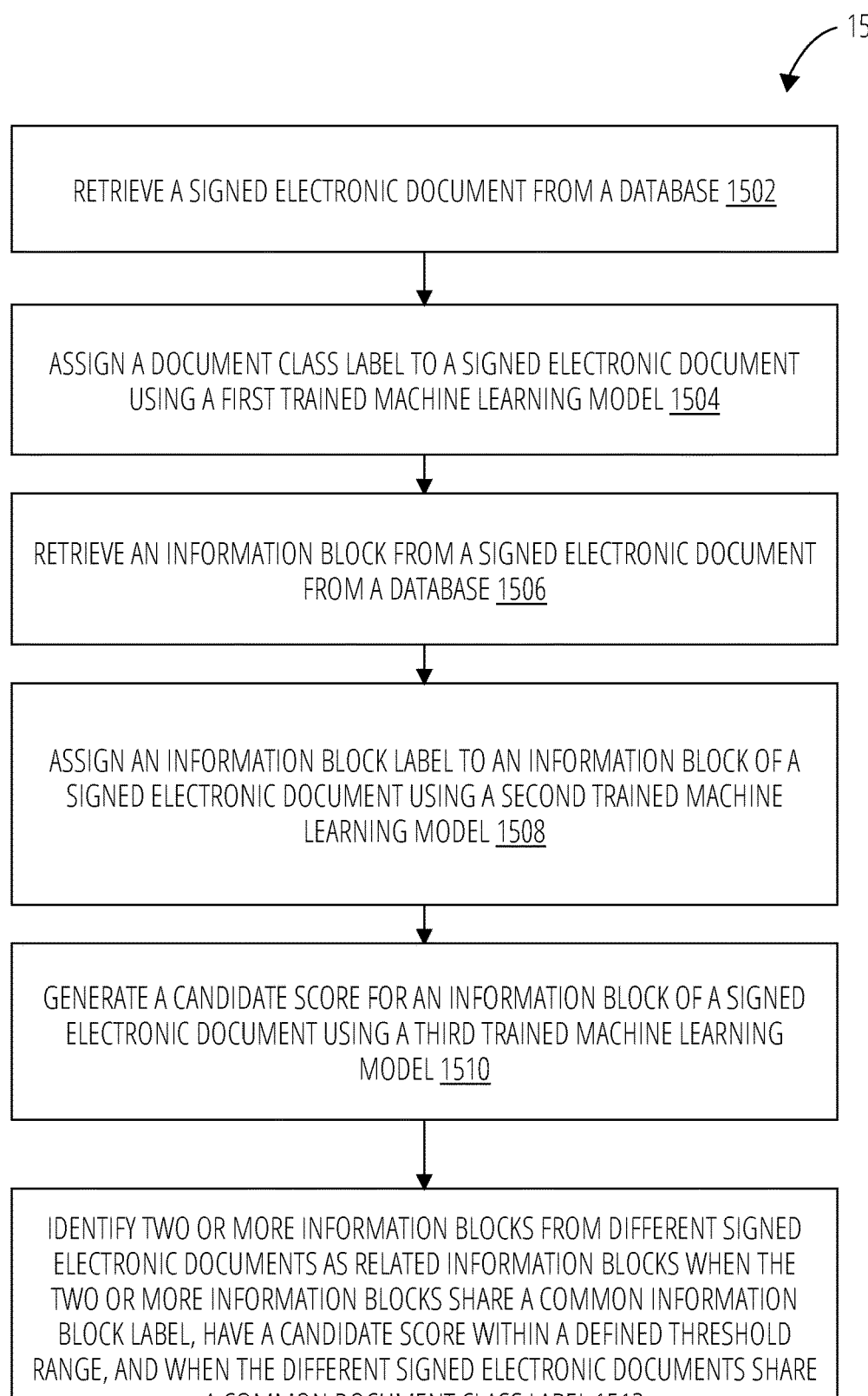
FIG. 15 illustrates a logic flow 1500 in accordance with one embodiment.

FIG. 15 illustrates an embodiment of a logic flow 1500. The logic flow 1500 may be representative of some or all of the operations executed by one or more embodiments described herein. For example, the logic flow 1500 may include some or all of the operations performed by devices or entities within the system 100 or the system 200. More particularly, the logic flow 1500 illustrates an example where the insight manager 124 of the server device 102 generates a set of related information blocks 614.

In block 1502, the logic flow 1500 may retrieve a signed electronic document from a database. For example, the insight manager 124 may retrieve a signed electronic document 526 from the document corpus 508.

In block 1504, the logic flow 1500 may assign a document class label to a signed electronic document using a first trained machine learning model. For example, the insight manager 124 may receive as input information from the signed electronic document 526, and process the information to assign a document class label 608 to the signed electronic document 526 using a first trained machine learning model, such as the document type model 602.

In block 1506, the logic flow 1500 may retrieve an information block from a signed electronic document from a database. For example, the insight manager 124 may retrieve one or more information blocks 510 from a signed electronic document 526 from the document corpus 508.

In block 1508, the logic flow 1500 may assign an information block label to an information block of a signed electronic document using the second trained machine learning model. For example, the insight manager 124 may receive as input information blocks 510 from a signed electronic document 526, and process the information blocks 510 to assign an information block label 610 to each of the information blocks 510 of a signed electronic document 526 using the second trained machine learning model, such as the information block model 604.

In block 1510, the logic flow 1500 may generate a candidate score for an information block of a signed electronic document using a third trained machine learning model. For example, the insight manager 124 may receive as input information blocks 510 from a signed electronic document 526, and process the information blocks 510 to assign a candidate score 612 to each of the information blocks 510 of the signed electronic document 526 using the third trained machine learning model, such as the candidate model 606.

In block 1512, the logic flow 1500 may identify two or more information blocks from different signed electronic documents as related information blocks when the two or more information blocks share a common information block label, have a candidate score within a defined threshold range, and when the different signed electronic documents share a common document class label. For example, the rule generator 504 of the insight manager 124 may identify two or more information blocks 510 from different signed electronic documents 526, such document 1 1002 and document 2 1012, as related information blocks 614 when the two or more information blocks 510 share a common information block label 610, have a candidate score 612 within a defined threshold range, and when the different signed electronic documents 526 share a common document class label 608.

Once the rule generator 504 of the server device 102 generates a document rule set 502 or an entity document rule set 706 for a defined entity, the server device 102 may store the document rule set 502 or the entity document rule set 706 in a database, such as the data store 126. The server device 102 may use the document rule set 502 or the entity document rule set 706 for various use case scenarios, such as part of a document generation workflow to generate new electronic documents for the defined entity. An example of a document generation workflow using the document rule set 502 or the entity document rule set 706 may be described with reference to FIG. 16.

FIG. 16 illustrates an embodiment of a logic flow 1600. The logic flow 1600 may be representative of some or all of the operations executed by one or more embodiments described herein. For example, the logic flow 1600 may include some or all of the operations performed by devices or entities within the system 100 or the system 200. More particularly, the logic flow 1600 illustrates an example where the insight manager 124 of the server device 102 generates an insight 214 for an electronic document, such as during generation of a new electronic document 142.

In block 1602, the logic flow 1600 may retrieve an unsigned electronic agreement associated with a defined entity, the unsigned electronic agreement having a set of document clauses, each document clause to have one or more parameters. For example, the insight manager 124 of the server device 102 may retrieve an unsigned electronic agreement associated with a defined entity, such as a business client or customer of the EDMS of the systems 100, 200. The unsigned electronic agreement may comprise an electronic document 142 that is prepared to receive an electronic signature in a signature process as defined with reference to system 100 of FIG. 1. The electronic document 142 may have a set of document clauses, each document clause to have one or more parameters. The document clauses may comprise, for example, text components 906 with structured text 912, unstructured text 914 or semi-structured text 916. The parameters may comprise one or more of a defined amount of information contained within a document clause, such as n-grams, words, sentences, paragraphs, sections, clauses, snippets, groups, categories, values, equations, fields, and so forth.

In block 1604, the logic flow 1600 may retrieve a candidate source associated with the defined entity, the candidate source having a set of candidate clauses, each candidate clause to have one or more parameters. For example, the insight manager 124 may retrieve a candidate source associated with the business client or customer. A candidate source may comprise other electronic documents associated with the business client or customer, such as previously generated document images 140, electronic documents 142, signed electronic documents 526, or unsigned electronic documents in a pre-signature document preparation phase. Other examples of candidate sources may include a document rule set 502 or an entity document rule set 706. A candidate source may have a set of candidate clauses, where each candidate clause to have one or more parameters. The candidate clauses may have a similar modality as the document clauses. For example, the candidate clauses may comprise text components 906 with structured text 912, unstructured text 914 or semi-structured text 916.

In block 1606, the logic flow 1600 may identify a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source. For example, the insight manager 124 may identify a set of related document clauses between the unsigned electronic agreement and the candidate source using a machine learning model. The set of related document clauses to comprise a document clause from the set of documents clauses of the unsigned electronic agreement and a candidate clause from the set of candidate clauses of the candidate source. The machine learning model may comprise, for example, the insight model 506 or a variation of the insight model 506.

In block 1608, the logic flow 1600 may identify a set of common parameters shared between the set of related document clauses using the machine learning model, the set of common parameters to include a parameter from the document clause and a parameter from the candidate clause of the set of related document clauses. For example, the insight manager 124 may identify a set of common parameters shared between the set of related document clauses using the insight model 506. The set of common parameters may include shared parameters, such as a parameter from the document clause and a parameter from the candidate clause of the set of related document clauses.

In block 1610, the logic flow 1600 may analyze the set of common parameters for a formal deviation between the common parameters. As previously discussed, when a client 210 generates a new electronic document 142, the client 210 may need to follow a set of document rules suggested or mandated by a business, organization or industry. The document rules may be informal rules or formal rules encoded into a document rule set 502 or entity document rule set 706. Informal rules are rules defining a particular form of a document, such as spelling, grammar, style, and so forth. Formal rules are rules defining a concept or substantive provision of a document that is material to the agreement, such as legal terms, accounting terms, financial terms, material terms, business terms, and so forth. For example, a formal rule may be a lease term or a lease amount in a lease agreement, a licensing fee for a product or service, or controlling authority for a legal dispute. The document rules may be industry standard or entity standard document rules, and therefore may vary considerably between entities, industries, document types, and so forth.

In general, the common parameters may have two different types of deviations. An informal deviation is a deviation from an informal rule, such as a particular text font, paragraph style, page numbers, headers, footers, and so forth. A formal deviation is a deviation from a formal rule, such as terms in an agreement. For example, assume a parameter from the document clause is a lease term for 6 months and a parameter from the candidate clause is a lease term of 5 years. If a lease term for a new lease agreement is a formal rule of 5 years, then the insight manager 124 would designate the deviation between the lease term of 6 months in the document clause of a new lease agreement and the 5 years in the candidate clause of candidate source (e.g., a playbook) as a formal deviation.

In block 1612, the logic flow 1600 may generate an insight based on a formal deviation between the set of common parameters using a natural language generation (NLG) model, the insight to describe the formal deviation in a natural language representation. For example, the insight manager 124 may deploy a model inferencer 208 with an insight model 506 trained and tested as a NLG model. An example NLG model is described in more detail below.

Figure 17:
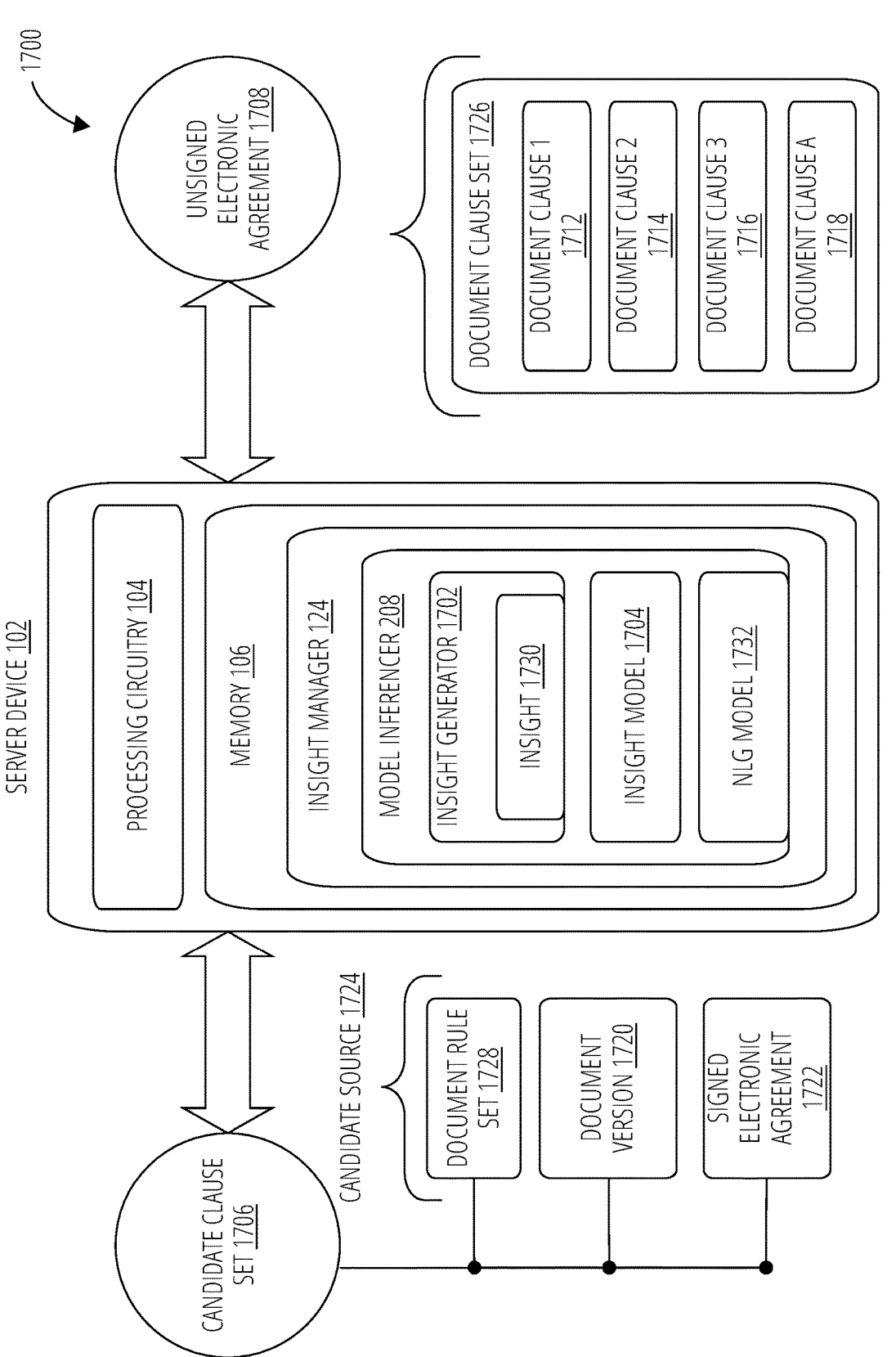
FIG. 17 illustrates an apparatus 1700 in accordance with one embodiment.

FIG. 17 illustrates an apparatus 1700. The apparatus 1700 may comprise an example of the server device 102 implemented to generate an insight between document clauses originating from different sources, such as different electronic documents, for a single defined entity.

In general, the insight manager 124 may receive at least two types of inputs. The first input is a candidate clause set 1706 from various candidate sources 1724, such as a document rule set 1728, a document version 1720, or a signed electronic agreement 1722. The second input is a document clause set 1726 from an unsigned electronic agreement 1708. The unsigned electronic agreement 1708 may be prepared to receive one or more electronic signatures. The insight manager 124 may implement an insight generator 1702 designed to analyze the two types of inputs using an insight model 1704, which is a trained ML model. The insight generator 1702 may analyze the two types of inputs for any formal deviations, and generate an insight 1730 about the formal deviations.

In various embodiments, the insight manager 124 of the server device 102 may retrieve an unsigned electronic agreement 1708 associated with a defined entity, such as specific business, organization, industry, legal entity, business entity, internal revenue service (IRS) identity, or any other logically or legally defined entity. The unsigned electronic agreement 1708 may have a set of document clauses, collectively referred to as a document clause set 1726. The document clause set 1726 may comprise a document clause 1 1712, document clause 2 1714, document clause 3 1716, and document clause A 1718, where A is any positive integer. Each document clause 1712-1718 of the document clause set 1726 may have one or more parameters.

By way of example, assume a client 210 is a leasing agent of a defined entity, such as a leasing company XYZ. Further assume the client 210 is preparing a new lease agreement for a prospective tenant. The client 210 may access the server device 102 via the network 224. The server device 102 may include a document manager 120 that is an online software tool with built-in workflows that allow the client 210 to generate the new lease agreement in preparation for receiving an electronic signature from the prospective tenant using a signature execution workflow described with reference to system 100 of FIG. 1. The client may access the document manager 120 and start a draft of a new unsigned electronic agreement 1708.

The unsigned electronic agreement 1708 may comprise a document template specifically designed by the leasing company XYZ for drafting new lease agreements, with defined document clauses with parameters such as names of tenants, limits on occupancy, term of the tenancy, rent, deposit and fees, repairs and maintenance, entry to rental property, restrictions on tenant illegal activity, controlling law, penalties and damages, and other legal or business language to define a scope of the leasing agreement. Alternatively, the client 210 may use a previously signed electronic agreement as a document template, such as a previously executed agreement between the leasing company and a past tenant. In either case, the client 210 may modify the unsigned electronic agreement 1708 with certain variable terms negotiated by the leasing agent and the tenant, such as a lease term, rent, move dates, and so forth. In some cases, the variable terms may be fillable fields within the unsigned electronic agreement 1708.

The insight manager 124 may retrieve a candidate source 1724 associated with the defined entity. For instance, the insight manager 124 may retrieve the unsigned electronic agreement 1708 and retrieve or generate a set of metadata associated with the unsigned electronic agreement 1708. The metadata may be labels that describe the unsigned electronic agreement 1708, such as a company, business unit of the company, type of agreement, dates, priority level, and other descriptors. The insight manager 124 may use the metadata select a candidate source 1724 from among the multiple types of candidate sources 1724. For instance, if the unsigned electronic agreement 1708 is a draft lease agreement for the leasing company XYZ, the insight manager 124 may select a document rule set 1728 for the leasing company XYZ as the candidate source 1724. The selected candidate source 1724 may have a set of candidate clauses, referred to collectively as a candidate clause set 1706. Each candidate clause in the candidate clause set 1706 may have one or more parameters.

Continuing with the leasing example, sometime during or after the client 210 completes the drafting process, the insight manager 124 may receive document clauses from the unsigned electronic agreement 1708. The insight manager 124 may receive a document clause set 1726 comprising document clause 1 1712, document clause 2 1714, document clause 3 1716, and so forth through document clause A 1718, where A is any positive integer. The insight 214 may begin a workflow to examine the document clause set 1726 for deviations or errors from formal rules or requirements mandated by the leasing company XYZ. The formal rules or requirements may be stored or encoded within a candidate source 1724 that is associated with, related to, or maintained by the leasing company XYZ. The insight manager 124 may retrieve the candidate clause set 1706 from a candidate source 1724 stored in a database, such as the data store 126.

The insight manager 124 may identify a set of related document clauses between the unsigned electronic agreement 1708 and the candidate source 1724 using a machine learning model, such as the insight model 1704 of the model inferencer 208. The set of related document clauses may comprise two or more document clauses that are determined to be similar to each other based on some defined metric. In one embodiment, for example, the two more document clauses may each comprise unstructured text information. In this case, the insight manager 124 may use the insight model 1704 to implement a scoring and ranking algorithm to determine similarity between document clauses. In one embodiment, for example, the two or more document clauses may each comprise structured text information, having associated labels for metadata. In this case, the insight manager 124 may implement a matching algorithm to determine similarity between document clauses. The set of related document clauses may include a document clause from the document clause set 1726 of the unsigned electronic agreement 1708 and a candidate clause from the candidate clause set 1706 of the candidate source 1724.

In one embodiment, the insight model 1704 may be generated from a machine learning algorithm such as a neural network algorithm in accordance with the artificial neural network 400, for example. Examples of suitable machine learning algorithms may include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, or a distributed artificial intelligence algorithm. Embodiments are not limited in this context.

The insight manager 124 may identify a set of common parameters shared between the set of related document clauses using the insight model 1704. The set of common parameters may include two or more parameters that are shared or commonly found in both documents clauses in the set of related document clauses. In one embodiment, the common parameters may be unstructured text that is analyzed and determined to be similar to each other based on some defined metric, such as a scoring and ranking algorithm. In one embodiment, the common parameters may be structured text that have a same label or metadata. The set of common parameters may include a parameter from the document clause and a parameter from the candidate clause of the set of related document clauses.

In various embodiments, the insight manager 124 may generate an insight 1730 based on a formal deviation between the set of common parameters using a natural language generation (NLG) model, such as the NLG model 1732 of the model inferencer 208. NLG is an AI software process that produces a natural language output. Natural language is any language that evolved naturally in humans through use and repetition, such as speech and signing. A natural language is different from a constructed or formal language, such as those to program computers or to study logic. The NLG model 1732 produces information in a natural language as if it were generated by a human being, such as a written or spoken version of a human language, such as English, Spanish, French, Korean, and so forth. In this way, the insight 1730 may describe the formal deviation in a manner that can be understood by a human being, such as a signatory to the unsigned electronic agreement 1708. For instance, the insight 1730 may describe the formal deviation so that it may be better understood by the leasing agent, a leasing manager, an attorney, the prospective tenant, or a combination thereof. It is worthy to note that NLG is complementary to natural-language understanding (NLU), where a machine learning model disambiguates an input sentence to produce a constructed language, such as a machine representation language.

In various embodiments, the NLG model 1732 may comprise or be implemented as a large language model (LLM) to generate the natural language representation to describe the formal deviation. A LLM is a language model implemented as an artificial neural network 400 with a large number of parameters 434, typically on the order of billions of parameters 434. A LLM is a general purpose models which are useful for a wide range of AI/ML tasks, as opposed to being trained for a specific task such as sentiment analysis, named entity recognition or mathematical reasoning. A LLM is trained to predict the next word in a sentence, and with enough training data 328 and parameters 434, the LLM can capture much of the syntax and semantics of human language.

The NLG model 1732 may comprise a LLM implemented as a deep neural network such as the artificial neural network 400. The NLG model 1732 may be trained using supervised learning, unsupervised learning, or semi-supervised learning that combines both unsupervised learning and supervised learning. In one embodiment, for example, the NLG model 1732 may be trained using semi-supervised learning technique, such as a generative artificial intelligence (AI) algorithm.

Generative AI generally refers to a type of artificial intelligence that is capable of creating new data or original content, such as images, music, or text, that is similar to or inspired by existing examples. Unlike other types of AI, which are trained on existing data sets and use that data to make predictions or classifications, generative AI algorithms create new data by learning the patterns and relationships within the data. Generative AI typically involves deep learning techniques such as neural networks, which are designed to mimic the way the human brain processes information. These algorithms use large data sets to identify patterns and relationships, which they can then use to generate new content that is similar to the training data. Some common applications of generative AI include creating art, generating realistic images or videos, creating music or sound, and even writing natural language text such as news articles or stories.

In one embodiment, the NLG model 1732 may be a LLM trained using a generative AI algorithm that implements a semi-supervised learning technique. A LLM typically uses a transformer architecture. For example, a LLM may use a recurrent neural network (RNN) such as a long short-term memory (LSTM). A LLM using a transformer architecture may be trained with a corpora on the order of billions if not trillions of words or tokens, and is therefore computationally expensive to train. Semi-supervised learning may reduce an amount of training resources needed to train a LLM, including compute, memory and network resources and associated costs.

Semi-supervised learning may include training the NLG model 1732 using a generative AI algorithm. In one embodiment, for example, the NLG model 1732 may use a generative pre-trained transformer (GPT) language model. The NLG model 1732 may be trained in two stages. In a first stage, the generative AI algorithm may train an NLG model 1732 as an artificial neural network 400 such as an RNN. The generative AI algorithm may train the NLG model 1732 with a GPT language model and unsupervised training data 328 to reach a first language modeling objective to set initial parameters 434. In a second stage, the generative AI algorithm may train the NLG model 1732 with a discriminative language model with supervised training data 328 to reach a second language modeling objective that adapts the set of initial parameters 434 to a specific task. For example, the artificial neural network 400 may train the NLG model 1732 using the two training stages to specifically describe formal deviations in an unsigned electronic agreement 1708 in a natural language representation, such as written or spoken text in a human language as if actually described by a human being in a conversation with another human being.

Once the NLG model 1732 is trained to generate an insight 1730, the insight 1730 may describe the formal deviation using a natural language representation. More particularly, the NLG model 1732 may generate a description of the formal deviations in a natural language as if it were generated by a human being, such as a written or spoken version of a human language, such as English, Spanish, French, Korean, and so forth. The insight generator 1702 may output the description on an output device of the server device 102 and/or a client device 212 of a client 210, such as present the description of the formal deviations as natural language text on an electronic display, reproduce the description of the formal deviations as synthesized speech over an electronic speaker, reproduce the description of the formal deviations in a tactile modality such as vibrations with a vibration device, and so forth.

More particularly, the NLG model 1732 may be trained, at least in part, using a GPT model. A GPT model is a language model from a family of language models generally trained on a large corpus of text data to generate human-like text. One example of a GPT model is the family of language models made by OpenAI, an American AI research laboratory consisting of a non-profit corporation OpenAI Incorporated and a for-profit subsidiary corporation OpenAI Limited Partnership. A GPT model has a transformer architecture comprising multiple layers or blocks, such as an input embedding layer, a positional encoding layer, a dropout layer, one or more transformer layers, a normalization layer, a linear layer, a SoftMax layer, and an output layer. The transformer layers can be fine-tuned for various natural language processing (NLP) tasks such as text generation, language translation, and text classification. The use of the term "pre-training" in the GPT model may refer to the initial training process on a large text corpus where the model learns to predict the next word in a passage, which provides a solid foundation for the model to perform well on downstream tasks with limited amounts of task-specific data.

The NLG model 1732 may use a GPT model in a semi-supervised learning approach involving two stages: (1) an unsupervised generative "pre-training" stage in which a language modeling objective is used to set initial parameters, and (2) a supervised discriminative "fine-tuning" stage in which these parameters are adapted to a target task. The GPT model may be particularly useful for those cases where it may be prohibitively expensive and time-consuming to train extremely large models. For example, many languages such as Swahili or Haitian Creole are difficult to translate and interpret using such models due to a lack of available text for corpus-building.

The NLG model 1732 may be implemented as one or more neural networks, which are mathematical models that can learn to recognize patterns in data and generate new data based on those patterns. Specifically, generative AI models use a type of neural network called a generative adversarial network (GAN), which comprises a generator and a discriminator.

The generator is a neural network that takes a random noise vector as input and generates new data, such as images or text, that are intended to resemble the training data. A random noise vector is a vector of random values. The values in the vector are typically drawn from a probability distribution, such as a normal distribution or a uniform distribution. The random noise vector serves as a source of randomness and variation, allowing the generator to produce novel and diverse outputs. While the generator is trained on a specific dataset, the use of a random noise vector means that it can generate new and original data that is not present in the training set. The generator essentially learns to map the random noise vector to a particular output, and by training on a large dataset, it can learn to generate a wide variety of outputs that resemble the training data.

The discriminator, on the other hand, is another neural network that takes the generated data and the real training data as input and tries to distinguish between them. The discriminator takes as input either real data from the training set or generated data from the generator. The objective of the discriminator is to distinguish between the real data and the generated data, effectively learning to identify the "realness" of the input. The discriminator is trained using a binary classification loss function, meaning that it is trained to output a value of 1 if the input is real and 0 if the input is generated.

The generator and discriminator are trained together in a process called adversarial training, where the generator is trying to produce data that the discriminator cannot distinguish from the real training data, while the discriminator is trying to correctly classify the generated data as fake. As the generator improves at producing realistic data, the discriminator must also become more discerning, and the two networks effectively engage in a game of cat-and-mouse. Through this iterative process, the generator gradually improves its ability to create new data that is similar to the training data, and the discriminator becomes better at recognizing the difference between real and fake data. Once the generator has been trained, it can be used to create new, original data that resembles the training data in some way, while also introducing variations and creativity.

In addition to describing a formal deviation in a natural language, the NLG model 1732 may add additional information outside of the formal deviation that might be relevant to drafting or negotiating the unsigned electronic agreement 1708. The insight 1730 may contain new and original data that resembles the training data 328 used to describe formal deviations, yet adds creative insights typically provided by a human reviewer. Examples for the insight 1730 may include information regarding how best to negotiate an agreement, such as historical data on companies, buyers, sellers, products, services, licenses, agreement terms and provisions, best practices, costs, revenue, payments, term limits, and a host of other data that may help shape future negotiations between parties.

Figure 18A:
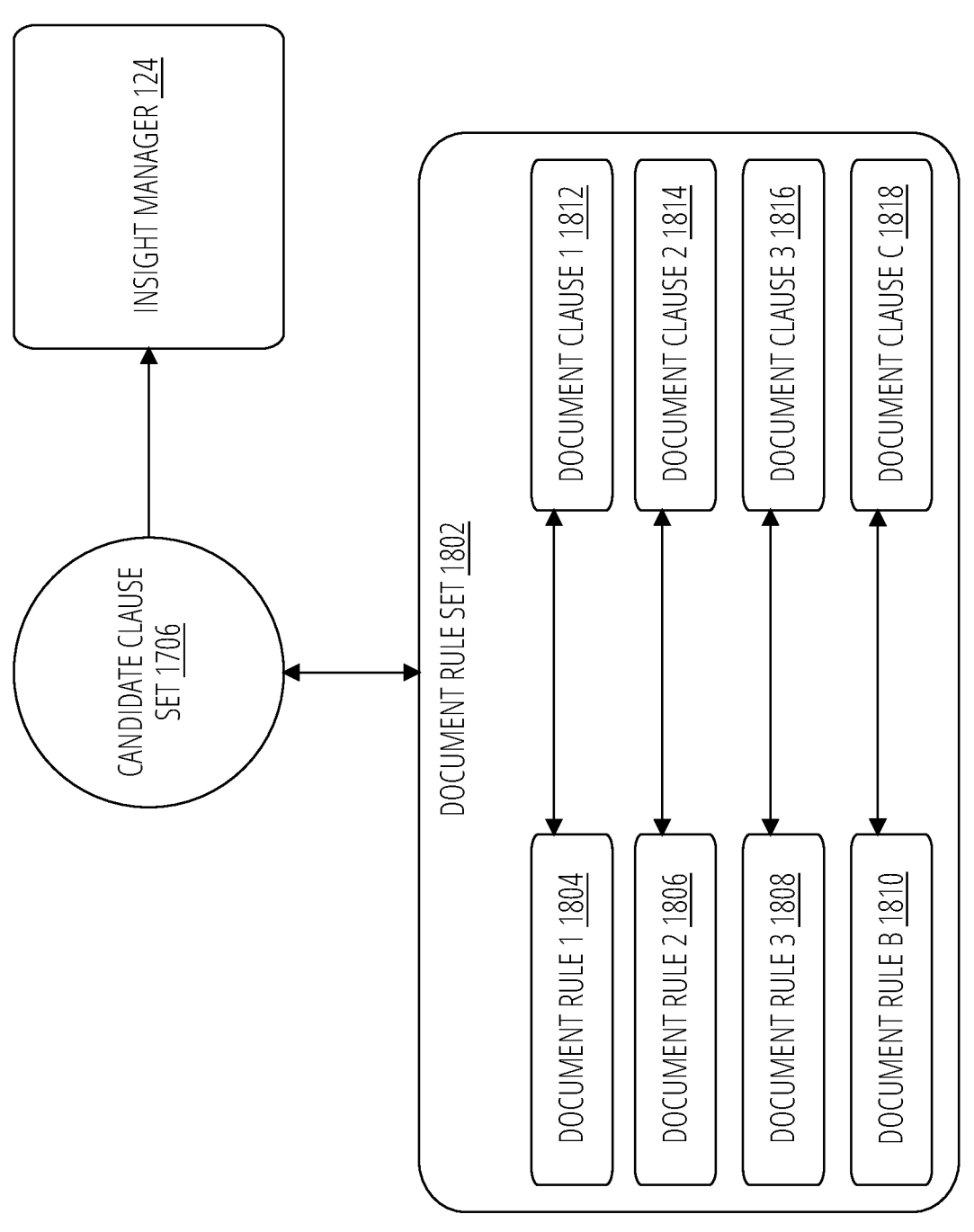
FIG. 18A illustrates a first candidate source 1724 in accordance with one embodiment.

FIG. 18A illustrates an example of a document rule set 1802 with candidate clauses suitable for a candidate clause set 1706. In one embodiment, the candidate source 1724 may comprise a document rule set 1802 associated with a defined entity, such as the leasing company XYZ. The document rule set 1802 may include a set of document rules for the defined entity that may be applied to the unsigned electronic agreement 1708, such as document rule 1 1804, document rule 2 1806, document rule 3 1808, and document rule B 1810, where B represents any positive integer. Each document rule 1804-1810 may be associated with a corresponding document clause that may be suitable for use as a candidate clause, such as document clause 1 1812, document clause 2 1814, document clause 3 1816, and document clause C 1818, where C represents any positive integer.

When the candidate source 1724 comprises the document rule set 1802 associated with the defined entity, such as the leasing company XYZ, the insight manager 124 may receive candidate clauses from the document rule set 1802, process the corresponding document rules 1804-1810 to identify formal deviations, and generate an insight 1730 based on a formal deviation using the NLG model 1732. For example, the candidate source 1724 may comprise a document rule set 1802 previously generated by the rule generator 504 for the leasing company XYZ (e.g., a document rule set 502 or entity document rule set 706). The insight 1730 may comprise a natural language representation to describe the formal deviation between a particular document clause 1812-1818 associated with a corresponding document rule 1804-1810 of the document rule set 1802, and a corresponding document clause 1712-1718 of the unsigned electronic agreement 1708.

Figure 18B:
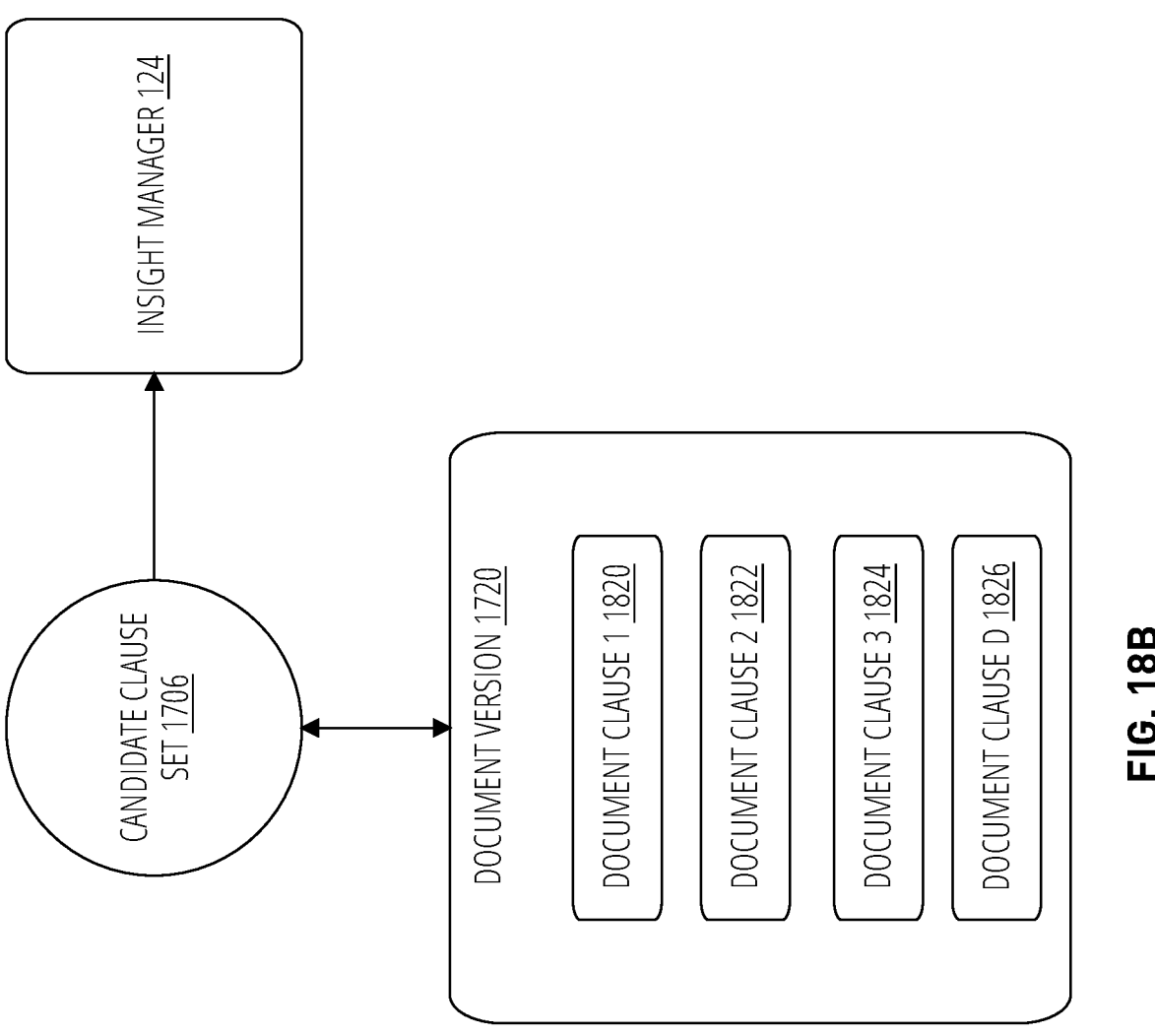
FIG. 18B illustrates a second candidate source 1724 in accordance with one embodiment.

FIG. 18B illustrates an example of a document version 1720 with candidate clauses suitable for a candidate clause set 1706. In one embodiment, the candidate source 1724 may comprise a document version 1720 of the unsigned electronic agreement 1708. The unsigned electronic agreement 1708 may have multiple versions generated as various document clauses are revised and modified during a negotiation process. In one embodiment, the unsigned electronic agreement 1708 may comprise a first document version of the unsigned electronic agreement 1708 and the candidate source 1724 is a second document version of the unsigned electronic agreement 1708. The second document version of the unsigned electronic agreement 1708 may share a structure and one or more document clauses (e.g., candidate clauses) with the first document version of the unsigned electronic agreement 1708 at a defined point in time. A candidate clause of the second document version may be modified relative to the first document version. As depicted in FIG. 18B, the document version 1720 may include a document clause 1 1820, a document clause 2 1822, a document clause 3 1816, and a document clause D 1826, where I) is any positive integer. Any of the document clauses 1820-1826 may be suitable candidate clauses for the candidate clause set 1706.

When the candidate source 1724 comprises a document version 1720 of the unsigned electronic agreement 1708, the insight manager 124 may receive as input the document clauses 1820-1826 of the document version 1720, process the document clauses 1820-1826 as candidate clauses to identify formal deviations, and generate an insight 1730 based on the formal deviation using the NLG model 1732. The insight 1730 may comprise a natural language representation to describe the formal deviation between a document clauses 1820-1826 of the document version 1720 and a corresponding document clause 1712-1718 of the unsigned electronic agreement 1708.

Figure 18C:
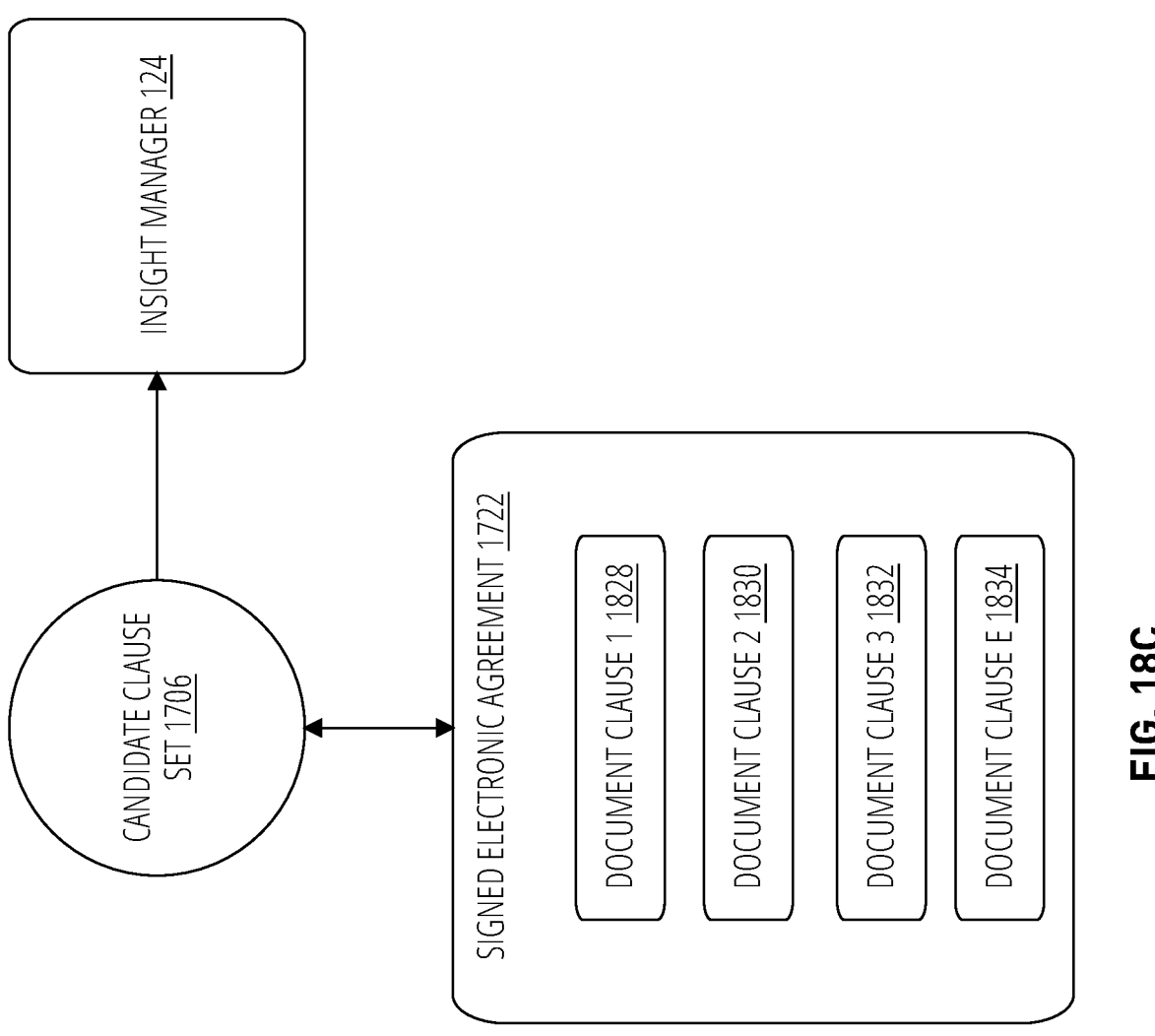
FIG. 18C illustrates a third candidate source 1724 in accordance with one embodiment.

FIG. 18C illustrates an example of a signed electronic agreement 1722 with candidate clauses suitable for candidate clause set 1706. In one embodiment, the candidate source 1724 may comprise a signed electronic agreement 1722, where the signed electronic agreement 1722 is associated with the defined entity and having an electronic signature. For example, the candidate source 1724 may comprise a signed electronic agreement 1722 between a previous tenant and the leasing company XYZ. As depicted in FIG. 18C, the signed electronic agreement 1722 may include a document clause 1 1828, a document clause 2 1830, a document clause 3 1832, and a document clause E 1834, where E is any positive integer. Any of the document clauses 1828-1834 maybe suitable candidate clauses for the candidate clause set 1706.

When the candidate source 1724 comprises a signed electronic agreement 1722, the insight generator 1702 may receive as input the document clauses 1828-1834 of the signed electronic agreement 1722, process the document clauses 1828-1834 as candidate clauses to identify formal deviations, and generate an insight 1730 based on a formal deviation using the NLG model 1732. The insight 1730 may comprise a natural language representation to describe the formal deviation between a document clause 1828-1834 of the signed electronic agreement 1722 and a document clause 1712-1718 of the unsigned electronic agreement 1708.

Figure 19:
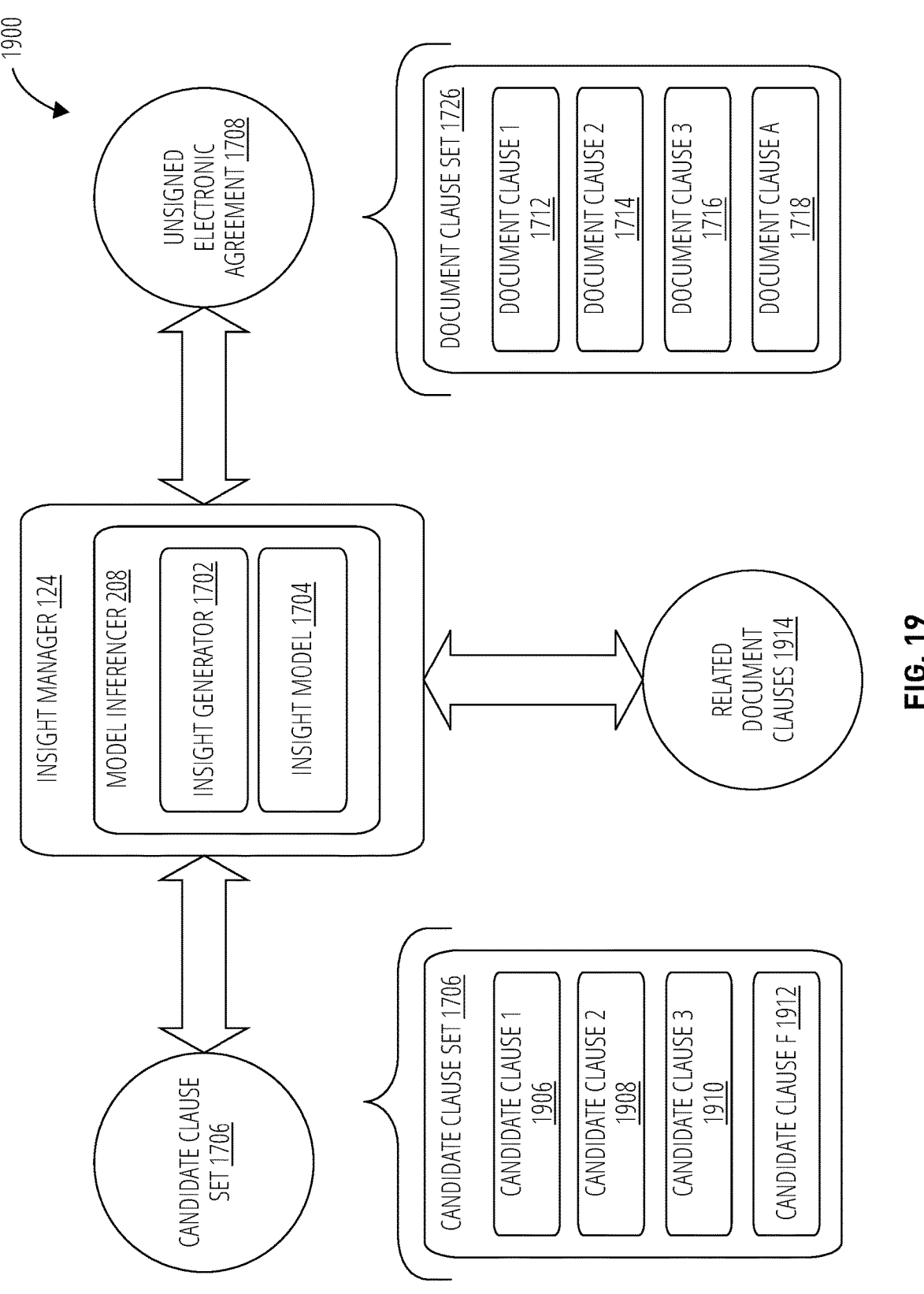
FIG. 19 illustrates an apparatus 1900 in accordance with one embodiment.

FIG. 19 illustrates an apparatus 1900. The apparatus 1900 illustrates the insight manager 124 of the server device 102 receiving as input a candidate clause set 1706 and an unsigned electronic agreement 1708. The insight generator 1702 retrieves candidate clauses from the candidate clause set 1706, such as a candidate clause 1 1906, a candidate clause 2 1908, a candidate clause 3 1910, and a candidate clause F 1912, where F is any positive integer. The insight generator 1702 also retrieves document clauses from the document clause set 1726, such as document clause 1 1712, document clause 2 1714, document clause 3 1716 and document clause A 1718. The insight generator 1702 uses the insight model 1704 to identify a set of related document clauses 1914, where each set of related document clauses 1914 includes a candidate clause 1906-1912 and a document clause 1712-1718.

In some embodiments, the insight model 1704 may use a ranking algorithm similar to the candidate model 606. The insight model 1704 may use a ranking algorithm to score and rank document clauses from the candidate clause set 1706 and the document clause set 1710. One example of a ranking algorithm for a neural network is the RankNet algorithm, which is a pairwise ranking algorithm that learns to predict the relative order of pairs of objects. In RankNet, the neural network takes as input the features of two objects and produces a score that represents the probability that the first object is ranked higher than the second object. The output of the neural network is a real number between 0 and 1, with values closer to 1 indicating a higher probability that the first object is ranked higher than the second object. During training, Rank Net learns to minimize the cross-entropy loss between the predicted scores and the true pairwise rankings of the objects in the training data. This is done using gradient descent optimization, where the weights of the neural network are updated iteratively to minimize the loss. Once the RankNet model has been trained, it can be used to predict the ranking of new pairs of objects by inputting their features into the network and computing their corresponding scores. The objects can then be sorted based on their predicted scores to obtain a ranking. RankNet and similar pairwise ranking algorithms have been successfully applied in various domains, such as search engines, recommender systems, and information retrieval, where the goal is to rank items or documents based on their relevance to a user's query or preferences. The insight model 1704 may use any suitable ranking algorithm to generate candidate scores or similarity scores for the candidate clause set 1706 and the document clause set 1710. Embodiments are not limited in this context.

Figure 20:
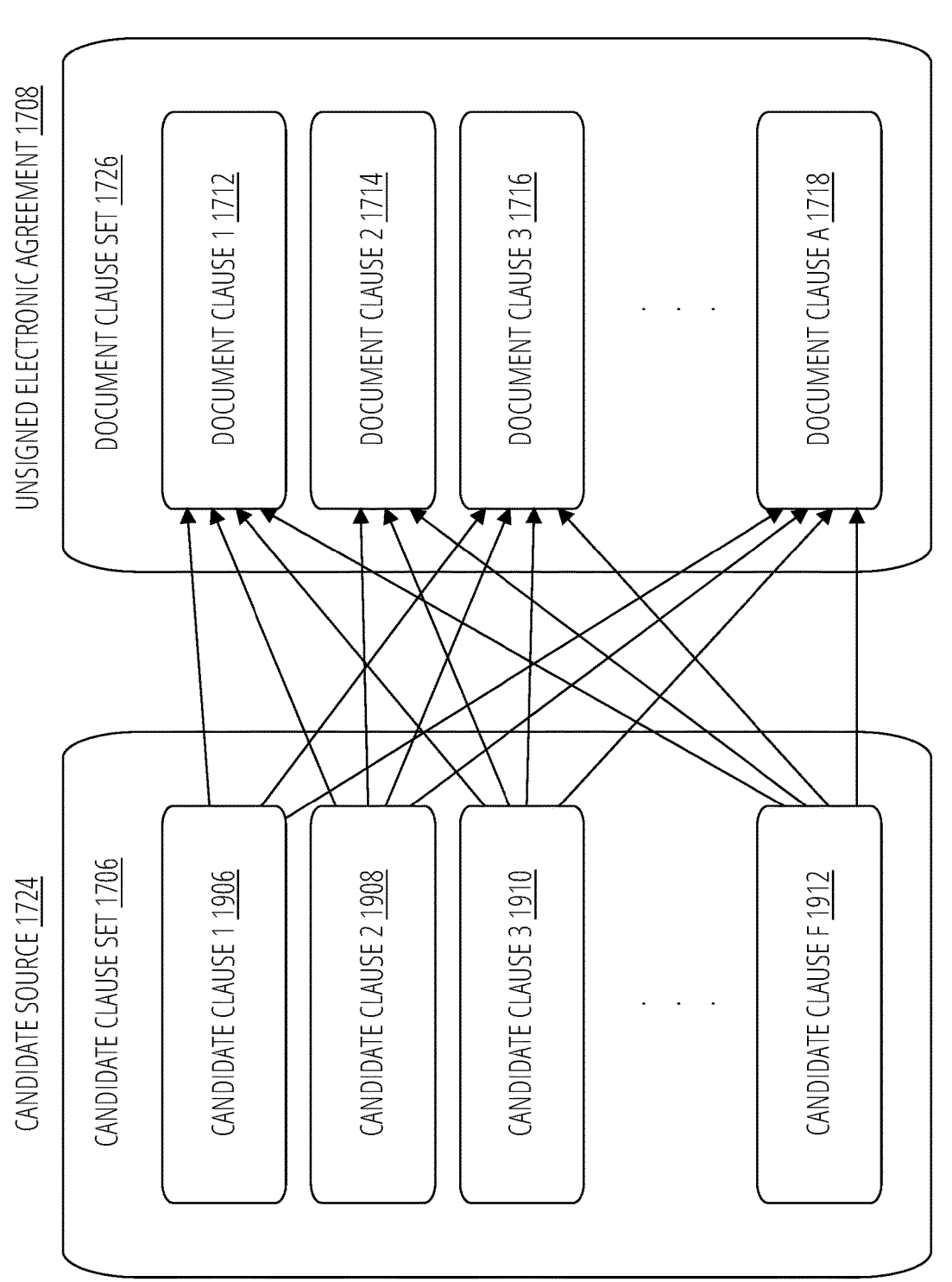
FIG. 20 illustrates a candidate clause set 1706 in accordance with one embodiment.

FIG. 20 illustrates an example of a candidate clause set 1706 for a candidate source 1724 and a document clause set 1726 for an unsigned electronic agreement 1708. The insight manager 124 may generate a similarity score for each candidate clause 1906-1912 of a candidate clause set 1706 of a candidate source 1724 using the machine learning model, such as the insight model 1704. The insight manager 124 may generate a similarity score for each document clause 1712-1718 of a document clause set 1710 of an unsigned electronic agreement 1708 using the insight model 1704. The insight manager 124 may identify a set of related document clauses 1914 shared between the set of documents clauses 1712-1718 of the unsigned electronic agreement

1708 and the set of candidate clauses 1906-1912 of the candidate source 1724 based on the similarity scores.

Figure 21:
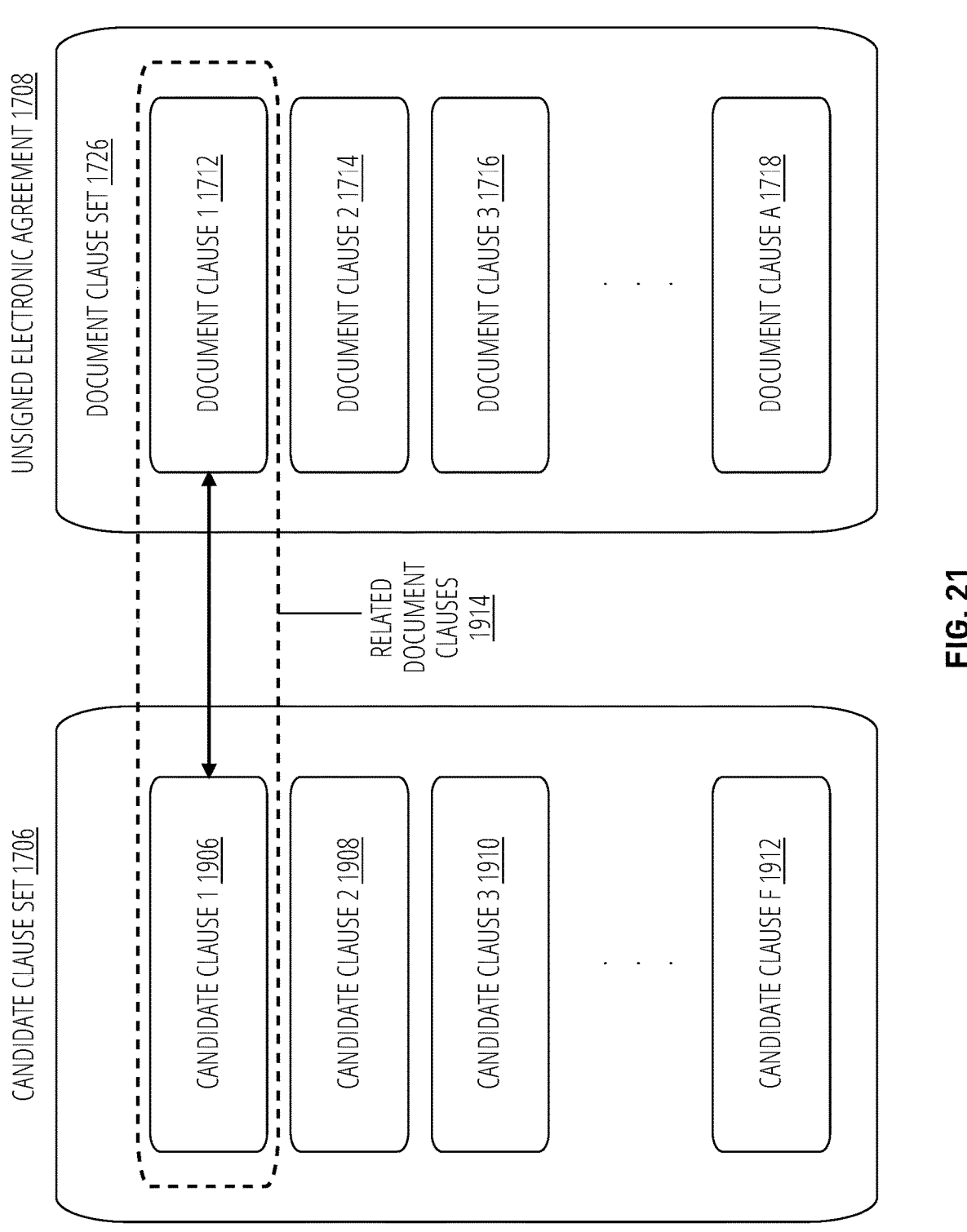
FIG. 21 illustrates related document clauses 1914 in accordance with one embodiment.

FIG. 21 illustrates an example set of related document clauses 1914 between a candidate clause set 1706 and an unsigned electronic agreement 1708. As depicted in FIG. 21, the insight manager 124 may use the insight model 1704 to identify the candidate clause 1 1906 and the document clause 1 1712 as related document clauses 1914. For example, the candidate clause 1 1906 and the document clause 1 1712 of the set of related document clauses 1914 may both be paragraphs of text information defining or discussing a choice of governing law in a licensing agreement, or a lease term for a rental agreement, for example.

Figure 22:
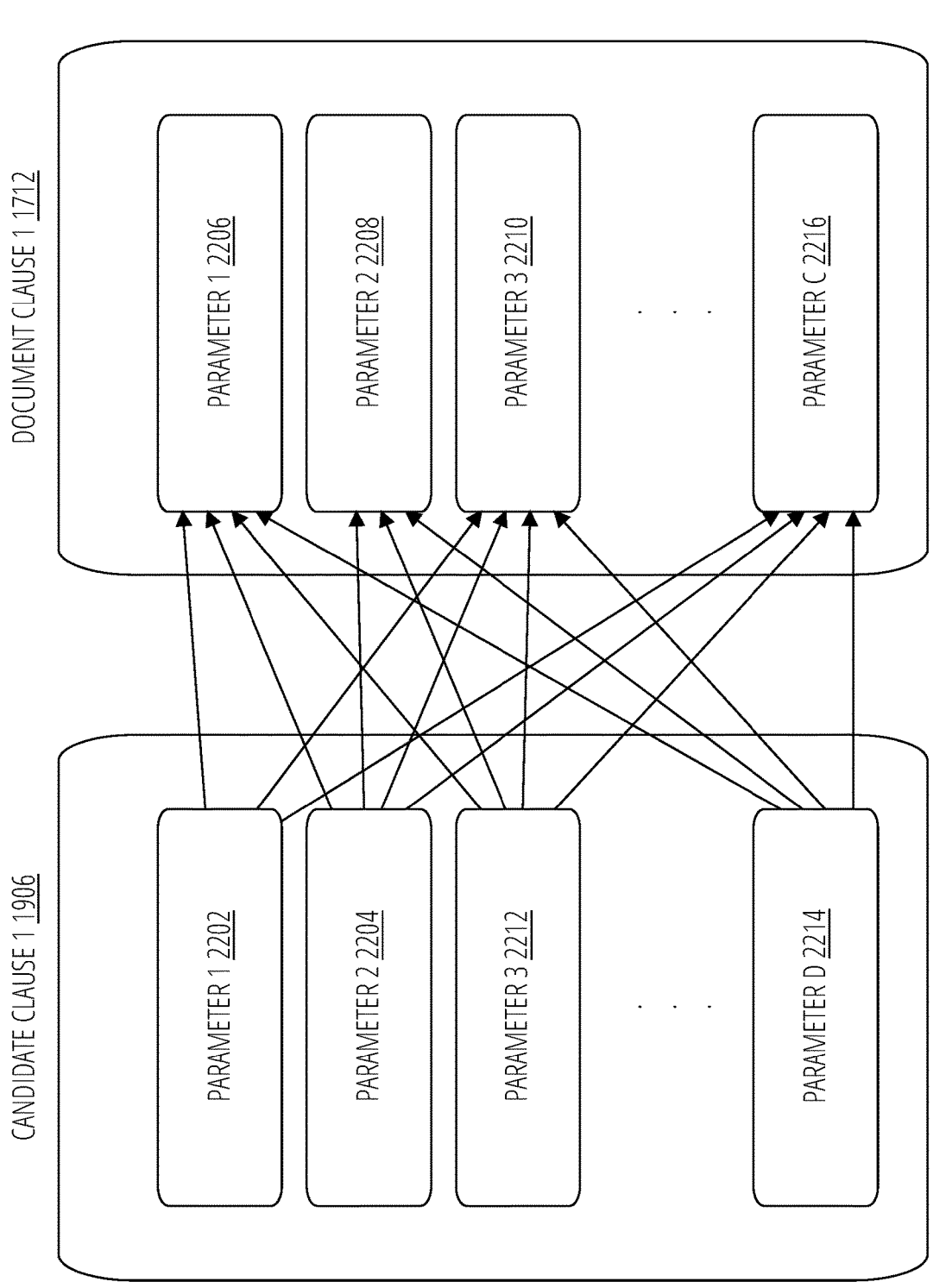
FIG. 22 illustrates parameters for the related document clauses 1914 in accordance with one embodiment.

FIG. 22 illustrates an example of a candidate clause 1 1906 for a candidate clause set 1706 of a candidate source 1724 and a document clause 1 1712 for a document clause set 1726 of an unsigned electronic agreement 1708. The insight manager 124 may generate a similarity score for each parameter 2202-2214 of the candidate clause 1 1906 of the set of related document clauses 1914 using the insight model 1704. The insight manager 124 may also generate a similarity score for each parameter 2206-2216 of the document clause 1 1712 of the set of related document clauses 1914 using the insight model 1704. The insight manager 124 may identify a set of common parameters shared between the document clause 1 1712 and the candidate clause 1 1906 of the set of related documents related document clauses 1914 based on the similarity scores.

Figure 23:
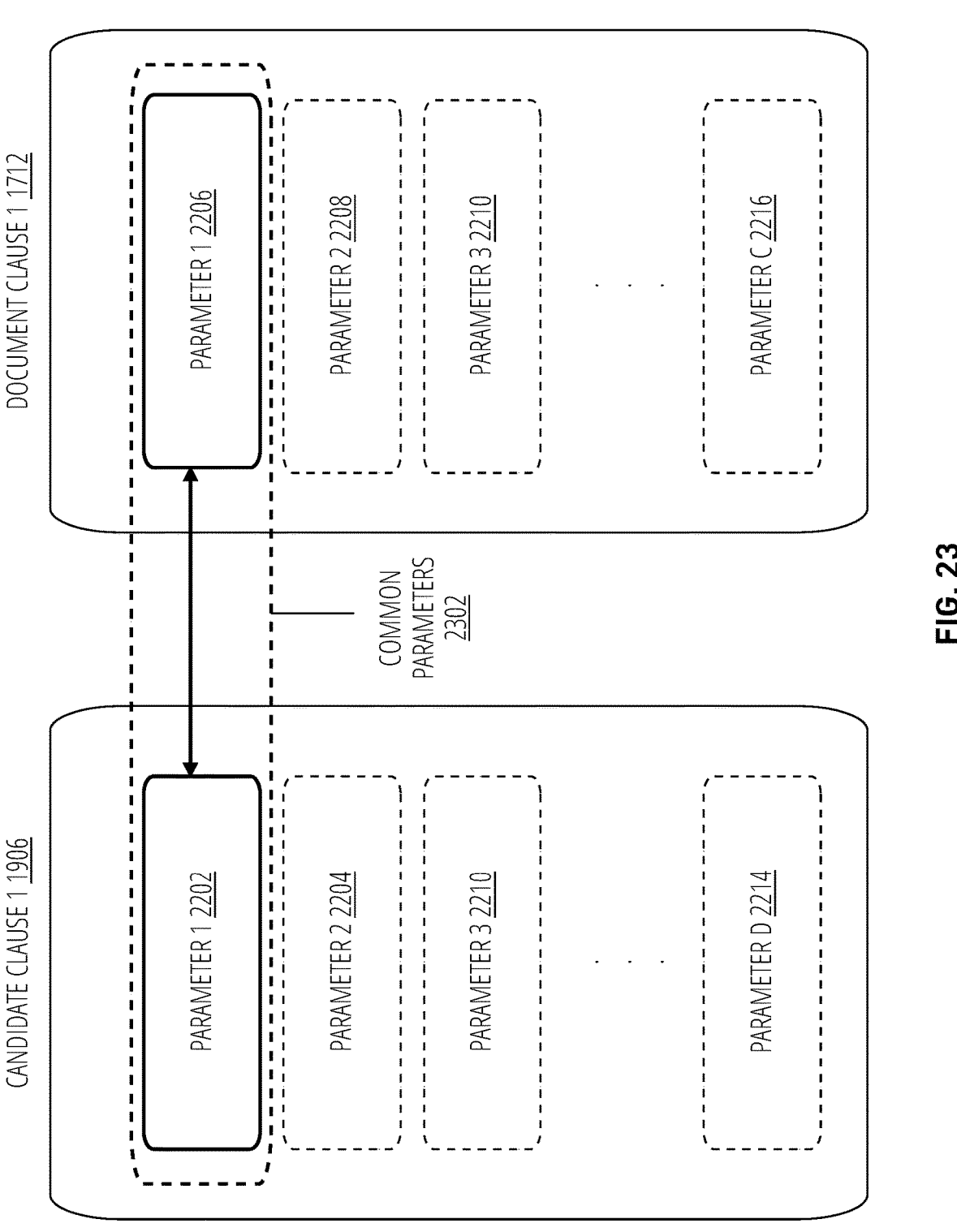
FIG. 23 illustrates common parameters 2302 in accordance with one embodiment.

FIG. 23 illustrates an example set of common parameters 2302 between the candidate clause 1 1906 of the candidate clause set 1706 of a candidate source 1724 and a document clause 1 1712 of the document clause set 1726 of the unsigned electronic agreement 1708. For example, the parameter 1 2202 and parameter 1 2206 may both be words or sentences within a paragraph of text information defining or discussing a state of California as a choice of governing law in a licensing agreement, or a lease term of 3 years for a rental agreement, for example.

Figure 24:
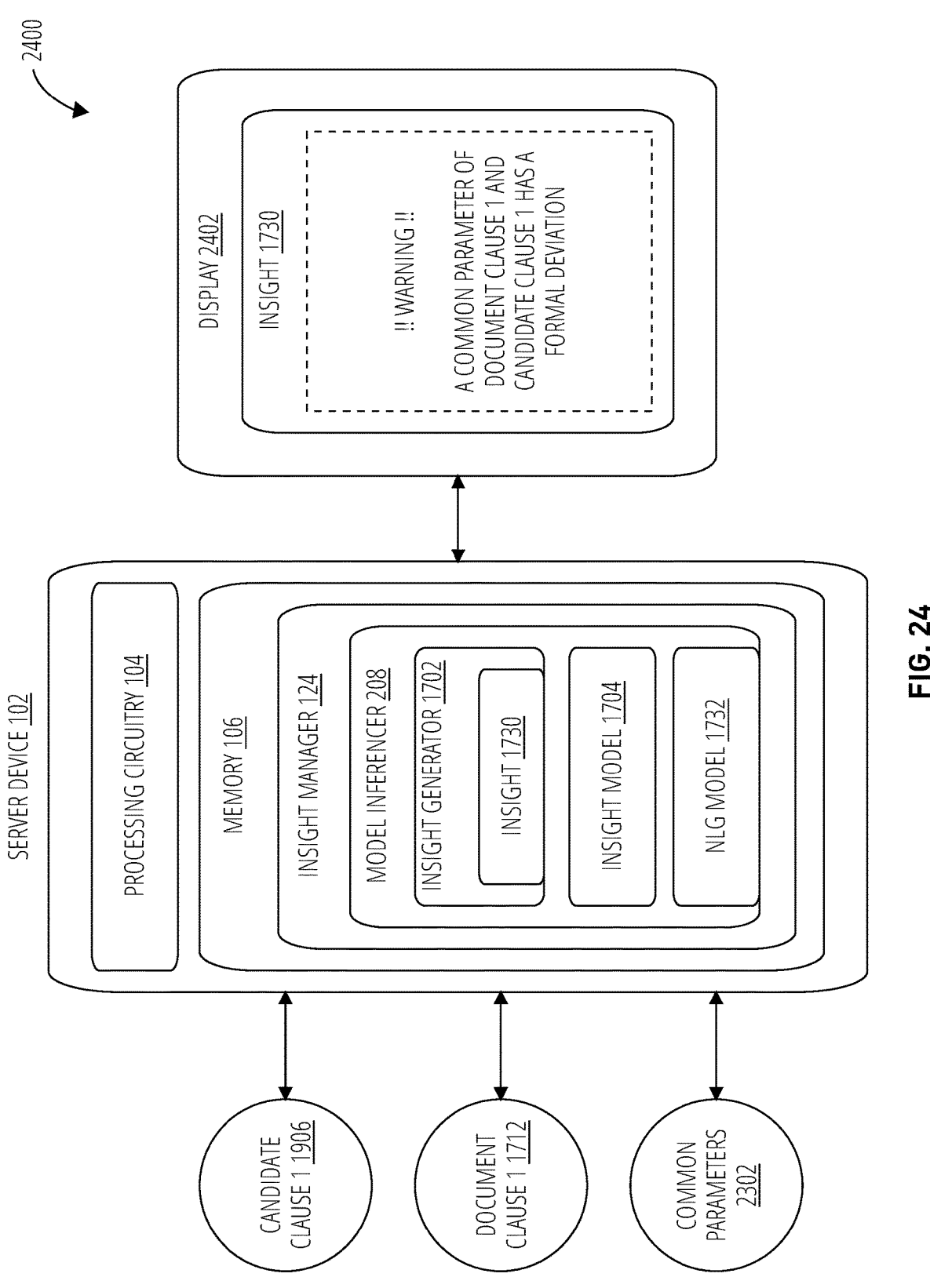
FIG. 24 illustrates an operating environment 2400 in accordance with one embodiment.

FIG. 24 illustrates an operating environment 2400 for the server device 102. The operating environment 2400 depicts the insight manager 124 implementing the model inferencer 208 with an insight generator 1702, the insight model 1704 and the NLG model 1732. The insight manager 124 retrieves a set of related document clauses 1914 comprising the candidate clause 1 1906 and the document clause 1 1712. The insight manager 124 also retrieves a set of common parameters 2302 comprising the parameter 1 2202 and the parameter 1 2206. The insight manager 124 detects a formal deviation between the common parameters 2302.

By way of example, assume the parameter 1 2202 of the candidate clause 1 1906 of the candidate source 1724 is a lease term of 3 years and the parameter 1 2206 of the document clause 1 1712 of the unsigned electronic agreement 1708 is a least term of 1 year. Further assume the candidate source 1724 is a document rule set 1802 for the leasing company XYZ, and the document rule 1 1804 is a formal rule that all lease terms for new lease agreements must be a minimum of 3 years.

The insight 1730 may describe the formal deviation using a natural language representation. The NLG model 1732 may generate an insight 1730 as a warning with a written description of the formal deviation in a natural language such as the English language for presentation on an electronic display 2402. The NLG model 1732 generates a written description of the formal deviation as if it were generated by a human that was describing the formal deviation. Furthermore, the written description is generated with original informational content after each formal deviation is identified, and is not simply a pre-defined written description stored in a file. The NLG model 1732 includes a generator that is trained to create new, original data that resembles the training data 328 in some way, while also introducing variations and creativity. Consequently, the NLG model 1732 generates new, original descriptions for a formal deviation that resembles previous descriptions in some way, while also introducing variations and creativity in each description of every formal deviation. This is analogous to when a human being is repeatedly asked to describe an object or event. Each description would be original and would vary in detail, word selection, facts, observations and insights. Similarly, the NLG model 1732 is trained to generate an original description of each formal deviation in a new and unique manner, with variations in detail, word selection, facts, observations and insights. In this manner, the NLG model 1732 uses artificial intelligence that mimics human intelligence when generating an original, new and creative description of formal deviations for the unsigned electronic agreement 1708.

Figure 25:
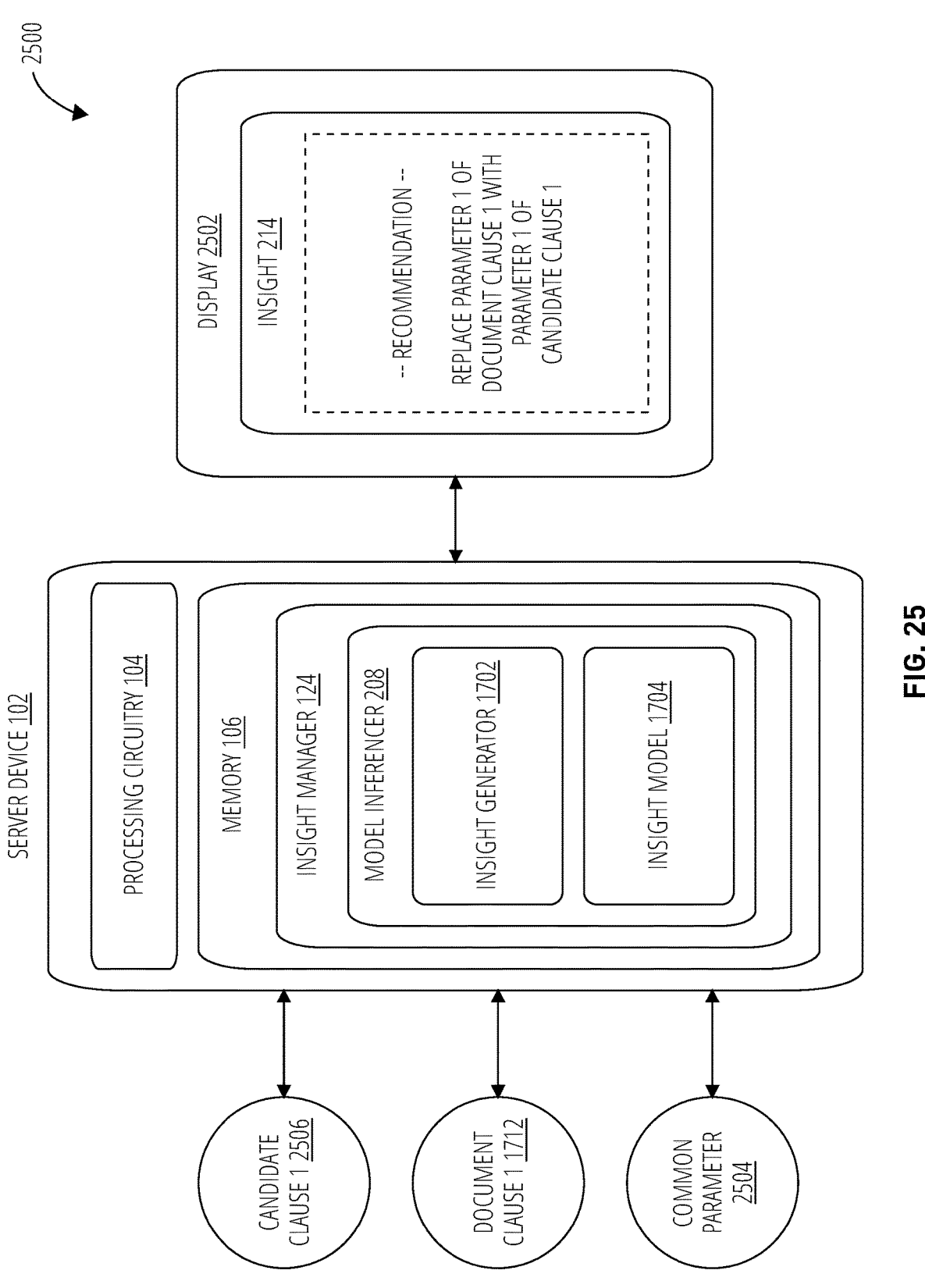
FIG. 25 illustrates an operating environment 2500 in accordance with one embodiment.

FIG. 25 illustrates operating environment 2500 for the server device 102. Similar to the operating environment 2400, the NLG model 1732 may generate an insight 1730 as a recommendation with a written description of the formal deviation in the English language for presentation on an electronic display 2402. The NLG model 1732 generates the written description of the formal deviation as if a human were describing the formal deviation. Furthermore, the written description is generated after the formal deviation is identified, and is not simply a pre-defined written description stored in a file. Instead the written description is original and would vary from previous descriptions in detail, word selection, facts, observations and insights.

FIG. 26 illustrates an operating environment 2600 for the server device 102. The operating environment 2600 depicts an example of a candidate source 1724 comprising a signed electronic agreement 1722 with a candidate clause 1 1906 and a parameter 1 2202. The operating environment 2600 also depicts an example of an unsigned electronic agreement 1708 with a document clause 1 1712 and a parameter 1 2206. The candidate clause 1 1906 and the document clause 1 1712 are within a set of related document clauses 1914. The parameter 1 2202 and the parameter 1 2206 are within a set of common parameters 2302.

As shown in FIG. 26, the candidate source 1724 is a previously signed rental agreement for the leasing company XYZ. The unsigned electronic agreement 1708 is a new rental agreement drafted by an employee of the leasing company XYZ. The candidate clause 1 1906 is a paragraph labeled "2. Rent" for the previously signed rental agreement. The document clause 1 1712 is also a paragraph labeled "2. Rent" for the new unsigned rental agreement. Since both paragraphs have the same label and similar informational content, the insight manager 124 identified both rent paragraphs as similar or related.

Once the insight manager 124 identifies both Rent paragraphs as related, the insight manager attempts to identify common parameters 2302 found in both Rent paragraphs. In this example, parameter 1 2202 has a sentence using a value $2,500.00 found within 2 words of the term "monthly" and 5 words of the term "rent." Parameter 1 2206 has a sentence using a value $1,500.00 found within 2 words of the term "monthly" and 5 words of the term "rent." Since both sentences comprise the same terms with the same positional locations within related rental paragraphs, with different values of $2500.00 and $1500.00, the insight manager 124 identified the value of $2500.00 as parameter 1 2202 and the value of $1500.00 as parameter 1 2206, detected a formal deviation between the values of $2500.00 and $1500.00, and generated an insight 1730 describing the formal deviation in a natural language with an original description that is human-like in quality.

FIG. 27 illustrates a logic flow 2700. The logic flow 2700 may be executed by the server device 102. The logic flow 2700 illustrates a case where a candidate source 1724 is a document rule set 1728 for a defined entity.

At block 2702, the logic flow 2700 may retrieve a document rule of a document rule set for a defined entity from a rules database. For example, the insight manager 124 of the server device 102 may retrieve a document rule 1 1804 of a document rule set 1728 for a defined entity such as leasing company XYZ from a rules database 704.

At block 2704, the logic flow 2700 may retrieve an unsigned electronic agreement associated with the defined entity, the unsigned electronic agreement having one or more document clauses. For example, the insight manager 124 of the server device 102 may retrieve an unsigned electronic agreement 1708 associated with the defined entity of leasing company XYZ, the unsigned electronic agreement 1708 having one or more document clauses 1712-1718.

At block 2706, the logic flow 2700 may compare a document clause of the unsigned electronic agreement associated with the defined entity with the document rule with a machine learning model. For example, the insight manager 124 may compare a document clause 1712-1718 of the unsigned electronic agreement 1708 associated with the defined entity of leasing company XYZ with a document clause 1812-1818 associated with document rules 1804-1810 with the insight model 1704.

At block 2708, the logic flow 2700 may generate an insight based on a comparison between one or more parameters of the document clause of the unsigned electronic agreement associated with the defined entity and one or more parameters of the document rule. For example, the insight manager 124 may generate an insight 1730 based on a comparison between one or more parameters of the document clause 1712-1718 of the unsigned electronic agreement 1708 associated with the defined entity of leasing company XYZ and one or more parameters of the document rules 1804-1810 with the insight model 1704.

At block 2710, the logic flow 2700 may generate a recommendation to replace one or more parameters of the document clause of the unsigned electronic agreement associated with the defined entity with one or more parameters of the document rule. For example, the insight manager 124 may use the NLG model 1732 to generate an insight 1730 with a written recommendation to replace one or more parameters of the document clause 1712-1718 of the unsigned electronic agreement 1708 associated with the defined entity of leasing company XYZ with one or more parameters of the document rule 1804-1810.

FIG. 28 illustrates a logic flow 2800. The logic flow 2800 may be executed by the server device 102. The logic flow 2800 illustrates a case where a candidate source 1724 is a document version 1720 for a defined entity.

At block 2802, the logic flow 2800 may determine an unsigned electronic agreement is a first document version of the unsigned electronic agreement and a candidate source is a second document version of the unsigned electronic agreement. For example, the insight manager 124 may determine an unsigned electronic agreement 1708 is a first document version of the unsigned electronic agreement 1708 and a candidate source 1724 is a second document version 1720 of the unsigned electronic agreement 1708.

At block 2804, the logic flow 2800 may identify multiple sets of related document clauses between the first document version and the second document version using a machine learning model. For example, the insight manager 124 may identify multiple sets of related document clauses 1914 between the first document version and the second document version using a machine learning model, such as the insight model 1704.

At block 2806, the logic flow 2800 may identify a set of common parameters shared between each set of related document clauses using the machine learning model. For example, the insight manager 124 may identify a set of common parameters 2302 shared between each set of related document clauses 1914 using the insight model 1704.

At block 2808, the logic flow 2800 may generate an insight based on the formal deviations using the NLG model, the insight to describe the formal deviations in a natural language representation, the insight to comprise a text summary of the formal deviations using a text summarization algorithm. For example, the insight manager 124 may analyze the sets of common parameters 2302 for formal deviations between the common parameters 2302, and generate an insight 1730 based on the formal deviations using the NLG model 1732. The insight 1730 may describe the formal deviations in a natural language representation. For example, the insight 1730 may comprise a text summary of the formal deviations using a text summarization algorithm.

Figure 29:
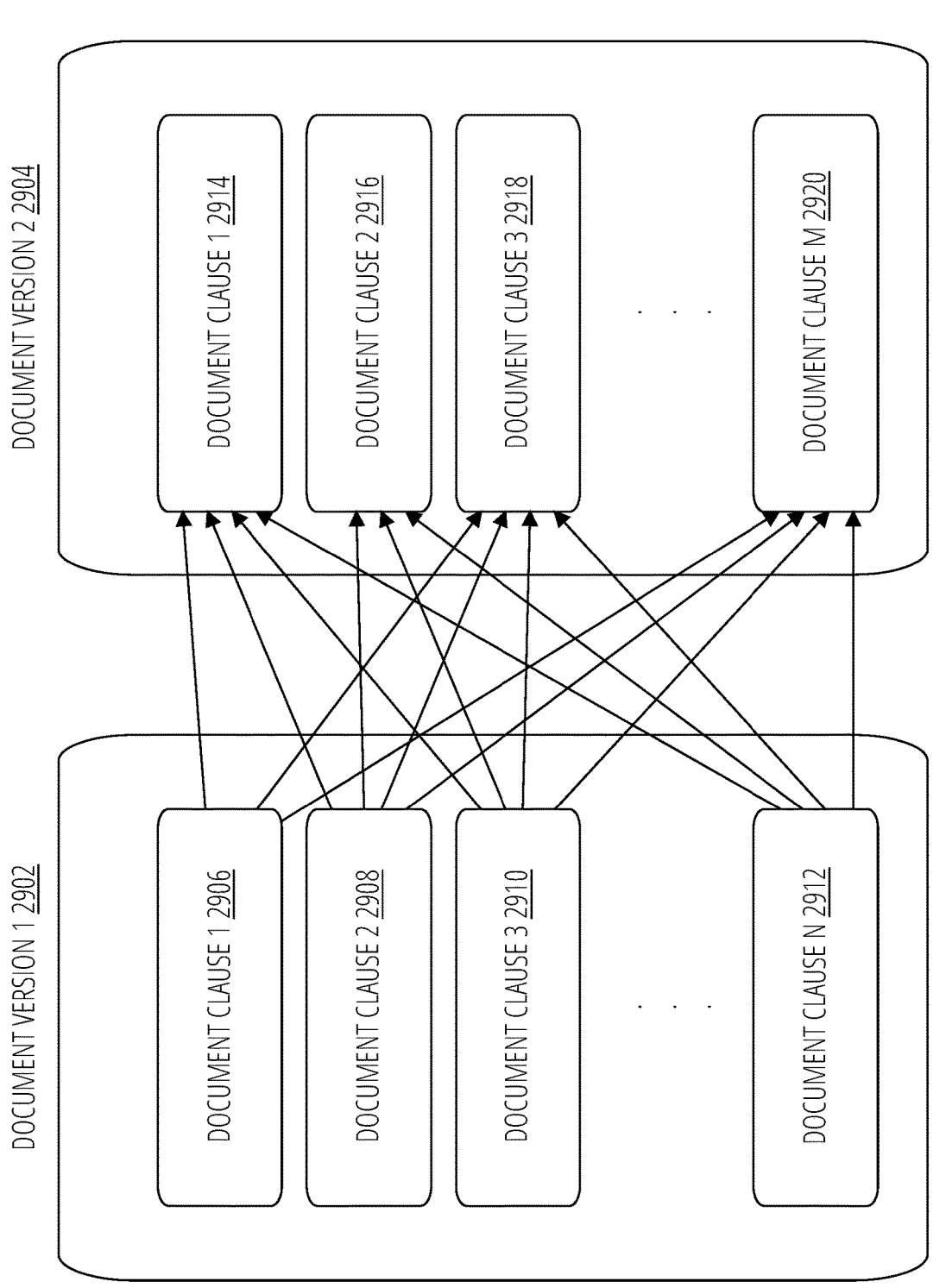
FIG. 29 illustrates document versions 1720 in accordance with one embodiment.

FIG. 29 illustrates a comparison between document clauses of different versions of an unsigned electronic agreement 1708. As depicted in FIG. 29, a first document version 1 2902 may comprise a set of document clauses that includes a document clause 1 2906, a document clause 2 2908, a document clause 3 2910 and a document clause N 2912, where Nis any positive integer. FIG. 29 also depicts a second document version 2 2904 comprising a set of document clauses that includes document clause 1 2914, document clause 2 2916, document clause 3 2918 and document clause M 2920, where M is any positive integer. The insight manager 124 may compare and analyze document clauses 2906-2912 with document clauses 2914-2920 to find a related set of related document clauses 1914, and detect any deviations between document clauses within the set of related document clauses 1914. The deviations may include formal deviations and informal deviations.

Figure 30:
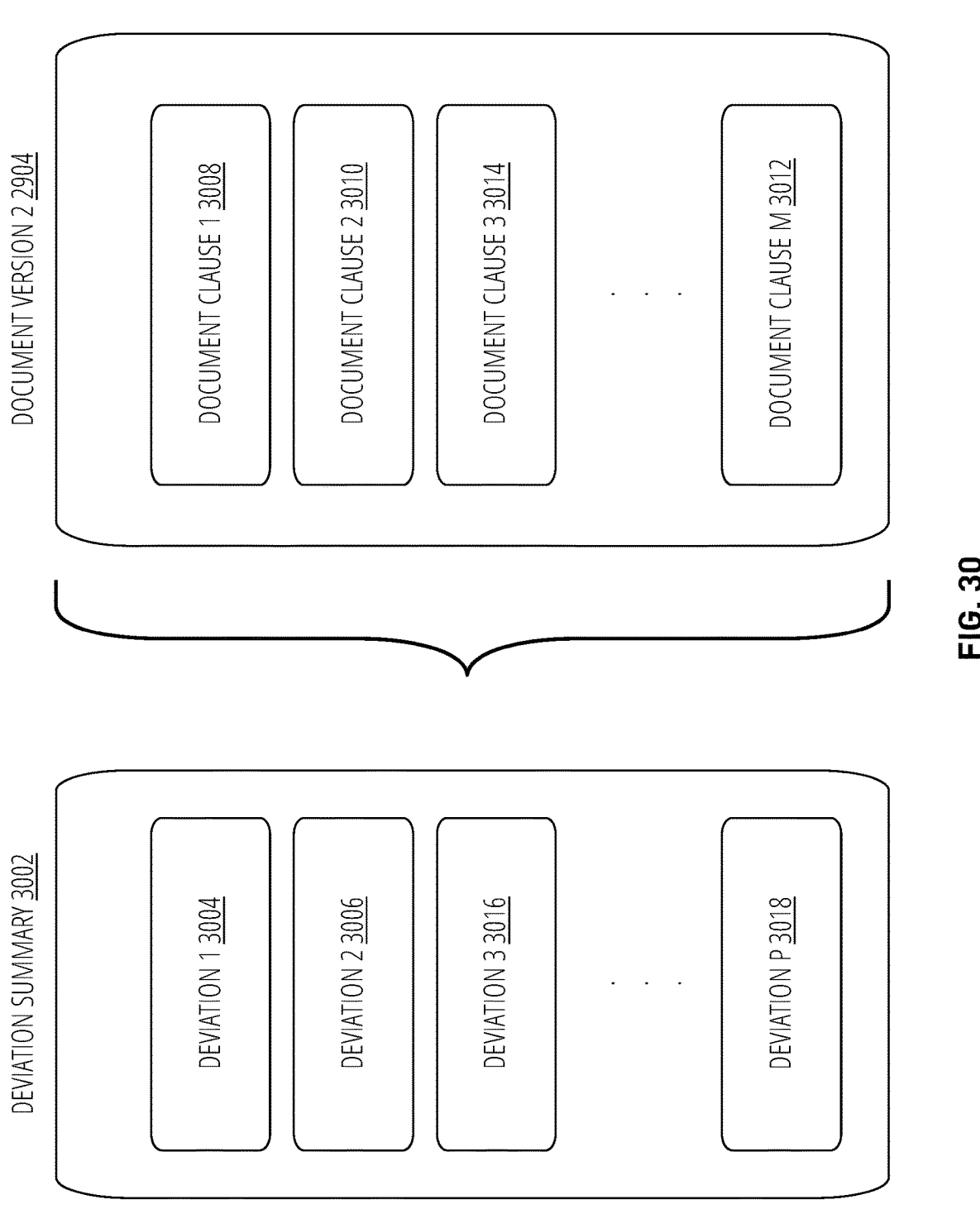
FIG. 30 illustrates a deviation summary 3002 in accordance with one embodiment.

FIG. 30 illustrates a deviation summary 3002 for the document version 2 2904. The insight manager 124 may compare the different document versions of the unsigned electronic agreement 1708 and create a deviation summary 3002. The deviation summary 3002 may include a set of deviations from, or modifications made to, the document version 2 2904 relative to the document version 1 2902. The deviation summary 3002 may comprise a deviation 1 3004, a deviation 2 3006, a deviation 3 3016 and a deviation P 3018, where P is any positive integer. The deviations may include any differences between the document version 1 2902 and the document version 2 2904, including both formal deviations and informal deviations.

FIG. 31 illustrates a text summary 3102 for the deviation summary 3002. Once the insight manager 124 generates a deviation summary 3002 for the document version 2 2904, the insight manager 124 may use the NLG model 1732 to generate a text summary 3102 for the deviation summary 3002. The text summary 3102 may describe the deviations 3004-3018 in a natural language representation, such as written text in a natural language such as English, for example. The NLG model 1732 may implement a text summarization algorithm to generate the text summary 3102 so that it appears that a human being generated the text summary 3102.

In one embodiment, a generative AI model such as the NLG model 1732 can be used to summarize changes between two versions of a document. This can be achieved through a technique called text summarization, which involves identifying the most important information in a document and condensing it into a shorter summary. One approach to text summarization is called extractive summarization, which involves identifying the most important sentences or phrases in a document and extracting them to create a summary. Another approach is abstractive summarization, which involves generating new sentences that capture the meaning of the original text. The NLG model 1732 may use an unsupervised approach to summarization, such as offered by ML algorithms such as LexRank and TextRank, for example. Embodiments are not limited to these examples.

To use a generative AI such as the NLG model 1732 for summarizing changes between two versions of a document, the NLG model 1732 would need to be trained on pairs of documents that have been annotated to identify the changes between them. The NLG model 1732 could then use this training data to identify the changes between the two versions of a document and generate a summary that highlights the key differences.

By way of example, assume the document version 1 2902 and the document version 2 2904 are two versions of a legal contract. The insight manager 124 may compare the two versions in order to identify any changes between them. The insight manager 124 may use the NLG model 1732 to analyze the two versions of the contract and create a summary that highlights the key differences between them.

The NLG model 1732 would need to be trained on pairs of annotated contracts that have been marked up to indicate the changes between them. The NLG model 1732 could then use this training data to identify the changes between the two versions of the legal contract. For example, the NLG model 1732 might identify that a paragraph has been added to the second version of the contract, while another paragraph has been removed. It might also identify changes to specific clauses or sections of the contract. Based on these identified changes, the NLG model 1732 then generates a text summary 3102 that highlights the key differences between the two versions of the contract. The text summary 3102 could include a list of the added or removed paragraphs, along with a brief description of the changes to specific clauses or sections.

In another example, assume the document version 1 2902 and the document version 2 2904 are two versions of a scientific paper. The insight manager 124 may use the NLG model 1732 to analyze the two versions of the paper and create a text summary 3102 that highlights the key differences between them. The NLG model 1732 may be trained on pairs of annotated papers that have been marked up to indicate the changes between them. The NLG model 1732 could then use this training data to identify the changes between the two versions of the paper. For example, the NLG model 1732 might identify that a section has been added to the second version of the paper, while another section has been removed. It might also identify changes to specific figures or tables in the paper. Based on these identified changes, the NLG model 1732 could then generate a summary that highlights the key differences between the two versions of the paper. The text summary 3102 could include a list of the added or removed sections, along with a brief description of the changes to specific figures or tables.

Figure 32:
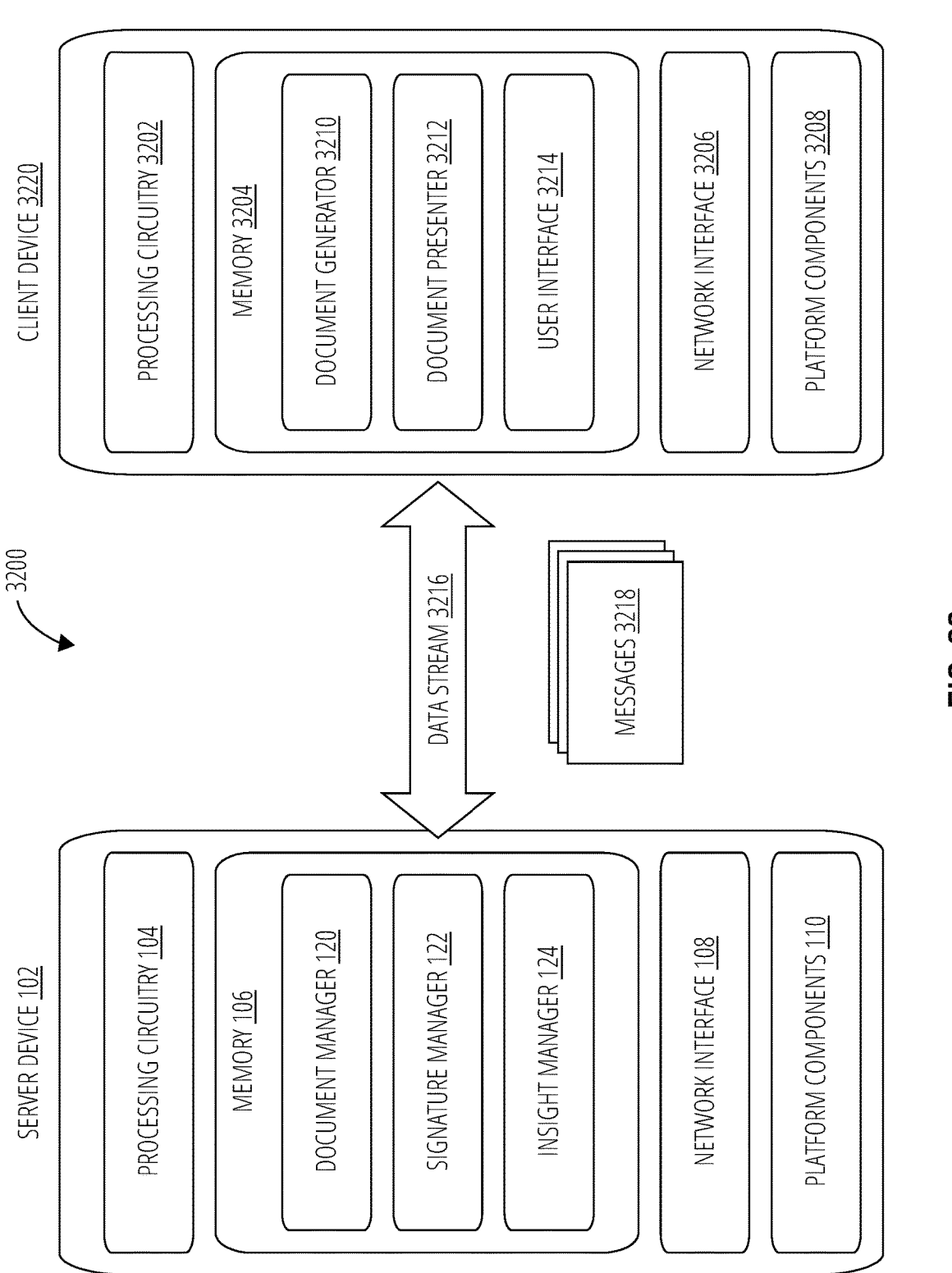
FIG. 32 illustrates a distributed system 3200 in accordance with one embodiment.

FIG. 32 illustrates a distributed system 3200. The distributed system 3200 may implement the server device 102 communicating a data stream 3216 to a client device 3220. The client device 3220 may comprise an example implementation for the client devices 112, the client devices 116, the device 212, the device 216 and/or the device 220. The client device 3220 may comprise processing circuitry 3202 communicatively coupled to a memory 3204. The memory 3204 may store instructions that when executed by the processing circuitry 3202 may cause the processing circuitry 3202 to perform operations for a document generator 3210, a document presenter 3212 and a user interface 3214. A client 210 may interact with the client device 3220 via the user interface 3214 to generate an electronic document 142 using the document manager 120 of the server device 102. Control and media information to coordinate generation of the electronic document 142 may be transported by one or more messages 3218 over the data stream 3216 via the network interface 3206 over a wired or wireless communication medium. The client 210 may interact with the client device 3220 via the user interface 3214 to render or present an electronic document 142 on an input/output (I/O) device of the platform components 3208, such as touch screen of the client device 3220, to perform various operations on an electronic document 142, such as generate the electronic document 142, present the electronic document 142, attach an electronic signature to the electronic document 142, and so forth.

Figure 33:
FIG. 33 illustrates a computer-readable storage medium 3302 in accordance with one embodiment.

FIG. 33 illustrates an apparatus 3300. Apparatus 3300 may comprise any non-transitory computer-readable storage medium 3302 or machine-readable storage medium, such as an optical, magnetic or semiconductor storage medium. In various embodiments, apparatus 3300 may comprise an article of manufacture or a product. In some embodiments, the computer-readable storage medium 3302 may store computer executable instructions with which circuitry can execute. For example, computer executable instructions 3304 can include instructions to implement operations described with respect to any logic flows described herein. Examples of computer-readable storage medium 3302 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 3304 may include any suitable type of code, such as source code, compiled code, interpreted code, executable code, static code, dynamic code, object-oriented code, visual code, and the like.

FIG. 34 illustrates an embodiment of a computing architecture 3400. Computing architecture 3400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 3400 may have a single processor with one core or more than one processor. Note that the term "processor" refers to a processor with a single core or a processor package with multiple processor cores. In at least one embodiment, the computing computing architecture 3400 is representative of the components of the system 100. More generally, the computing computing architecture 3400 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 3400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 34, computing architecture 3400 comprises a system-on-chip (SoC) 3402 for mounting platform components. System-on-chip (SoC) 3402 is a point-to-point (P2P) interconnect platform that includes a first processor 3404 and a second processor 3406 coupled via a point-to-point interconnect 3470 such as an Ultra Path Interconnect (UPI). In other embodiments, the computing architecture 3400 may be of another bus architecture, such as a multi-drop bus. Furthermore, each of processor 3404 and processor 3406 may be processor packages with multiple processor cores including core(s) 3408 and core(s) 3410, respectively. While the computing architecture 3400 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 3404 and chipset 3432. Some platforms may include additional components and some platforms may only include sockets to mount the processors and/or the chipset.

Furthermore, some platforms may not have sockets (e.g. SoC, or the like). Although depicted as a SoC 3402, one or more of the components of the SoC 3402 may also be included in a single die package, a multi-chip module (MCM), a multi-die package, a chiplet, a bridge, and/or an interposer. Therefore, embodiments are not limited to a SoC.

The processor 3404 and processor 3406 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 3404 and/or processor 3406. Additionally, the processor 3404 need not be identical to processor 3406.

Processor 3404 includes an integrated memory controller (IMC) 3420 and point-to-point (P2P) interface 3424 and P2P interface 3428. Similarly, the processor 3406 includes an IMC 3422 as well as P2P interface 3426 and P2P interface 3430. IMC 3420 and IMC 3422 couple the processor 3404 and processor 3406, respectively, to respective memories (e.g., memory 3416 and memory 3418). Memory 3416 and memory 3418 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 3416 and the memory 3418 locally attach to the respective processors (i.e., processor 3404 and processor 3406). In other embodiments, the main memory may couple with the processors via a bus and shared memory hub. Processor 3404 includes registers 3412 and processor 3406 includes registers 3414.

Computing architecture 3400 includes chipset 3432 coupled to processor 3404 and processor 3406. Furthermore, chipset 3432 can be coupled to storage device 3450, for example, via an interface (I/F) 3438. The I/F 3438 may be, for example, a Peripheral Component Interconnect-enhanced (PCIe) interface, a Compute Express Link® (CXL) interface, or a Universal Chiplet Interconnect Express (UCIe) interface. Storage device 3450 can store instructions executable by circuitry of computing architecture 3400 (e.g., processor 3404, processor 3406, GPU 3448, accelerator 3454, vision processing unit 3456, or the like). For example, storage device 3450 can store instructions for server device 102, client devices 112, client devices 116, or the like.

Processor 3404 couples to the chipset 3432 via P2P interface 3428 and P2P 3434 while processor 3406 couples to the chipset 3432 via P2P interface 3430 and P2P 3436. Direct media interface (DMI) 3476 and DMI 3478 may couple the P2P interface 3428 and the P2P 3434 and the P2P interface 3430 and P2P 3436, respectively. DMI 3476 and DMI 3478 may be a high-speed interconnect that facilitates, e.g., eight Giga Transfers per second (GT/s) such as DMI 3.0. In other embodiments, the processor 3404 and processor 3406 may interconnect via a bus.

The chipset 3432 may comprise a controller hub such as a platform controller hub (PCH). The chipset 3432 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 3432 may comprise more than one controller hub such as a chipset with a memory controller hub, a graphics controller hub, and an input/output (I/O) controller hub.

In the depicted example, chipset 3432 couples with a trusted platform module (TPM) 3444 and UEFI, BIOS, FLASH circuitry 3446 via I/F 3442. The TPM 3444 is a dedicated microcontroller designed to secure hardware by integrating cryptographic keys into devices. The UEFI, BIOS, FLASH circuitry 3446 may provide pre-boot code. The I/F 3442 may also be coupled to a network interface circuit (NIC) 3480 for connections off-chip.

Furthermore, chipset 3432 includes the I/F 3438 to couple chipset 3432 with a high-performance graphics engine, such as, graphics processing circuitry or a graphics processing unit (GPU) 3448. In other embodiments, the computing architecture 3400 may include a flexible display interface (FDI) (not shown) between the processor 3404 and/or the processor 3406 and the chipset 3432. The FDI interconnects a graphics processor core in one or more of processor 3404 and/or processor 3406 with the chipset 3432.

The computing architecture 3400 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 3454 and/or vision processing unit 3456 can be coupled to chipset 3432 via I/F 3438. The accelerator 3454 is representative of any type of accelerator device (e.g., a data streaming accelerator, cryptographic accelerator, cryptographic co-processor, an offload engine, etc.). One example of an accelerator 3454 is the Intel® Data Streaming Accelerator (DSA). The accelerator 3454 may be a device including circuitry to accelerate copy operations, data encryption, hash value computation, data comparison operations (including comparison of data in memory 3416 and/or memory 3418), and/or data compression. For example, the accelerator 3454 may be a USB device, PCI device, PCIe device, CXL device, UCIe device, and/or an SPI device. The accelerator 3454 can also include circuitry arranged to execute machine learning (ML) related operations (e.g., training, inference, etc.) for ML models. Generally, the accelerator 3454 may be specially designed to perform computationally intensive operations, such as hash value computations, comparison operations, cryptographic operations, and/or compression operations, in a manner that is more efficient than when performed by the processor 3404 or processor 3406. Because the load of the computing architecture 3400 may include hash value computations, comparison operations, cryptographic operations, and/or compression operations, the accelerator 3454 can greatly increase performance of the computing architecture 3400 for these operations.

The accelerator 3454 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 3454. For example, the accelerator 3454 may be shared according to the Single Root I/O virtualization (SR-IOV) architecture and/or the Scalable I/O virtualization (S-IOV)

architecture. Embodiments are not limited in these contexts. In some embodiments, software uses an instruction to atomically submit the descriptor to the accelerator 3454 via a non-posted write (e.g., a deferred memory write (DMWr)). One example of an instruction that atomically submits a work descriptor to the shared work queue of the accelerator 3454 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 3454. The dedicated work queue may accept job submissions via commands such as the movdir64b instruction.

Various I/O devices 3460 and display 3452 couple to the bus 3472, along with a bus bridge 3458 which couples the bus 3472 to a second bus 3474 and an I/F 3440 that connects the bus 3472 with the chipset 3432. In one embodiment, the second bus 3474 may be a low pin count (LPC) bus. Various devices may couple to the second bus 3474 including, for example, a keyboard 3462, a mouse 3464 and communication devices 3466.

Furthermore, an audio I/O 3468 may couple to second bus 3474. Many of the I/O devices 3460 and communication devices 3466 may reside on the system-on-chip (SoC) 3402 while the keyboard 3462 and the mouse 3464 may be add-on peripherals. In other embodiments, some or all the I/O devices 3460 and communication devices 3466 are add-on peripherals and do not reside on the system-on-chip (SoC) 3402.

FIG. 35 illustrates a block diagram of an exemplary communications architecture 3500 suitable for implementing various embodiments as previously described. The communications architecture 3500 includes various common communications elements, such as a transmitter, receiver, transceiver, radio, network interface, baseband processor, antenna, amplifiers, filters, power supplies, and so forth. The embodiments, however, are not limited to implementation by the communications architecture 3500.

As shown in FIG. 35, the communications architecture 3500 includes one or more clients 3502 and servers 3504. The clients 3502 may implement a client version of the server device 102, for example. The servers 3504 may implement a server version of the server device 102, for example. The clients 3502 and the servers 3504 are operatively connected to one or more respective client data stores 3508 and server data stores 3510 that can be employed to store information local to the respective clients 3502 and servers 3504, such as cookies and/or associated contextual information.

The clients 3502 and the servers 3504 may communicate information between each other using a communication framework 3506. The communications communication framework 3506 may implement any well-known communications techniques and protocols. The communications communication framework 3506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 3506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 3502 and the servers 3504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-35 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

In one aspect, a method, includes retrieving an unsigned electronic agreement associated with a defined entity, the unsigned electronic agreement having a set of document clauses, each document clause to have one or more parameters, retrieving a candidate source associated with the defined entity, the candidate source having a set of candidate clauses, each candidate clause to have one or more parameters, identifying a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source, identifying a set of common parameters shared between the set of related document clauses using the machine learning model, the set of common parameters to include a parameter from the document clause and a parameter from the candidate clause of the set of related document clauses, and generating an insight based on a formal deviation between the set of common parameters using a natural language generation (NLG) model, the insight to describe the formal deviation in a natural language representation.

The method may also include presenting the description of the formal deviation as natural language text on an electronic display.

The method may also include reproducing the description of the formal deviation as synthesized speech over an electronic speaker.

The method may also include where the candidate source to comprise a document rule set associated with the defined entity, the document rule set to include a set of document rules for the unsigned electronic agreement, each document rule associated with a candidate clause.

The method may also include where the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, where a candidate clause of the second document version is modified relative to the first document version.

The method may also include where the candidate source to comprise a signed electronic agreement, the signed electronic agreement associated with the defined entity and having an electronic signature.

The method may also include generating a similarity score for each candidate clause of the set of candidate clauses of the candidate source using the machine learning model, generating a similarity score for each document clause of the set of documents clauses of the unsigned electronic agreement using the machine learning model, and identifying the set of related document clauses shared between the set of documents clauses of the unsigned electronic agreement and the set of candidate clauses of the candidate source based on the similarity scores.

The method may also include generating a similarity score for each parameter of a candidate clause of the set of related document clauses using the machine learning model, generating a similarity score for each parameter of a document clause of the set of related documents clauses using the machine learning model, and identifying the set of common parameters shared between the document clause and the candidate clause of the set of related documents clauses based on the similarity scores.

The method may also include where the NLG model to comprise a large language model (LLM) to generate the natural language representation to describe the formal deviation, the LLM to comprise a deep neural network trained using supervised learning.

The method may also include where the NLG model to comprise a large language model (LLM) to generate the natural language representation to describe the formal deviation, the LLM to comprise a deep neural network trained using unsupervised learning.

The method may also include where the NLG model to comprise a large language model (LLM) to generate the natural language representation to describe the formal deviation, the LLM to comprise a deep neural network trained using a combination of unsupervised learning and supervised learning.

The method may also include where the NLG model to comprise a large language model (LLM) to generate the natural language representation to describe the formal deviation, the LLM to comprise a deep neural network trained using a generative pre-trained transformer (GPT) language model.

The method may also include training the NLG model in two stages, the first stage to train the NLG model with a generative pre-trained transformer (GPT) language model and unsupervised training data to reach a first language modeling objective to set initial parameters, and the second stage to train the NLG model with a discriminative language model with supervised training data to reach a second language modeling objective that adapts the set of initial parameters to a specific task.

The method may also include where the candidate source to comprise a document rule set associated with the defined entity, further includes generating the insight based on the formal deviation using the NLG model, the insight to comprise a natural language representation to describe the formal deviation between a document rule of the document rule set and a document clause of the unsigned electronic agreement.

The method may also include where the candidate source to comprise a document version of the unsigned electronic agreement, further includes generating the insight based on the formal deviation using the NLG model, the insight to comprise a natural language representation to describe the formal deviation between a document clause of the document version and a document clause of the unsigned electronic agreement.

The method may also include where the candidate source to comprise a signed electronic agreement, further includes generating the insight based on the formal deviation using the NLG model, the insight to comprise a natural language representation to describe the formal deviation between a document clause of the signed electronic agreement and a document clause of the unsigned electronic agreement.

The method may also include generating the machine learning model from a machine learning algorithm, the machine learning algorithm includes a neural network algorithm.

The method may also include generating the machine learning model from a machine learning algorithm, the machine learning algorithm includes a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, or a distributed artificial intelligence algorithm.

The method may also include determining the unsigned electronic agreement is a first document version of the unsigned electronic agreement and the candidate source is a second document version of the unsigned electronic agreement, identifying multiple sets of related document clauses between the first document version and the second document version using a machine learning model, identifying a set of common parameters shared between each set of related document clauses using the machine learning model, analyzing the sets of common parameters for formal deviations between the common parameters, and generating an insight based on the formal deviations using the NLG model, the insight to describe the formal deviations in a natural language representation, the insight to comprise a text summary of the formal deviations using a text summarization algorithm.

The method may also include where the unsigned electronic documents is prepared to receive one or more electronic signatures. Other technical features may be readily apparent to one skilled in the art from the following figures, descriptions, and claims.

In one aspect, a computing apparatus includes processing circuitry. The computing apparatus also includes a memory communicatively coupled to the processing circuitry, the memory storing instructions that, when executed by the processing circuitry, cause the processing circuitry to retrieve an unsigned electronic agreement associated with a defined entity, the unsigned electronic agreement having a set of document clauses, each document clause to have one or more parameters, retrieve a candidate source associated with the defined entity, the candidate source having a set of candidate clauses, each candidate clause to have one or more parameters, identify a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source, identify a set of common parameters shared between the set of related document clauses using the machine learning model, the set of common parameters to include a parameter from the document clause and a parameter from the candidate clause of the set of related document clauses, and generate an insight based on a formal deviation between the set of common parameters using a natural language generation (NLG) model, the insight to describe the formal deviation in a natural language representation.

The computing apparatus may also include the processing circuitry to present the description of the formal deviation as natural language text on an electronic display.

The computing apparatus may also include the processing circuitry to reproduce the description of the formal deviation as synthesized speech over an electronic speaker.

The computing apparatus may also include where the candidate source to comprise a document rule set associated with the defined entity, the document rule set to include a set of document rules for the unsigned electronic agreement, each document rule associated with a candidate clause.

The computing apparatus may also include where the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, where a candidate clause of the second document version is modified relative to the first document version.

The computing apparatus may also include where the candidate source to comprise a signed electronic agreement, the signed electronic agreement associated with the defined entity and having an electronic signature.

The computing apparatus may also include the processing circuitry to generate a similarity score for each candidate clause of the set of candidate clauses of the candidate source using the machine learning model, generate a similarity score for each document clause of the set of documents clauses of the unsigned electronic agreement using the machine learning model, and identify the set of related document clauses shared between the set of documents clauses of the unsigned electronic agreement and the set of candidate clauses of the candidate source based on the similarity scores.

The computing apparatus may also include the processing circuitry to generate a similarity score for each parameter of a candidate clause of the set of related document clauses using the machine learning model, generate a similarity score for each parameter of a document clause of the set of related documents clauses using the machine learning model, and identify the set of common parameters shared between the document clause and the candidate clause of the set of related documents clauses based on the similarity scores.

The computing apparatus may also include where the NLG model to comprise a large language model (LLM) to generate the natural language representation to describe the formal deviation, the LLM to comprise a deep neural network trained using supervised learning.

The computing apparatus may also include where the NLG model to comprise a large language model (LLM) to generate the natural language representation to describe the formal deviation, the LLM to comprise a deep neural network trained using unsupervised learning.

The computing apparatus may also include where the NLG model to comprise a large language model (LLM) to generate the natural language representation to describe the formal deviation, the LLM to comprise a deep neural network trained using a combination of unsupervised learn and supervised learning.

The computing apparatus may also include where the NLG model to comprise a large language model (LLM) to generate the natural language representation to describe the formal deviation, the LLM to comprise a deep neural network trained using a generative pre-trained transformer (GPT) language model.

The computing apparatus may also include the processing circuitry to train the NLG model in two stages, the first stage to train the NLG model with a generative pre-trained transformer (GPT) language model and unsupervised training data to reach a first language modeling objective to set initial parameters, and the second stage to train the NLG model with a discriminative language model with supervised training data to reach a second language modeling objective that adapts the set of initial parameters to a specific task.

The computing apparatus may also include where the candidate source to comprise a document rule set associated with the defined entity, where the instructions further configure the apparatus to generate the insight based on the formal deviation using the NLG model, the insight to comprise a natural language representation to describe the formal deviation between a document rule of the document rule set and a document clause of the unsigned electronic agreement.

The computing apparatus may also include where the candidate source to comprise a document version of the unsigned electronic agreement, where the instructions further configure the apparatus to generate the insight based on the formal deviation using the NLG model, the insight to comprise a natural language representation to describe the formal deviation between a document clause of the document version and a document clause of the unsigned electronic agreement.

The computing apparatus may also include where the candidate source to comprise a signed electronic agreement, where the instructions further configure the apparatus to generate the insight based on the formal deviation using the NLG model, the insight to comprise a natural language representation to describe the formal deviation between a document clause of the signed electronic agreement and a document clause of the unsigned electronic agreement.

The computing apparatus may also include the processing circuitry to generate the machine learning model from a machine learning algorithm, the machine learning algorithm includes a neural network algorithm.

The computing apparatus may also include the processing circuitry to generate the machine learning model from a machine learning algorithm, the machine learning algorithm includes a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, or a distributed artificial intelligence algorithm.

The computing apparatus may also include the processing circuitry to determine the unsigned electronic agreement is a first document version of the unsigned electronic agreement and the candidate source is a second document version of the unsigned electronic agreement, identify multiple sets of related document clauses between the first document version and the second document version using a machine learning model, identify a set of common parameters shared between each set of related document clauses using the machine learning model, analyze the sets of common parameters for formal deviations between the common parameters, and generate an insight based on the formal deviations using the NLG model, the insight to describe the formal deviations in a natural language representation, the insight to comprise a text summary of the formal deviations using a text summarization algorithm.

The computing apparatus may also include where the unsigned electronic documents is prepared to receive one or more electronic signatures. Other technical features may be readily apparent to one skilled in the art from the following figures, descriptions, and claims.

In one aspect, a non-transitory computer-readable storage medium, the computer-readable storage medium including instructions that when executed by a computer, cause the computer to retrieve an unsigned electronic agreement associated with a defined entity, the unsigned electronic agreement having a set of document clauses, each document clause to have one or more parameters, retrieve a candidate source associated with the defined entity, the candidate source having a set of candidate clauses, each candidate clause to have one or more parameters, identify a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source, identify a set of common parameters shared between the set of related document clauses using the machine learning model, the set of common parameters to include a parameter from the document clause and a parameter from the candidate clause of the set of related document clauses, and generate an insight based on a formal deviation between the set of common parameters using a natural language generation (NLG) model, the insight to describe the formal deviation in a natural language representation.

The computer-readable storage medium may also include instructions that when executed by the computer cause the computer to present the description of the formal deviation as natural language text on an electronic display.

The computer-readable storage medium may also include instructions that when executed by the computer cause the computer to reproduce the description of the formal deviation as synthesized speech over an electronic speaker.

The computer-readable storage medium may also include where the candidate source to comprise a document rule set associated with the defined entity, the document rule set to include a set of document rules for the unsigned electronic agreement, each document rule associated with a candidate clause.

The computer-readable storage medium may also include where the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, where a candidate clause of the second document version is modified relative to the first document version.

The computer-readable storage medium may also include where the candidate source to comprise a signed electronic agreement, the signed electronic agreement associated with the defined entity and having an electronic signature.

The computer-readable storage medium may also include instructions that when executed by the computer cause the computer to generate a similarity score for each candidate clause of the set of candidate clauses of the candidate source using the machine learning model, generate a similarity score for each document clause of the set of documents clauses of the unsigned electronic agreement using the machine learning model, and identify the set of related document clauses shared between the set of documents clauses of the unsigned electronic agreement and the set of candidate clauses of the candidate source based on the similarity scores.

The computer-readable storage medium may also include instructions that when executed by the computer cause the computer to generate a similarity score for each parameter of a candidate clause of the set of related document clauses using the machine learning model, generate a similarity score for each parameter of a document clause of the set of related documents clauses using the machine learning model, and identify the set of common parameters shared between the document clause and the candidate clause of the set of related documents clauses based on the similarity scores.

The computer-readable storage medium may also include where the NLG model to comprise a large language model (LLM) to generate the natural language representation to describe the formal deviation, the LLM to comprise a deep neural network trained using supervised learning.

The computer-readable storage medium may also include where the NLG model to comprise a large language model (LLM) to generate the natural language representation to describe the formal deviation, the LLM to comprise a deep neural network trained using unsupervised learning.

The computer-readable storage medium may also include where the NLG model to comprise a large language model (LLM) to generate the natural language representation to describe the formal deviation, the LLM to comprise a deep neural network trained using a combination of unsupervised learn and supervised learning.

The computer-readable storage medium may also include where the NLG model to comprise a large language model (LLM) to generate the natural language representation to describe the formal deviation, the LLM to comprise a deep neural network trained using a generative pre-trained transformer (GPT) language model.

The computer-readable storage medium may also include instructions that when executed by the computer cause the computer to train the NLG model in two stages, the first stage to train the NLG model with a generative pre-trained transformer (GPT) language model and unsupervised training data to reach a first language modeling objective to set initial parameters, and the second stage to train the NLG model with a discriminative language model with supervised training data to reach a second language modeling objective that adapts the set of initial parameters to a specific task.

The computer-readable storage medium may also include where the candidate source to comprise a document rule set associated with the defined entity, where the instructions further configure the computer to generate the insight based on the formal deviation using the NLG model, the insight to comprise a natural language representation to describe the formal deviation between a document rule of the document rule set and a document clause of the unsigned electronic agreement.

The computer-readable storage medium may also include where the candidate source to comprise a document version of the unsigned electronic agreement, where the instructions further configure the computer to generate the insight based on the formal deviation using the NLG model, the insight to comprise a natural language representation to describe the formal deviation between a document clause of the document version and a document clause of the unsigned electronic agreement.

The computer-readable storage medium may also include where the candidate source to comprise a signed electronic agreement, where the instructions further configure the computer to generate the insight based on the formal deviation using the NLG model, the insight to comprise a natural language representation to describe the formal deviation between a document clause of the signed electronic agreement and a document clause of the unsigned electronic agreement.

The computer-readable storage medium may also include instructions that when executed by the computer cause the computer to generate the machine learning model from a machine learning algorithm, the machine learning algorithm includes a neural network algorithm.

The computer-readable storage medium may also include instructions that when executed by the computer cause the computer to generate the machine learning model from a machine learning algorithm, the machine learning algorithm includes a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, or a distributed artificial intelligence algorithm.

The computer-readable storage medium may also include instructions that when executed by the computer cause the computer to determine the unsigned electronic agreement is a first document version of the unsigned electronic agreement and the candidate source is a second document version of the unsigned electronic agreement, identify multiple sets of related document clauses between the first document version and the second document version using a machine learning model, identify a set of common parameters shared between each set of related document clauses using the machine learning model, analyze the sets of common parameters for formal deviations between the common parameters, and generate an insight based on the formal deviations using the NLG model, the insight to describe the formal deviations in a natural language representation, the insight to comprise a text summary of the formal deviations using a text summarization algorithm.

The computer-readable storage medium may also include where the unsigned electronic documents is prepared to receive one or more electronic signatures. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

retrieving an unsigned electronic agreement associated with a defined entity, the unsigned electronic agreement having a set of document clauses, each document clause to have one or more parameters;

retrieving a candidate source associated with the defined entity, the candidate source having a set of candidate clauses, each candidate clause to have one or more parameters;

identifying a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source;

identifying a set of common parameters shared between the set of related document clauses using the machine learning model, the set of common parameters to include a parameter from the document clause and a parameter from the candidate clause of the set of related document clauses; and generating an insight based on a formal deviation between the set of common parameters using a natural language generation (NLG) model, the insight including a text summary generated by a summarization component of the NLG model and describing the formal deviation in a natural language representation.

2. The method of claim 1, further comprising presenting a description of the formal deviation as natural language text on an electronic display.

3. The method of claim 1, further comprising reproducing a description of the formal deviation as synthesized speech over an electronic speaker.

4. The method of claim 1, wherein the candidate source to comprise a document rule set associated with the defined entity, the document rule set to include a set of document rules for the unsigned electronic agreement, each document rule associated with a candidate clause.

5. The method of claim 1, wherein the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, wherein a candidate clause of the second document version is modified relative to the first document version.

6. The method of claim 1, wherein the candidate source to comprise a signed electronic agreement, the signed electronic agreement associated with the defined entity and having an electronic signature.

7. The method of claim 1, further comprising:

generating a similarity score for each candidate clause of the set of candidate clauses of the candidate source using the machine learning model;

generating a similarity score for each document clause of the set of documents clauses of the unsigned electronic agreement using the machine learning model; and identifying the set of related document clauses shared between the set of documents clauses of the unsigned electronic agreement and the set of candidate clauses of the candidate source based on the similarity scores.

8. A computing apparatus, comprising:

a processing circuitry; and a memory communicatively coupled to the processing circuitry, the memory storing instructions that, when executed by the processing circuitry, cause the processing circuitry to:

retrieve an unsigned electronic agreement associated with a defined entity, the unsigned electronic agreement having a set of document clauses, each document clause to have one or more parameters;

retrieve a candidate source associated with the defined entity, the candidate source having a set of candidate clauses, each candidate clause to have one or more parameters;

identify a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source;

identify a set of common parameters shared between the set of related document clauses using the machine learning model, the set of common parameters to include a parameter from the document clause and a parameter from the candidate clause of the set of related document clauses; and generate an insight based on a formal deviation between the set of common parameters using a natural language generation (NLG) model, the insight including a text summary generated by a summarization component of the NLG model and describing the formal deviation in a natural language representation.

9. The computing apparatus of claim 8, wherein the processing circuitry is configured to present a description of the formal deviation as natural language text on an electronic display.

10. The computing apparatus of claim 8, wherein the processing circuitry is configured to reproduce a description of the formal deviation as synthesized speech over an electronic speaker.

11. The computing apparatus of claim 8, wherein the candidate source to comprise a document rule set associated with the defined entity, the document rule set to include a set of document rules for the unsigned electronic agreement, each document rule associated with a candidate clause.

12. The computing apparatus of claim 8, wherein the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, wherein a candidate clause of the second document version is modified relative to the first document version.

13. The computing apparatus of claim 8, wherein the candidate source to comprise a signed electronic agreement, the signed electronic agreement associated with the defined entity and having an electronic signature.

14. The computing apparatus of claim 8, wherein the processing circuitry is configured to:

generate a similarity score for each candidate clause of the set of candidate clauses of the candidate source using the machine learning model;

generate a similarity score for each document clause of the set of documents clauses of the unsigned electronic agreement using the machine learning model; and identify the set of related document clauses shared between the set of documents clauses of the unsigned electronic agreement and the set of candidate clauses of the candidate source based on the similarity scores.

15. A non-transitory computer-readable storage medium, the computer-readable storage medium including instructions that when executed by a computer, cause the computer to:

retrieve an unsigned electronic agreement associated with a defined entity, the unsigned electronic agreement having a set of document clauses, each document clause to have one or more parameters;

retrieve a candidate source associated with the defined entity, the candidate source having a set of candidate clauses, each candidate clause to have one or more parameters;

identify a set of related document clauses between the unsigned electronic agreement and the candidate source using a machine learning model, the set of related document clauses to comprise a document clause from the set of documents clauses of the unsigned electronic agreement and a candidate clause from the set of candidate clauses of the candidate source;

identify a set of common parameters shared between the set of related document clauses using the machine learning model, the set of common parameters to include a parameter from the document clause and a parameter from the candidate clause of the set of related document clauses; and generate an insight based on a formal deviation between the set of common parameters using a natural language generation (NLG) model, the insight including a text summary generated by a summarization component of the NLG model and describing the formal deviation in a natural language representation.

16. The computer-readable storage medium of claim 15, the computer is configured to present a description of the formal deviation as natural language text on an electronic display.

17. The computer-readable storage medium of claim 15, the computer is configured to reproduce a description of the formal deviation as synthesized speech over an electronic speaker.

18. The computer-readable storage medium of claim 15, wherein the candidate source to comprise a document rule set associated with the defined entity, the document rule set to include a set of document rules for the unsigned electronic agreement, each document rule associated with a candidate clause.

19. The computer-readable storage medium of claim 15, wherein the unsigned electronic agreement is a first document version of the unsigned electronic agreement and the candidate source is a second document version of the unsigned electronic agreement, the second document version of the unsigned electronic agreement to share a structure and one or more candidate clauses with the first document version of the unsigned electronic agreement at a defined point in time, wherein a candidate clause of the second document version is modified relative to the first document version.

20. The computer-readable storage medium of claim 15, wherein the candidate source to comprise a signed electronic agreement, the signed electronic agreement associated with the defined entity and having an electronic signature.

* * * * *